(12) United States Patent
Fujinawa et al.

(10) Patent No.: US 11,882,249 B2
(45) Date of Patent: Jan. 23, 2024

(54) ELECTRONIC DEVICE, IMAGING DEVICE, IMAGE REPRODUCTION METHOD, IMAGE REPRODUCTION PROGRAM, RECORDING MEDIUM WITH IMAGE REPRODUCTION PROGRAM RECORDED THEREUPON, AND IMAGE REPRODUCTION DEVICE

(71) Applicant: NIKON CORPORATION, Tokyo (JP)

(72) Inventors: Nobuhiro Fujinawa, Yokohama (JP);
Setsu Mitsuhashi, Tokyo (JP);
Masakazu Sekiguchi, Kawasaki (JP);
Takashi Kuriyama, Yokohama (JP);
Hiroto Nagamine, Yokohama (JP);
Masami Takemoto, Tokyo (JP);
Motoki Toyama, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/751,309

(22) Filed: May 23, 2022

(65) Prior Publication Data
US 2022/0294915 A1    Sep. 15, 2022

Related U.S. Application Data

(60) Continuation of application No. 16/932,158, filed on Jul. 17, 2020, now Pat. No. 11,343,387, which is a
(Continued)

(30) Foreign Application Priority Data

Feb. 19, 2010  (JP) ................................. 2010-035010
Feb. 19, 2010  (JP) ................................. 2010-035013
Feb. 19, 2010  (JP) ................................. 2010-035014

(51) Int. Cl.
*H04N 1/00* (2006.01)
*H04N 23/62* (2023.01)
(Continued)

(52) U.S. Cl.
CPC ....... *H04N 1/00251* (2013.01); *G06F 16/583* (2019.01); *H04N 1/00127* (2013.01);
(Continued)

(58) Field of Classification Search
CPC .................................................. H04N 1/00251
(Continued)

(56) References Cited

U.S. PATENT DOCUMENTS 6,204,877 B1    3/2001   Kiyokawa
6,750,913 B1    6/2004   Noro et al.
(Continued)

FOREIGN PATENT DOCUMENTS

CN    1338863 A    3/2002
CN    1551614 A    12/2004
(Continued)

OTHER PUBLICATIONS

Jul. 20, 2022 Office Action issued in Chinese Patent Application No. 201911098602.4.
(Continued)

*Primary Examiner* — Joel W Fosselman
(74) *Attorney, Agent, or Firm* — Oliff PLC

(57) ABSTRACT

An electronic device includes: a communication unit that performs communication with an external device; and a control unit that issues a command to the external device via the communication unit, on the basis of at least one of capacity of the external device, and capacity of the electronic device.

2 Claims, 22 Drawing Sheets

Related U.S. Application Data continuation of application No. 16/294,462, filed on Mar. 6, 2019, now Pat. No. 10,764,447, which is a division of application No. 15/852,750, filed on Dec. 22, 2017, now Pat. No. 10,264,146, which is a division of application No. 15/171,533, filed on Jun. 2, 2016, now Pat. No. 9,888,136, which is a continuation of application No. 14/621,971, filed on Feb. 13, 2015, now Pat. No. 9,462,141, which is a continuation of application No. 14/473,355, filed on Aug. 29, 2014, now Pat. No. 9,167,108, which is a division of application No. 13/509,740, filed as application No. PCT/JP2011/052282 on Feb. 3, 2011, now Pat. No. 9,055,171.

(51) Int. Cl.

| | |
|---|---|
| *H04N 23/611* | (2023.01) |
| *H04N 23/63* | (2023.01) |
| *G06F 16/583* | (2019.01) |
| *H04N 5/77* | (2006.01) |
| *H04N 5/907* | (2006.01) |
| *H04N 9/804* | (2006.01) |
| *H04N 9/82* | (2006.01) |
| *H04N 23/61* | (2023.01) |
| *H04N 23/90* | (2023.01) |
| *H04N 23/661* | (2023.01) |
| *H04N 23/667* | (2023.01) |
| *H04N 23/67* | (2023.01) |

(52) U.S. Cl.
CPC ............ *H04N 5/772* (2013.01); *H04N 5/907* (2013.01); *H04N 9/8042* (2013.01); *H04N 9/8205* (2013.01); *H04N 23/61* (2023.01); *H04N 23/611* (2023.01); *H04N 23/62* (2023.01); *H04N 23/631* (2023.01); *H04N 23/635* (2023.01); *H04N 23/661* (2023.01); *H04N 23/667* (2023.01); *H04N 23/90* (2023.01); *H04N 23/673* (2023.01); *H04N 2201/0013* (2013.01); *H04N 2201/0084* (2013.01)

(58) Field of Classification Search
USPC .................................................... 348/211.11
See application file for complete search history.

(56) References Cited

U.S. PATENT DOCUMENTS

| | | |
|---|---|---|
| 6,809,759 B1 | 10/2004 | Chiang |
| 7,042,500 B1 | 5/2006 | Niikawa |
| 2002/0093575 A1 | 7/2002 | Kusaka |
| 2002/0147819 A1 | 10/2002 | Miyakoshi et al. |
| 2004/0048570 A1 | 3/2004 | Oba et al. |
| 2004/0051785 A1 | 3/2004 | Yokonuma et al. |
| 2004/0148515 A1 | 7/2004 | Kikuchi |
| 2004/0150724 A1 | 8/2004 | Nozaki et al. |
| 2004/0170276 A1 | 9/2004 | Yamasaki et al. |
| 2004/0227825 A1 | 11/2004 | Sakimura et al. |
| 2005/0146609 A1 | 7/2005 | Creamer et al. |
| 2005/0262371 A1 | 11/2005 | Luke et al. |
| 2006/0028557 A1 | 2/2006 | Watanabe |
| 2006/0046719 A1 | 3/2006 | Holtschneider |
| 2006/0066733 A1* | 3/2006 | Tsukamoto ............ H04N 5/772 386/E5.072 |
| 2006/0119734 A1 | 6/2006 | Neel |
| 2006/0140621 A1 | 6/2006 | Misawa |
| 2006/0165405 A1 | 7/2006 | Kanai et al. |
| 2006/0258289 A1 | 11/2006 | Dua |
| 2006/0290785 A1 | 12/2006 | Chen et al. |
| 2007/0022219 A1 | 1/2007 | Yasui |
| 2007/0104477 A1 | 5/2007 | Misawa |
| 2007/0201363 A1 | 8/2007 | Narukawa et al. |
| 2007/0211159 A1 | 9/2007 | Hara et al. |
| 2007/0242300 A1 | 10/2007 | Inai |
| 2007/0252901 A1 | 11/2007 | Yokonuma et al. |
| 2008/0026745 A1 | 1/2008 | Grubb |
| 2008/0166966 A1 | 7/2008 | Hamasaki et al. |
| 2008/0171561 A1 | 7/2008 | Irony et al. |
| 2008/0240697 A1 | 10/2008 | Marcus |
| 2009/0021350 A1 | 1/2009 | Hatta et al. |
| 2009/0058878 A1 | 3/2009 | Sasagawa |
| 2009/0111378 A1 | 4/2009 | Sheynman et al. |
| 2009/0167883 A1 | 7/2009 | Nozaki |
| 2009/0265470 A1 | 10/2009 | Shen et al. |
| 2009/0304238 A1 | 12/2009 | Ebata et al. |

FOREIGN PATENT DOCUMENTS

| | | |
|---|---|---|
| CN | 1692641 A | 11/2005 |
| CN | 1722731 A | 1/2006 |
| CN | 101060589 A | 10/2007 |
| CN | 101578593 A | 11/2009 |
| JP | H08-009347 A | 1/1996 |
| JP | H08-84282 A | 3/1996 |
| JP | H10-341400 A | 12/1998 |
| JP | H11-220649 A | 8/1999 |
| JP | H11-298778 A | 10/1999 |
| JP | H11-308508 A | 11/1999 |
| JP | 2000-134527 A | 5/2000 |
| JP | 2001-008089 A | 1/2001 |
| JP | 2001-111866 A | 4/2001 |
| JP | 2001-148802 A | 5/2001 |
| JP | 2001-169173 A | 6/2001 |
| JP | 2001-230954 A | 8/2001 |
| JP | 2001-320621 A | 11/2001 |
| JP | 2002-095055 A | 3/2002 |
| JP | 2002-359623 A | 12/2002 |
| JP | 2003-092719 A | 3/2003 |
| JP | 2003-169291 A | 6/2003 |
| JP | 2003-188805 A | 7/2003 |
| JP | 2003-209796 A | 7/2003 |
| JP | 2003-338785 A | 11/2003 |
| JP | 2004-012974 A | 1/2004 |
| JP | 2004-040370 A | 2/2004 |
| JP | 2004-194133 A | 7/2004 |
| JP | 2004-235780 A | 8/2004 |
| JP | 2004-235788 A | 8/2004 |
| JP | 2004-274625 A | 9/2004 |
| JP | 2005-217646 A | 8/2005 |
| JP | 2005-244907 A | 9/2005 |
| JP | 2005-318259 A | 11/2005 |
| JP | 2006-005444 A | 1/2006 |
| JP | 2006-108730 A | 4/2006 |
| JP | 2006-135930 A | 5/2006 |
| JP | 2006-148984 A | 6/2006 |
| JP | 2006-166248 A | 6/2006 |
| JP | 2006-212899 A | 8/2006 |
| JP | 2006-217354 A | 8/2006 |
| JP | 2006-238020 A | 9/2006 |
| JP | 2006-238021 A | 9/2006 |
| JP | 2006-245654 A | 9/2006 |
| JP | 2006-246023 A | 9/2006 |
| JP | 2006-311291 A | 11/2006 |
| JP | 2006-340150 A | 12/2006 |
| JP | 2007-004540 A | 1/2007 |
| JP | 2007-006415 A | 1/2007 |
| JP | 2007-081752 A | 3/2007 |
| JP | 2007-104427 A | 4/2007 |
| JP | 2007-133105 A | 5/2007 |
| JP | 2007-215070 A | 8/2007 |
| JP | 2007-274719 A | 10/2007 |
| JP | 2007-281760 A | 10/2007 |
| JP | 2008-512044 A | 4/2008 |
| JP | 2008-193457 A | 8/2008 |
| JP | 2008-219522 A | 9/2008 |
| JP | 2009-033494 A | 2/2009 |
| JP | 2009-47912 A | 3/2009 |
| JP | 2009-060378 A | 3/2009 |
| JP | 2009-094563 A | 4/2009 |

(56) References Cited

FOREIGN PATENT DOCUMENTS

| JP | 2009-141781 A | 6/2009 |
|----|---------------|--------|
| JP | 2009169209 A | 7/2009 |
| JP | 2009-194879 A | 8/2009 |
| JP | 2009-206559 A | 9/2009 |
| JP | 2009-206774 A | 9/2009 |
| JP | 2010-021984 A | 1/2010 |
| JP | 2010-041382 A | 2/2010 |
| JP | 2011-172088 A | 9/2011 |
| JP | 5032127 B2 | 9/2012 |
| WO | 2003/021876 A1 | 3/2003 |
| WO | 2005/098636 A1 | 10/2005 |
| WO | 2006/068115 A1 | 6/2006 |
| WO | 2007/099639 A1 | 9/2007 |
| WO | 2009/014438 A1 | 1/2009 |

OTHER PUBLICATIONS

Jul. 26, 2019 Office Action issued in Chinese Patent Application No. 201180010168.5.
Oct. 8, 2019 Trial and Appeal Decision issued in Japanese Patent Application No. 2016-197512.
Apr. 22, 2020 U.S. Notice of Allowance issued U.S. Appl. No. 16/294,462.
Jun. 30, 2020 Office Action issued in Japanese Patent Application No. 2019-163306.
Jul. 14, 2020 Office Action issued in Japanese Patent Application No. 2019-210613.
Nov. 8, 2019 Office Action issued in U.S. Appl. No. 16/294,462.
Jul. 23, 2020 Notice of Allowance and Fee(s) Due issued in U.S. Appl. No. 16/294,462.
Nov. 17, 2020 Office Action issued in Japanese Patent Application No. 2019-163306.
Nov. 24, 2020 Office Action issued in Japanese Patent Application No. 2019-210613.
May 14, 2021 U.S. Office Action issued U.S. Appl. No. 16/932,158.
Apr. 13, 2021 Office Action issued in Japanese Patent Application No. 2019-163306.
Apr. 13, 2021 Decision of Dismissal of Amendment issued in Japanese Patent Application No. 2019-163306.
May 6, 2021 Office Action issued in Chinese Patent Application No. 201911098602.4.
Jan. 25, 2022 Notice of Allowance Issued In U.S. Appl. No. 16/932,158.
Dec. 13, 2021 Office Action issued in Chinese Patent Application No. 201911098602.4.
Mar. 1, 2022 Office Action issued in Japanese Patent Application No. 2021-026437.
Feb. 18, 2022 Notice of Allowance Issued In U.S. Appl. No. 16/932,158.
Mar. 28, 2022 Notice of Allowance Issued In U.S. Appl. No. 16/932,158.
Dec. 24, 2014 Office Action issued in Japanese Patent Application No. 2014-051775.
Nov. 15, 2014 Office Action issued in Chinese Patent Application No. 201180010168.5.
May 27, 2014 Office Action issued in Japanese Patent Application No. 2013-0258981.
May 27, 2014 Office Action issued in Japanese Patent Application No. 2014-074216.
May 27, 2014 Office Action issued in Japanese Patent Application No. 2013-232948.
The Explanation of Circumstances Concerning Accelerated Examination submitted to Japanese Patent Office in Japanese Patent Application No. 2013-258981 dated Apr. 17, 2014.
The Explanation of Circumstances Concerning Accelerated Examination submitted to Japanese Patent Office in Japanese Patent Application No. 2014-74216 dated Apr. 21, 2014.
The Explanation of Circumstances Concerning Accelerated Examination submitted to Japanese Patent Office in Japanese Patent Application No. 2013-232948 dated May 2, 2014.
Oct. 1, 2013 Office Action issued in Japanese Patent Application No. 2010-035010.
Oct. 1, 2013 Office Action issued in Japanese Patent Application No. 2010-035013.
Oct. 1, 2013 Office Action issued in Japanese Patent Application No. 2010-035014.
Dec. 17, 2013 Office Action issued in Japanese Patent Application No. 2010-035014.
May 17, 2011 Search Report issued in International Patent Application No. PCT/JP2011/052282.
Mar. 31, 2015 Office Action issued in Japanese Patent Application No. 2014-051775.
Apr. 28, 2015 Office Action issued in Japanese Patent Application No. 2014-147874.
Jun. 16, 2015 Office Action in Japanese Patent Application No. 2014-185153.
Aug. 11, 2015 Office Action issued in Japanese Patent Application No. 2014-230519.
Sep. 25, 2015 Office Action issued in Chinese Patent Application No. 201180010168.5.
Nov. 10, 2015 Office Action issued in Japanese Patent Application No. 2014-147874.
May 20, 2016 Office Action issued in Chinese Patent Application No. 2011800101685.
Jul. 5, 2016 Office Action issued in Japanese Patent Application No. 2014-147874.
Aug. 8, 2016 Office Action issued in U.S. Appl. No. 15/171,533.
Sep. 18, 2016 Office Action issued in Chinese Patent Application No. 201410181952.8.
Sep. 26, 2016 Office Action issued in Chinese Patent Application No. 201410181935.4.
Sep. 29, 2016 Office Action issued in Chinese Patent Application No. 201410199200.4.
Oct. 8, 2016 Office Action issued in Chinese Patent Application No. 201410181953.2.
Apr. 11, 2017 Office Action Issued in U.S. Appl. No. 15/171,533.
Feb. 28, 2017 Office Action issued in Japanese Patent Application No. 2015-131759.
Feb. 27, 2017 Office Action issued in Chinese Patent Application No. 201410462966.7.
May 27, 2017 Office Action issued in Chinese Patent Application No. 201410199200.4.
Jun. 22, 2017 Office Action issued in Chinese Patent Application No. 201410181952.8.
Aug. 1, 2017 Office Action issued in Japanese Patent Application No. 2016-197512.
Jul. 4, 2017 Office Action issued in Chinese Patent Application No. 201410181935.4.
Jul. 14, 2017 Office Action issued in Chinese Patent Application No. 201180010168.5.
Oct. 17, 2017 Office Action issued in Japanese Patent Application No. 2015-131759.
Oct. 17, 2017 Decision to Decline the Amendment issued in Japanese Patent Application No. 2015-131759.
Sep. 25, 2017 Notice of Allowance issued in U.S. Appl. No. 15/171,533.
Jan. 5, 2018 Office Action issued in Chinese Patent Application No. 201180010168.5.
Feb. 27, 2018 Office Action issued in Japanese Patent Application No. 2016-197512.
Mar. 16, 2018 Office Action issued in U.S. Appl. No. 15/852,750.
Mar. 20, 2018 Office Action issued in Indian Patent Application No. 4480/DELNP/2012.
Jul. 24, 2018 Office Action issued in Japanese Patent Application No. 2016-197512.
Jul. 30, 2018 Office Action issued in Chinese Patent Application No. 201180010168.5.
Oct. 9, 2018 Office Action issued in Japanese Patent Application No. 2018-005927.

(56) References Cited

OTHER PUBLICATIONS

Jan. 31, 2019 Office Action issued in Chinese Patent Application No. 201180010168.5.
Nov. 29, 2018 Notice of Allowance and Fee(s) Due was issued in U.S. Appl. No. 15/852,750.
Jan. 10, 2019 Updated Notice of Allowance and Fee(s) Due was issued in U.S. Appl. No. 15/852,750.
Apr. 10, 2019 U.S. Office Action issued U.S. Appl. No. 16/294,462.
May 7, 2019 Office Action issued in Japanese Patent Application No. 2018-005927.
Jul. 23, 2019 Office Action issued in Japanese Patent Application No. 2018-200153. .
Oct. 25, 2022 Office Action issued in Japanese Application No. 2021-026437.
Apr. 10, 2023 Hearing Notice issued in Indian Application No. 4480/DELNP/2012.
Mar. 23, 2023 Office Action issued in Chinese Patent Application No. 201911094088.7.
Feb. 21, 2023 Office Action in Indian Application 4480/DELNP/2012.
Feb. 28, 2023 Office Action issued in Japanese Application 2021-115785.
Jul. 6, 2023 Reexamination Notice issued in Chinese Patent Application No. 201911098602.4.
Oct. 31, 2023 Office Action issued in Japanese Patent Application No. 2023-009442.
Oct. 17, 2023 Office Action issued in Japanese Application No. 2021-115785.
Oct. 31, 20233 Decision on Reexamination Request issued in Chinese Patent Application No. 201911098602.4.

\* cited by examiner

FIG.7

| DIRECTION OF GRAVITY | CONTACT ELECTRODE | CONTENT OF DECISION | PARENT/CHILD |
|---|---|---|---|
| LOWER SURFACE (SIDE OF TRANSMISSION/RECEPTION ELECTRODE 22B) | UPPER SURFACE (SIDE OF TRANSMISSION/RECEPTION ELECTRODE 22C) | DOWN | CHILD |
| | LOWER SURFACE (SIDE OF TRANSMISSION/RECEPTION ELECTRODE 22C) | UP | PARENT |
| UPPER SURFACE (SIDE OF TRANSMISSION/RECEPTION ELECTRODE 22B) | UPPER SURFACE (SIDE OF TRANSMISSION/RECEPTION ELECTRODE 22C) | UP | PARENT |
| | LOWER SURFACE (SIDE OF TRANSMISSION/RECEPTION ELECTRODE 22C) | DOWN | CHILD |
| RIGHT SIDE (SIDE OF TRANSMISSION/RECEPTION ELECTRODE 22D) | LEFT SIDE (SIDE OF TRANSMISSION/RECEPTION ELECTRODE 22E) | DOWN | CHILD |
| | RIGHT SIDE (SIDE OF TRANSMISSION/RECEPTION ELECTRODE 22D) | UP | PARENT |
| LEFT SIDE (SIDE OF TRANSMISSION/RECEPTION ELECTRODE 22E) | LEFT SIDE (SIDE OF TRANSMISSION/RECEPTION ELECTRODE 22E) | UP | PARENT |
| | RIGHT SIDE (SIDE OF TRANSMISSION/RECEPTION ELECTRODE 22D) | DOWN | CHILD |

FIG.20

| DIRECTION OF GRAVITY | CONTACT ELECTRODE | CONTENT OF DECISION | PARENT/ CHILD |
|---|---|---|---|
| LOWER SURFACE (SIDE OF TRANSMISSION/ RECEPTION ELECTRODE 22C) | LEFT SIDE (SIDE OF TRANSMISSION/ RECEPTION ELECTRODE 22E) | RIGHT | CHILD |
| | RIGHT SIDE (SIDE OF TRANSMISSION/ RECEPTION ELECTRODE 22C) | LEFT | PARENT |
| UPPER SURFACE (SIDE OF TRANSMISSION/ RECEPTION ELECTRODE 22B) | LEFT SIDE (SIDE OF TRANSMISSION/ RECEPTION ELECTRODE 22E) | LEFT | PARENT |
| | RIGHT SIDE (SIDE OF TRANSMISSION/ RECEPTION ELECTRODE 22C) | RIGHT | CHILD |
| RIGHT SIDE (SIDE OF TRANSMISSION/ RECEPTION ELECTRODE 22D) | LOWER SURFACE (SIDE OF TRANSMISSION/ RECEPTION ELECTRODE 22E) | RIGHT | CHILD |
| | UPPER SURFACE (SIDE OF TRANSMISSION/ RECEPTION ELECTRODE 22B) | LEFT | PARENT |
| LEFT SIDE (SIDE OF TRANSMISSION/ RECEPTION ELECTRODE 22E) | LOWER SURFACE (SIDE OF TRANSMISSION/ RECEPTION ELECTRODE 22C) | LEFT | PARENT |
| | UPPER SURFACE (SIDE OF TRANSMISSION/ RECEPTION ELECTRODE 22B) | RIGHT | CHILD |

ELECTRONIC DEVICE, IMAGING DEVICE, IMAGE REPRODUCTION METHOD, IMAGE REPRODUCTION PROGRAM, RECORDING MEDIUM WITH IMAGE REPRODUCTION PROGRAM RECORDED THEREUPON, AND IMAGE REPRODUCTION DEVICE

CROSS-REFERENCE TO RELATED APPLICATIONS

This is a Continuation of application Ser. No. 16/932,158 filed on Jul. 17, 2020 (now U.S. Pat. No. 11,343,387), which in turn is a Continuation of application Ser. No. 16/294,462 filed on Mar. 6, 2019 (now U.S. Pat. No. 10,764,447), which in turn is a Division of application Ser. No. 15/852,750 filed on Dec. 22, 2017 (now U.S. Pat. No. 10,264,146), which in turn is a Division of application Ser. No. 15/171,533 filed Jun. 2, 2016 (now U.S. Pat. No. 9,888,136), which in turn is a Continuation of application Ser. No. 14/621,971 filed Feb. 13, 2015 (now U.S. Pat. No. 9,462,141), which in turn is a Continuation of application Ser. No. 14/473,355 filed Aug. 29, 2014 (now U.S. Pat. No. 9,167,108), which in turn is a Division of application Ser. No. 13/509,740 filed May 14, 2012 (now U.S. Pat. No. 9,055,171), which in turn is a National Stage of International Patent Application No. PCT/JP2011/052282 filed Feb. 3, 2011, which claims the benefit of Japanese Patent Application Nos. 2010-035010, 2010-035013, and 2010-035014 filed Feb. 19, 2010. The disclosure of each of the prior applications is hereby incorporated by reference herein in their entireties.

TECHNICAL FIELD

The present invention relates to an electronic device, to an imaging device, to an image reproduction method, to an image reproduction program, to a recording medium with an image reproduction program recorded thereupon, and to an image reproduction device.

BACKGROUND ART

It has been proposed to operate cameras in pairs (for example, refer to Patent Documents #1 and #2), and it has been proposed to establish such a pairing using strobe light emitted by the cameras.

Furthermore, a camera system is known with which it is arranged to perform collaborative photography with a plurality of cameras (for example, refer to Patent Document #3).

CITATION LIST

Patent Literature

Patent Document #1: Japanese Laid-Open Patent Publication 2009-33494.
Patent Document #2: Japanese Laid-Open Patent Publication Heisei 08-084282.
Patent Document #3: Japanese Laid-Open Patent Publication 2001-008089.

SUMMARY OF THE INVENTION

Technical Problem

However, with Patent Document #1, it is necessary for strobe light to be emitted in order to perform the pairing operation, and there is the problem that this is not applicable for use indoors when light emission is prohibited, or for use outdoors during daylight.

Moreover, with Patent Document #2, there is the problem that paired operation in which photography is performed by both cameras is not included.

And, with the camera system of Patent Document #3, there is no disclosure of any method for reproducing the plurality of images that have been obtained by collaborative photography by the plurality of cameras, although it is desirable to reproduce the plurality of images that have been obtained by collaborative photography in an effective manner.

Solution to the Problem

According to the 1st aspect of the present invention, an electronic device comprises: a communication unit that performs communication with an external device; and a control unit that issues a command to the external device via the communication unit, on the basis of at least one of capacity of the external device, and capacity of the electronic device.

According to the 2nd aspect of the present invention, it is preferred that in the electronic device according to the 1st aspect, the capacity of the external device includes at least one of remaining capacity of a battery, and vacant capacity of a storage medium; and the control unit issues the command to the external device on the basis of at least one of the remaining capacity of the battery, and the vacant capacity of the storage medium.

According to the 3rd aspect of the present invention, it is preferred that in the electronic device according to the 1st or 2nd aspect, the capacity of the electronic device includes at least one of remaining capacity of a battery, and vacant capacity of a storage medium; and the control unit issues the command to the external device on the basis of at least one of the remaining capacity of the battery, and the vacant capacity of the storage medium.

According to the 4th aspect of the present invention, it is preferred that in the electronic device according to the 3rd aspect, the control unit stores data sent from the external device on the storage medium.

According to the 5th aspect of the present invention, the electronic device according to any one of the 1st through 4th aspects may further comprise a display device that displays data sent from the external device.

According to the 6th aspect of the present invention, it is preferred that in the electronic device according to the 5th aspect, the data sent from the external device is image data; and the electronic device according to the 5th aspect may further comprise a processing device that performs filter processing upon images to be displayed upon the display device according to the level of reception by the communication unit when receiving the image data from the external device.

According to the 7th aspect of the present invention, it is preferred that in the electronic device according to the 6th aspect, the processing device performs filter processing so that greater an amount of blur of the image becomes, lower the level of reception becomes.

According to the 8th aspect of the present invention, it is preferred that in the electronic device according to any one of the 4th through 7th aspects, the communication unit comprises a first communication device that performs communication regarding the capacity of the external device, and a second communication device, different from the first communication device, that communicates the data sent from the external device.

According to the 9th aspect of the present invention, an electronic device, comprises: a first communication unit that establishes pairing with an external device by short distance communication with the external device, or by communication via a human body; a second communication unit, different from the first communication unit, that performs communication with the external device; and a control unit that issues a command to the external device via the second communication unit when the pairing has been established by the first communication unit with the external device.

According to the 10th aspect of the present invention, the electronic device according to the 9th aspect may further comprise: a timer unit that counts time from when the pairing with the external device is established.

According to the 11th aspect of the present invention, it is preferred that in the electronic device according to the 10th aspect, the control unit cancels the pairing when the time counted by the timer unit exceeds predetermined time period.

According to the 12th aspect of the present invention, the electronic device according to any one of the 1st through 11th aspects may further comprises: a gravity sensor that detects a direction of gravity; and a determination unit that determines a master and slave relationship with the external device on the basis of the output of the gravity sensor.

According to the 13th aspect of the present invention, an imaging device comprises: an image capture unit that acquires image data; a communication unit that performs communication with an external imaging device; an acquisition unit that, via the communication unit, acquires photographic conditions set by an external imaging device as a plurality of photographic conditions for the external imaging device; and a photography control unit that sets a photographic condition that is different at least in part of the photographic conditions for the external imaging devices acquired by the acquisition unit as a photographic condition for the imaging device.

According to the 14th aspect of the present invention, it is preferred that in the imaging device according to the 13th aspect, the photography control unit sets a photographic condition that is same at least in part of the photographic conditions for the external devices acquired by the acquisition unit as a photographic condition for the imaging device.

According to the 15th aspect of the present invention, it is preferred that in the imaging device according to the 13th or 14th aspect, the photographic condition is at least one of photographic optical system magnification ratio, shutter speed, aperture value, sensitivity, and color adjustment processing information.

According to the 16th aspect of the present invention, the imaging device according to the 15th aspect may further comprise: an image processing unit that performs color adjustment processing upon image data acquired by the image capture unit, and wherein: the acquisition unit acquires the image capture optical system magnification ratio and the color adjustment processing information that are set by the external imaging device as the photographic conditions for the external imaging device; and the photography control unit, along with setting to a magnification ratio that is different from the image capture optical system magnification ratio of the external imaging device acquired by the acquisition unit, also controls the image processing unit to perform the color adjustment processing on the basis of color adjustment processing information that is same as the color adjustment processing information of the external imaging device acquired by the acquisition unit.

According to the 17th aspect of the present invention, it is preferred that in the imaging device according to the 16th aspect, the acquisition unit acquires the image capture optical system magnification ratio and the color adjustment information that are set by the external imaging device, in mutual correspondence, as the photographic conditions for the external imaging device; and the photography control unit compares together the photographic optical system magnification ratio acquired by the acquisition unit and the photographic optical system magnification ratio that has been set, and controls the image processing unit to perform color adjustment processing on the basis of the color adjustment processing information corresponding to the image capture optical system magnification ratio that is smaller.

According to the 18th aspect of the present invention, it is preferred that in the imaging device according to the 15th aspect, the acquisition unit acquires the image capture optical system magnification ratio and the shutter speed that are set by the external imaging device as the photographic conditions for the external imaging device; and the photography control unit, along with setting to a magnification ratio that is different from the magnification ratio of the image capture optical system of the external imaging device acquired by the acquisition unit, also sets a shatter speed that is same as the shutter speed of the external imaging device acquired by the acquisition unit.

According to the 19th aspect of the present invention, it is preferred that in the imaging device according to the 15th aspect, the acquisition unit acquires the image capture optical system magnification ratio and the aperture value that are set by the external imaging device as the photographic conditions for the external imaging device; and the photography control unit, along with setting to aperture value that is different from the aperture value of the external imaging device acquired by the acquisition unit, also sets a magnification ratio that is same as the optical system magnification ratio of the external imaging device acquired by the acquisition unit.

According to the 20th aspect of the present invention, it is preferred that in the imaging device according to the 20th aspect, the acquisition unit acquires the image capture optical system magnification ratio and the shutter speed that are set by the external imaging device as the photographic conditions for the external imaging device; and the photography control unit, along with setting to a shutter speed that is different from the shutter speed of the external imaging device acquired by the acquisition unit, also sets a magnification ratio that is same as the optical system magnification ratio of the external imaging device acquired by the acquisition unit.

According to the 21st aspect of the present invention, an imaging device comprises: an image capture unit that acquires image data; a communication unit that performs communication with an external imaging device; and an image capture control unit that performs predetermined image capture processing via communication with the external imaging device; wherein the image capture control unit includes an assistance unit that, on the basis of contents of communication with the external imaging device, suggests framing so that photography of same photographic subject as that of the external imaging device is performed from a different photographic direction.

According to the 22nd aspect of the present invention, it is preferred that in the electronic device according to the 21st aspect, the assistance unit comprises: a face detection unit that detects a face on the basis of the image data from the image capture unit; and a photographic direction determination unit that determines a direction of photography of the face on the basis of the detected face.

According to the 23rd aspect of the present invention, the electronic device according to any one of the 13th through 22nd aspects may further comprise a recording unit that records the image data acquired by the image capturing unit in a storage unit; and wherein: the image capture control unit controls the recording unit so as to append information to the image data acquired by the imaging device while communication is established with the external imaging device, the appended information specifying that the image data is captured while communication is established.

According to the 24th aspect of the present invention, an imaging device comprises: an image capture unit that performs image capture; a communication unit that communicates with another image capture device that performs image capture; a requesting unit that, along with issuing a photography request via the communication unit to the another image capture device, also issues a storage region creation request to the another image capture device for creating a storage region for storing at least an image photographed by the other image capture device in response to the photography request; a creation unit that creates a storage region in which the image captured by the image capture unit is to be stored, in response to the storage region creation request from the another image capture device issued via the communication unit; and an acquisition unit that acquires via the communication unit an image stored in a storage region created by the another image capture device according to the storage region creation request.

According to the 25th aspect of the present invention, it is preferred that in the imaging device according to the 24th aspect, the acquisition unit stores the acquired image in the storage region created by the creation unit.

According to the 26th aspect of the present invention, it is preferred that in the imaging device according to the 24th or 25th aspect, the acquisition unit acquires information when acquiring the image, the information specifying time that the image was photographed.

According to the 27th aspect of the present invention, the imaging device according to the 26th aspect may further comprise: a display unit that displays the image; and a control unit that displays images stored in the storage region upon the display unit in order of time series in which the images were photographed.

According to the 28th aspect of the present invention, the imaging device according to any one of the 24th through 26th aspects may further comprise: a display unit that displays the image; and a control unit that separates images stored in the storage region into images captured by the image capture unit and images captured by the other image capture device and display the images upon the display unit.

According to the 29th aspect of the present invention, the imaging device according to any one of the 24th through 26th aspects may further comprise: a display unit that displays the image; a decision unit that makes a decision as to whether or not the image stored in the storage region is an image of a person; and a control unit that displays the images upon the display unit according to the result of the decision by the decision unit.

According to the 30th aspect of the present invention, the imaging device according to any one of the 24th through 26th aspects may further comprise: a display unit that displays the image; a decision unit that makes a decision as to whether or not the image stored in the storage region is a scenery image; and a control unit that displays the images upon the display unit according to result of the decision by the decision unit.

According to the 31st aspect of the present invention, the imaging device according to any one of the 24th through 30th aspects may further comprise: a selection unit that, when a plurality of images photographed by the image capture unit and the another image capture device at substantially same moment have been photographed are stored in the storage region, selects either one of the images and displays it upon the display unit.

According to the 32nd aspect of the present invention, the imaging device according to the 31st aspect may further comprise: a contour extraction unit that analyzes each of the plurality of images that have been photographed at substantially same moment and performs contour extraction thereupon; and wherein: the selection unit selects, among the plurality of images that have been photographed at substantially same moment, an image for which the amount of contour extraction by the contour extraction unit is high.

According to the 33rd aspect of the present invention, the imaging device according to the 31st aspect may further comprise: a face detection unit that analyzes each of the plurality of images that have been photographed at substantially same moment and performs smiling face detection thereupon to detect a degree of smiling thereof; and wherein: the selection unit selects, among the plurality of images that have been photographed at substantially same moment, an image for which the degree of smiling according to the smiling face detection unit is high.

According to the 34th aspect of the present invention, an image reproduction method that reproduces a plurality of images photographed by a plurality of imaging devices, each of the plurality of images being corresponded to information related to its opposite party in photography and photographic time point information, in which are executed: collection processing for collecting the plurality of images photographed by the plurality of imaging devices into image groups on the basis of the information related to opposite parties in photography and the photographic time point information; and reproduction processing for reproducing the plurality of images included in the image groups in order of photographic time point according to the photographic time point information.

According to the 35th aspect of the present invention, it is preferred that in the image reproduction method according to the 34th aspect, in the reproduction processing, among the plurality of images included in the image groups, after reproduction of images captured by a first imaging device in order of the photographic time point, images captured by a second imaging device are reproduced in order of the photographic time point.

According to the 36th aspect of the present invention, the image reproduction method according to any one of the 34th aspect may further include: decision processing for making a decision as to whether or not the plurality of images included in the image groups are images that were photographed with a person as a subject; and wherein: in the reproduction processing, after the images, among the plurality of images included in the image groups, that were captured by a first imaging device have been reproduced in order of the photographic time point, subsequently the images that were captured by a second imaging device are reproduced in order of the photographic time point if the decision has been made in the decision processing that the images were photographed with a person as a subject; while all of the images included in the image groups are reproduced in order of the photographic time point if the decision has been made in the decision processing that the images were photographed with a person as a subject.

According to the 37th aspect of the present invention, the image reproduction method according to any one of the 34th through 36th aspects may further include: selection processing for selecting one of the plurality of images included in the image groups as an image to be reproduced if, among the plurality of images included in the image groups, there are a plurality of images that have been photographed at substantially same moment; and wherein: in the reproduction processing the image selected in the selection processing is reproduced.

According to the 38th aspect of the present invention, the image reproduction method according to the 37th aspect may further include: contour extraction processing for analyzing the plurality of images, among the plurality of images included in the image groups, that were photographed at substantially same moment and for performing contour extraction thereupon; and wherein: in the selection processing, the image for which the contour extraction amount obtained in the contour extraction processing is the highest among the plurality of images that were photographed at substantially same moment is selected as image for reproduction.

According to the 39th aspect of the present invention, the image reproduction method according to the 37th aspect may further include: smiling face detection processing for analyzing the plurality of images, among the plurality of images included in the image groups, that were photographed at substantially same moment and for detecting a degree of smiling thereof; and wherein: in the selection processing, the images for which the degree of smiling obtained in the smiling face detection processing is highest among the plurality of images that were photographed at substantially same moment is selected as image for reproduction.

According to the 40th aspect of the present invention, an image reproduction program causes a computer to execute all of the processing of an image reproduction method according to any one of the 34th through 39th aspects.

According to the 41st aspect of the present invention, a recording medium records an image reproduction program according to the 40th aspect.

According to the 42nd aspect of the present invention, an image reproduction device comprises: a memory in which an image reproduction program according to the 1st aspect is recorded; and a microcomputer that executes the image reproduction program.

Advantageous Effects of Invention

According to the 1st and 2nd aspect of the present invention, it is possible to perform paired operation in an appropriate manner, irrespective of whether the equipment is indoors or outdoors.

Furthermore, according to the 34th aspect of the present invention, it is possible to reproduce the plurality of images effectively in succession, which are photographed in collaborative photography by the plurality of the imaging device

BRIEF DESCRIPTION OF THE DRAWINGS

FIG. 7 is a figure showing an example of an "upper" decision table;
FIG. 20 is a figure showing an example of a "left side" decision table.

DESCRIPTION OF THE EMBODIMENTS

In the following, embodiments for implementation of the present invention will be explained with reference to the drawings.

The First Embodiment

Figure 1:
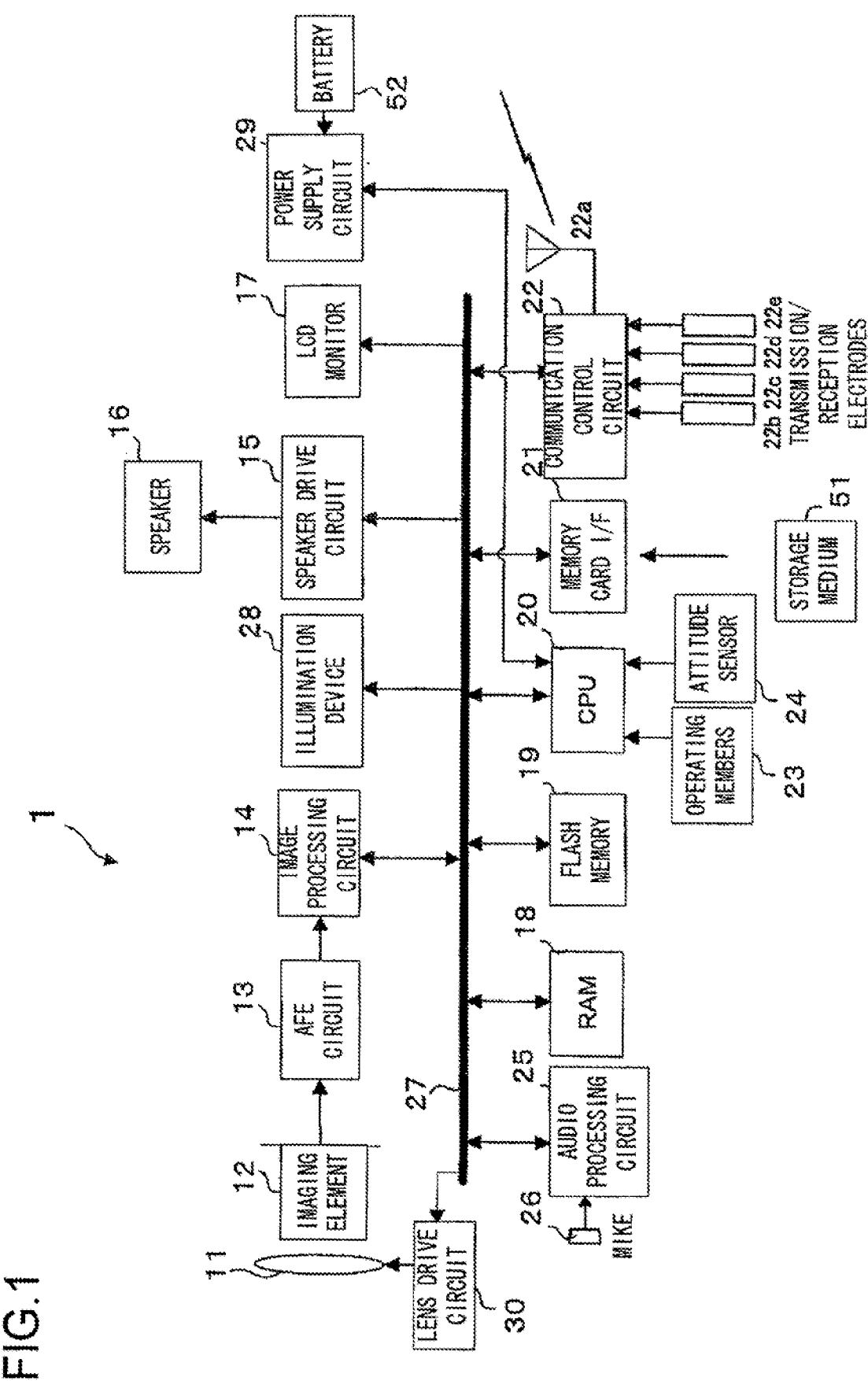
FIG. 1 is a block diagram of an electronic camera according to an embodiment of the present invention.

FIG. 1 is a block diagram for explanation of an example of the structure of an electronic camera 1 according to a first embodiment of the present invention. In FIG. 1, the electronic camera 1 includes a photographic optical system 11, an imaging element 12, an AFE (Analog Front End) circuit 13, an image processing circuit 14, a speaker drive circuit 15, a speaker 16, an LCD monitor 17, a RAM 18, a flash memory 19, a CPU 20, a memory card interface (I/F) 21, a communication control circuit 22, operating members 23, an attitude sensor 24, an audio processing circuit 25, a stereo mike 26, an illumination device 28, a power supply circuit 29, and a lens drive circuit 30.

The CPU 20, the RAM 18, the flash memory 19, the memory card interface 21, the communication control circuit 22, the audio processing circuit 25, the lens drive circuit 30, the image processing circuit 14, the illumination device 28, the speaker drive circuit 15, and the LCD monitor 17 are all connected together via a bus 27.

The photographic optical system 11 is built up from a plurality of lens groups that include a zoom lens and a focusing lens, and forms an image of a photographic subject upon an image capture surface of the imaging element 12. It should be understood that, for simplification of the drawing, the photographic optical system 11 is shown in FIG. 1 as being a single lens.

The imaging element 12 consists of a CMOS image sensor or the like in which light reception elements are arranged as a two dimensional array upon the image capture surface. This imaging element 12 photoelectrically converts the image of the photographic subject formed by the photographic optical system 11 and generates an analog image signal therefrom. This analog image signal is inputted to the AFE circuit 13.

The AFE circuit 13 performs analog processing such as correlated double sampling and gain adjustment and so on upon the analog image signal, and converts the image signal after this analog processing into digital image data. This digital image data is inputted to the image processing circuit 14. And the image processing circuit 14 subjects the digital image data to various types of image processing (such as color interpolation processing, tone conversion processing, contour enhancement processing, white balance adjustment processing, image compression processing, image expansion processing, and so on).

On the basis of audio data sent from the CPU 20, the speaker drive circuit 15 generates reproduced audio signals such as, for example, operating sounds, warning sounds, audio messages, and so on. And the speaker 16 performs audio reproduction on the basis of these reproduced audio signals.

The LCD monitor 17 includes a liquid crystal panel, and displays images and operating menu screens and so on according to commands from the CPU 20. And the RAM 18 is used as a work memory for the CPU 20. Moreover, the RAM 18 temporarily stores digital image data before processing by the image processing circuit 14 and digital image data after such processing. The flash memory 19 stores a program to be executed by the CPU 20, and also stores data for reference that will be described hereinafter.

The CPU 20 is a photography control unit that controls the operations performed by the electronic camera 1 by executing a program stored in the flash memory 19. The CPU 20 also performs control of AF (auto focus) operation and of automatic exposure (AE) operation. For example, for this AF operation, a contrast detection method may be employed in which a focused position for the focusing lens (not shown in the figures) is obtained on the basis of contrast information in a through image. The through image is an image for monitoring that is repeatedly acquired by the imaging element 12 at predetermined time intervals (for example at 30 frames per second), before a command for photography. The CPU 20 is also endowed with a time counting function, by which it counts time on the basis of a clock signal.

The memory card interface 21 has a connector (not shown in the figures), and a storage medium 51 such as a memory card or the like is connected to this connector. The memory card interface 21 performs writing of data to the storage medium 51 that is connected thereto, and reading of data from the storage medium 51. The storage medium 51 consists of a memory card or the like that internally houses a semiconductor memory.

The communication control circuit 22 controls communication with an external device according to commands from the CPU 20. This communication control circuit 22 includes a wireless communication circuit, and transmits and receives radio waves via an antenna 22a. In this first embodiment, an example will be explained in which wireless communication is performed with another electronic camera 1 that has a similar structure to that of this electronic camera 1. It should be understood that, preferably, the wireless communication circuit includes a circuit, for example a RSSI (Received Signal Strength Indicator), for measuring the intensity of the signal that is received and for performing control of the range of the signal that is transmitted.

The communication control circuit 22 also has a human body communication function for performing communication via a human body according to commands from the CPU 20. In concrete terms, electrodes 22b through 22e for transmission and reception are arranged on the upper, lower, right, and left surfaces of the casing of the electronic camera 1 so as to be exposed (refer to FIG. 2). This is a system (refer to Re-publication 2006/054706) according to which a closed circuit is established between the electronic cameras 1 by their bodies and by the capacitance coupling between their bodies by the user of this electronic camera 1 and the user of the other electronic camera 1 doing as described below, so that communication can be performed between the two electronic cameras 1 by using these two human bodies as antennas. In detail, a closed circuit is established by the user of this electronic camera 1 and the user of the other electronic camera 1 each grasping his electronic camera 1 with his one hand so as to touch at least one of the transmission/reception electrodes thereof, and by the two users then clasping together their other hands that are not grasping the electronic cameras 1. It should be understood that it would also be acceptable for the communication control unit 22 to be provided with a cable communication function, in which it performs communication via a cable upon command from the CPU 20. In this case, a LAN cable port or the like not shown in the figures would be provided.

The operating members 23 include a release button 23a, zoom switches 23b and 23c, a cruciform switch 23g, a menu switch 23e, and so on that will be described hereinafter (refer to FIG. 2). And, in response to various operations such as mode changeover operation and menu selection operation and so on, the operating members 23 send operation signals to the CPU 20.

The attitude sensor 24, for example, detects the direction of gravity, and sends its detection signal to the CPU 20. And the CPU 20 determines the attitude of the electronic camera 1 on the basis of this detection signal. In concrete terms, the CPU 20 not only decides whether the electronic camera 1 is in the vertical position or in the horizontal position, but also decides whether or not it is upside down.

The audio processing circuit 25 amplifies an audio signal captured by the mike 26, and converts the signal after amplification to digital audio data with an A/D conversion circuit (not shown in the figures). And the illumination device 28 is a device for illuminating the photographic subject during night-time photography. Moreover, upon command from the CPU 20, the power supply circuit 29 supplies voltage from a battery 52 to the various sections of this electronic camera 1, and also detects the voltage of the battery 52 and sends a signal specifying the voltage that it has detected to the CPU 20 as battery remaining capacity information.

The lens drive circuit 30 includes a circuit that drives a motor for focus adjustment (not shown in the figures) and a circuit that drives a motor for zoom adjustment (also not shown in the figures). The motor for focus adjustment adjusts the focus by shifting the focusing lens included in the photographic optical system 11 forwards and backwards along the direction of the optical axis. And the motor for zoom adjustment adjusts the magnification ratio by shifting the zoom lens included in the photographic optical system 11 forwards and backwards along the direction of the optical axis. This lens drive circuit 30 drives both the motor for focus adjustment and also the motor for zoom adjustment according to commands from the CPU 20.

In the state in which communication has been established with another electronic camera 1 (both of them having a similar structure), the CPU 20 of the electronic camera 1 performs predetermined cooperation processing. The state in which communication is established between this electronic camera 1 and another electronic camera 1 and predetermined cooperation processing can be executed will subsequently be termed "pairing". The state in which such predetermined cooperation processing can be executed is a state in which commands related to operation and so on can be mutually transmitted and received between this electronic camera 1 and the other electronic camera 1. Moreover, this cooperation processing is not particularly limited; for example, processing such as the following is included as being cooperation processing. Examples are: processing to make the other electronic camera 1 execute the same operation as this electronic camera 1; processing to make the other electronic camera 1 execute a different operation from that of this electronic camera 1; processing to cause information such as image data or the like to be transmitted to the other electronic camera 1; and so on. Normally, after communication has been established by a command and data being transmitted from one of this electronic camera 1 and the other electronic camera 1 to the other, and by the electronic camera 1 that has received this command and data replying to the electronic camera 1 that was the source of command transmission, subsequently pairing of the electronic cameras 1 becomes established upon the fulfillment of some predetermined condition that will be described hereinafter. It should be understood that cable communication, wireless communication, human body communication or the like may, for example, be cited as methods for communication between this electronic camera 1 and the other electronic camera 1. Moreover, it would also be acceptable to employ appropriate combinations of these communication methods, for example human body communication until communication has been set up and wireless communication thereafter, or the like.

It is arranged for it to be possible to change over between a paired mode in which the above described pairing is performed, and a normal mode in which pairing is not performed. It may, for example, be arranged for this mode changeover to be performed according to operation of the mode switch 23d by depressing, or to arrange for such mode changeover to be performed upon an "operating menu" screen that is being displayed according to depressing operation of the menu switch 23e. In this explanation, the processing performed by the CPU 20 will be explained with particular attention being directed to the case when changeover to the paired mode is performed.

—The Pairing Formation Conditions—

It is arranged for it to be possible to select from among four pairing formation conditions. Operation to select a pairing formation condition is performed in advance as follows, before performing communication with the other electronic camera.

Figure 2:
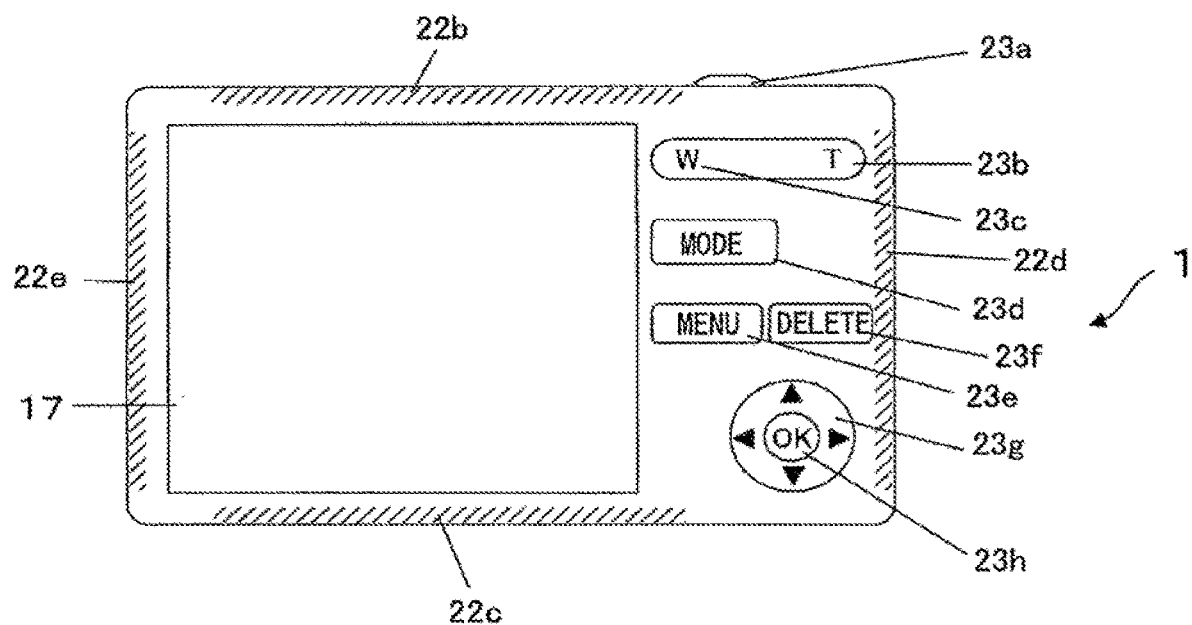
FIG. 2 is a rear view of this electronic camera.

FIG. 2 is a rear view of the electronic camera 1. On the rear surface of the electronic camera 1, there are provided: an LCD monitor 17, a zoom switch 23b (T), a zoom switch 23c (W), a mode switch 23d, a menu switch 23e, a delete switch 23f, a cruciform switch 23g, and an OK switch 23h. Moreover, the above described transmission/reception electrode 22b is provided upon the upper surface of the casing of the electronic camera 1. Furthermore, the above described transmission/reception electrode 22c is provided upon the lower surface of the casing. And the above described transmission/reception electrode 22d is provided upon the right side of the casing, while the above described transmission/reception electrode 22d is provided upon the left side of the casing.

Figure 3:
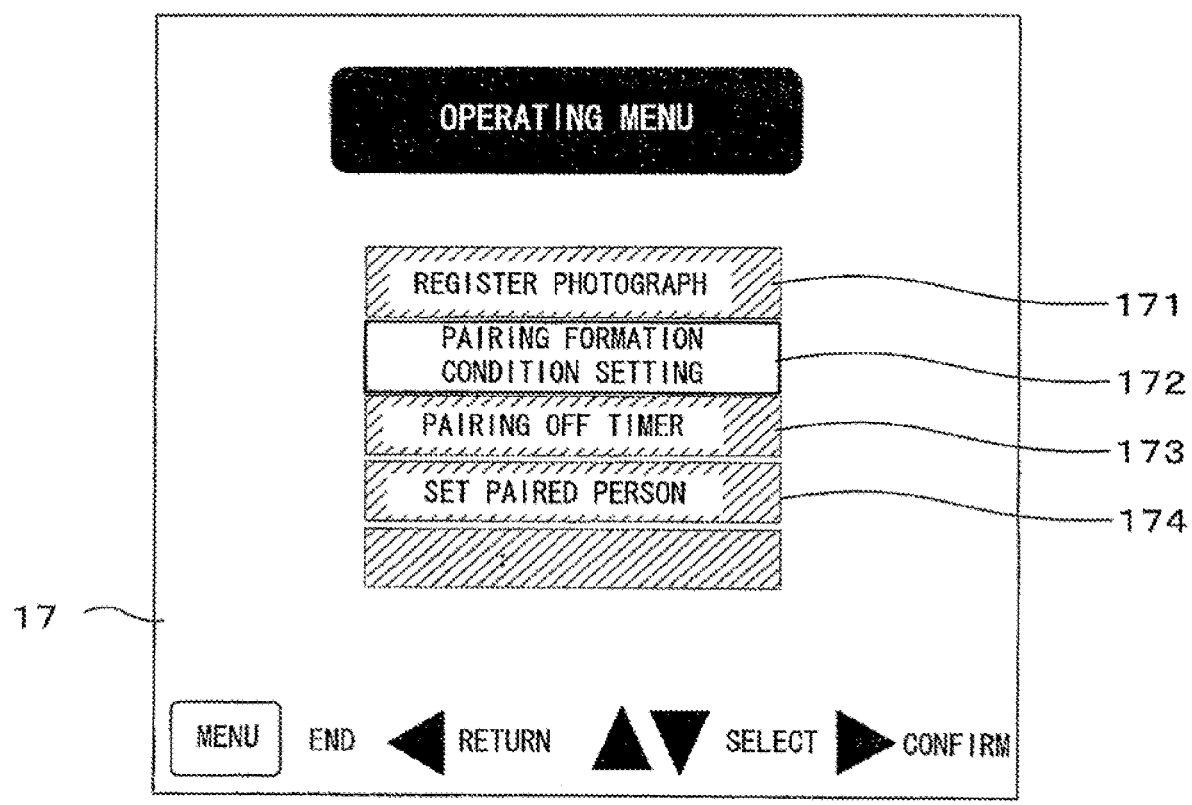
FIG. 3 is a figure showing an example of an operating menu screen.

When the menu switch 23e is operated by being depressed, the CPU 20 displays an "operating menu" screen upon the LCD monitor 17, such as the example shown in FIG. 3. A plurality of items for selection are displayed in this "operating menu", such as for example an item 171 "register photograph", an item 172 "set pairing formation condition", an item 173 "pairing OFF timer", and an item 174 "set paired person". When the cruciform switch 23g is operated by being depressed upwards or downwards while the "operating menu" screen is being displayed, the CPU 20 changes the selected item upwards or downwards according to this operating signal. It should be understood that FIG. 3 shows the example of the state in which the selection item 172 is selected. And when the cruciform switch 23g is operated by being depressed in the confirm direction (rightwards confirmation) in the state in which the item 172 "pairing formation condition setting" is selected, the CPU 20 displays a "pairing formation condition setting" screen upon the LCD monitor 17, as shown by way of example in FIG. 4.

Figure 4:
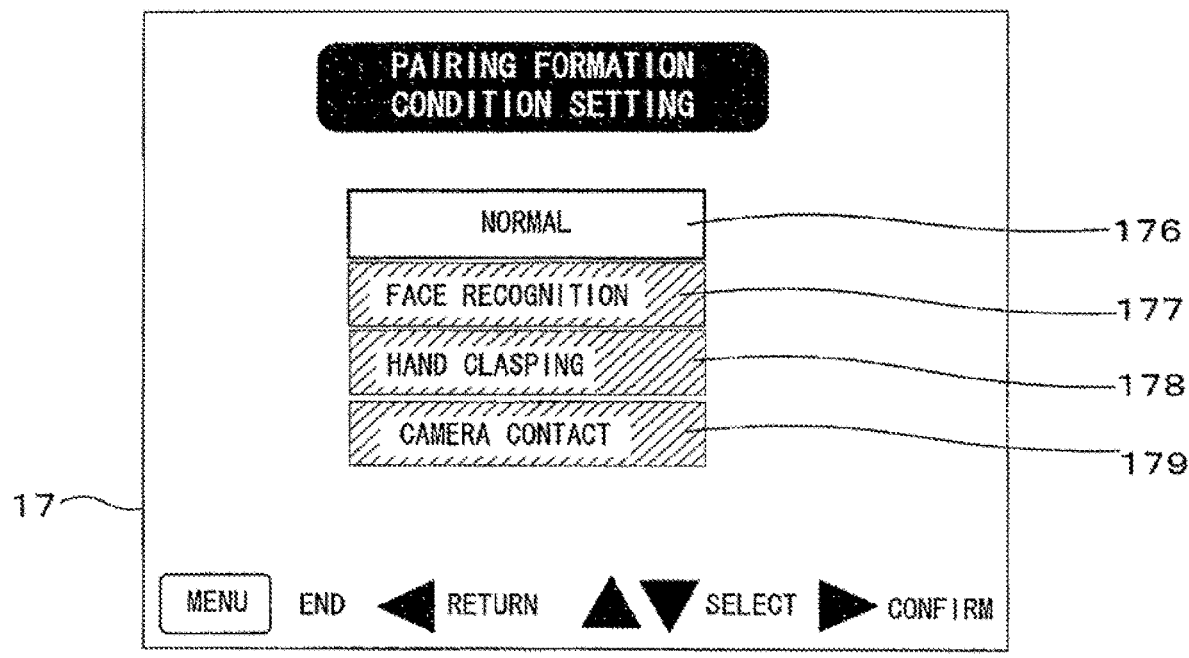
FIG. 4 is a figure showing an example of a screen for setting a pairing formation condition.

In FIG. 4, four items for selection as "pairing formation conditions" are displayed: an item 176 "normal", an item 177 "face identification", an item 178 "hand clasping", and an item 179 "camera contact". When the cruciform switch 23g is operated by being depressed upwards or downwards with the screen shown by way of example in FIG. 4 being displayed, the CPU 20 changes the item selected upwards or downwards according to the operation signal. It should be understood that the state in which the selection item 176 is selected is shown in FIG. 4 as an example. And when the cruciform switch 23g is operated by being depressed in the confirm direction (rightwards confirmation), the CPU 20 sets the item that is selected at this time point as the pairing formation condition.

—Normal—

When the pairing formation condition is set to "normal", the CPU 20 establishes a pairing under the condition that communication is established with the other electronic camera 1. The communication control circuit 2 is set in advance to transmit at a power with which wireless communication can be performed over a predetermined range (for example 10 m). It should be understood that it is arranged for it to be possible to change over this transmitting power in advance by menu operation, so as to limit the communication range stepwise according to command from the CPU 20 (for example, to 3 m, 50 cm, or 3 cm).

Instead of changing over the power at which the communication control circuit 22 transmits, it would also be acceptable to arrange to change over between high and low the decision threshold value for determining whether or not reception by the communication control circuit 22 is taking place while keeping the power transmitted by the communication control circuit 22 constant. In this first embodiment, in either of these cases, the communication between the two electronic cameras 1 is of the non-contact type.

—Face Identification—

The CPU 20 is endowed with a function of detecting a "face" included in the through image, and with a function of determining whether or not this "face" is the "face" of some predetermined person. Since in this first embodiment the "face" of the opposite party is photographed, accordingly the communication between the electronic cameras 1 when identifying this "face" is of the non-contact type. The explanation of this face detection processing and of this face identification processing will be omitted, since it is prior art technology. When the pairing formation condition is set to "face identification", then the CPU 20 establishes a pairing based upon this condition "face identification" after having established communication with the other electronic camera 1. The operation for setting the identity of the person with whom pairing is to be established is performed in advance in the following manner before communication with the other electronic camera 1.

Figure 5:
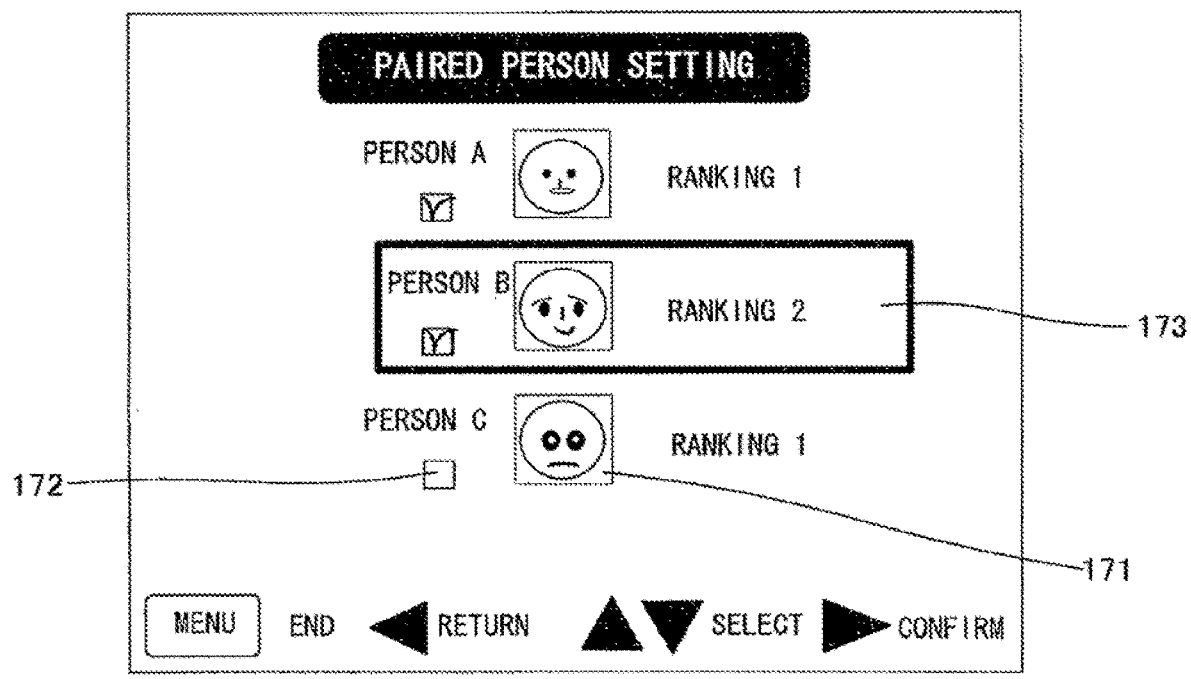
FIG. 5 is a figure showing an example of a paired person setting screen.

When the cruciform switch 23*g* is operated by being depressed in the confirm direction (rightwards confirmation) in the state in which the item 174 "paired person" is selected while the "operating menu" screen (FIG. 3) is being displayed, the CPU 20 displays a "paired person setting" screen upon the LCD monitor 17, as shown by way of example in FIG. 5. From among all of the data for reference recorded (i.e. registered) in the flash memory 19, the CPU 20 reads out thumbnail image data for "faces", and displays these thumbnail images. The data for reference includes thumbnail image data for "faces" and characteristic weight data that has been generated on the basis of that image data. This characteristic weight data is used in the "face identification" described above. The data for reference that is used in "face identification" is recorded (i.e. registered) in advance in the flash memory 19. The procedure for this registration will be described hereinafter.

In FIG. 5, a thumbnail image is displayed for each of the "faces" of persons A, B, and C. A check box is displayed upon the left side of each of these thumbnail images. For example, a check box 172 is displayed upon the left side of the thumbnail image 171.

When the cruciform switch 23*g* is operated by being depressed in the selection direction (i.e. upwards or downwards) with the "paired person setting" screen being displayed, the CPU 20 shifts the display position of the cursor 173 upwards or downwards according to the operation signal. And, when the OK switch 23*h* is operated by being depressed, the CPU 20 causes a check mark to be displayed within the check box that is surrounded by the cursor 173. Moreover, when the OK switch 23*h* is operated by being depressed in the state in which a check mark is displayed in this check box, the CPU 20 causes that check mark displayed within the check box to be removed. And the CPU 20 sets the "faces" for those thumbnail images upon the "paired person setting" screen for which check marks are displayed as subjects for identification.

—Hand Clasping—

When the pairing formation condition is set to "hand clasping", the CPU 20 establishes a pairing based upon the condition in which data is received by the above described human body communication after having established communication with the other electronic camera 1. For example, by a closed circuit that is created when the two users of the electronic camera 1 and the other electronic camera 1 between which communication has been established as described above clasp one another's hands (it is sufficient for their skins to come into mutual contact), a mutual pairing may be established by the electronic cameras 1 sending and receiving predetermined data to one another. In this first embodiment, in this case of hand clasping as well, the communication between the two electronic cameras 1 is of the non-contact type.

—Camera Contacting—

When the pairing formation condition is set to "camera contact", the CPU 20 establishes a pairing based upon the condition in which the two electronic cameras 1 come into direct mutual contact after having established communication with the other electronic camera 1. As described above, the transmission/reception electrodes 22*b* through 22*e* are arranged upon the upper, lower, left, and right portions of the casing of each of the electronic cameras 1, so as to be exposed (see FIG. 2). A large electrical current flows when the electronic cameras 1 come into direct mutual contact at any of these transmission/reception electrodes 22*b* through 22*e*, since the impedance of this closed circuit is low as compared to the case during human body communication. The CPU 20 determines that the electronic cameras 1 are in mutual contact by detecting the occurrence of this signal current via the communication control circuit 22. It should be understood that the communication control circuit 22 is constructed so as to determine which of the transmission/reception electrodes 22*b* through 22*e* are in mutual contact, and so as to inform the CPU 20 thereof.

The flow of processing performed by the CPU 20 for establishing pairing after having changed over to the paired mode will now be explained with reference to the flow chart shown by way of example in FIG. 6. This is an example in which the communication before establishment of communication is by wireless communication. When the CPU 20 of the electronic camera 1 and the CPU of the other electronic camera 1 are changed over to the paired mode, each of them starts a program for performing the processing shown in FIG. 6.

Figure 6:
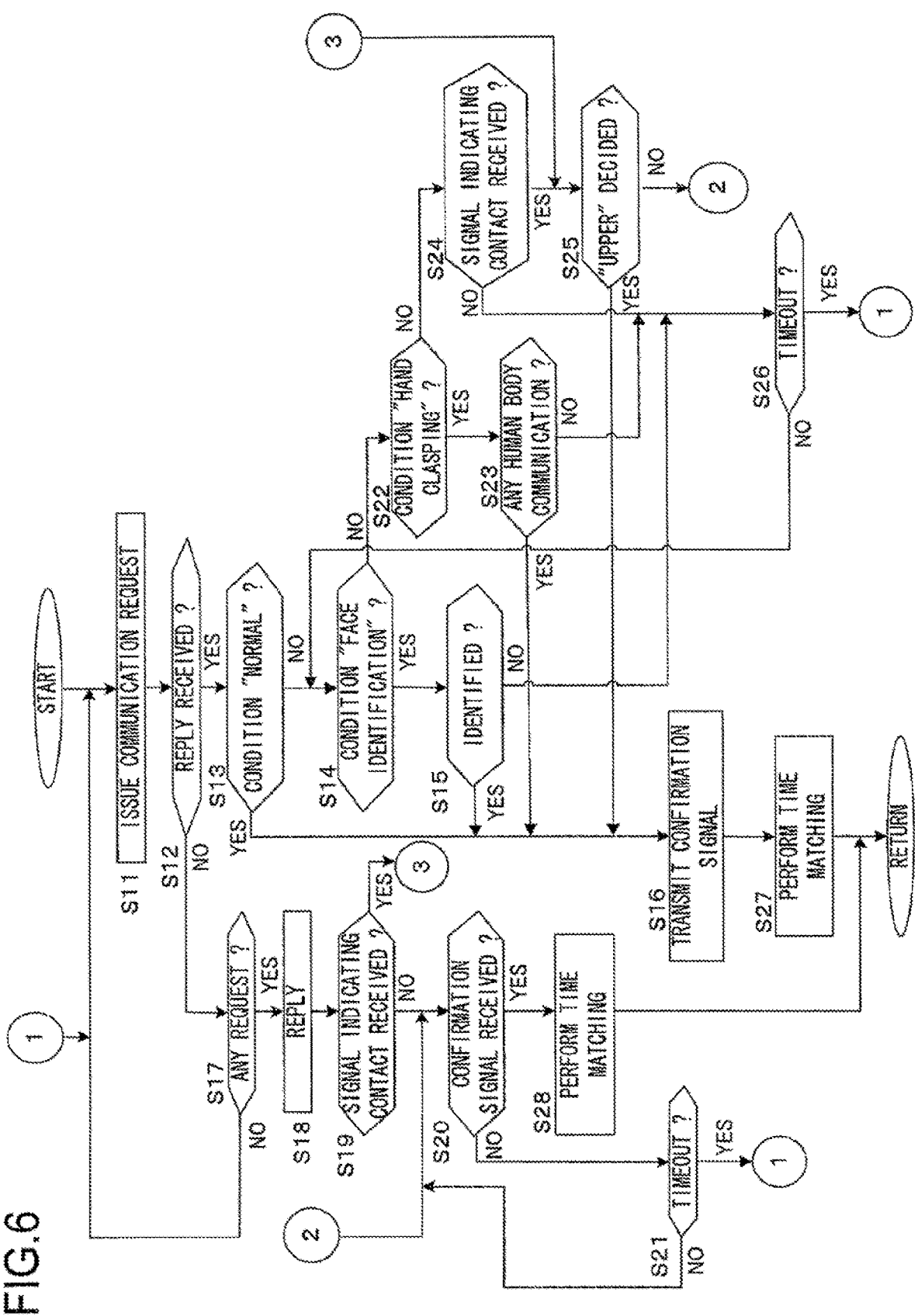
FIG. 6 is a flow chart for explanation of a flow of processing for establishing pairing.

In a step S11 of FIG. 6, the CPU 20 issues a communication request, and then the flow of control proceeds to a step S12. For example, the CPU 20 may send a command to the communication control circuit 22, so as to cause it to transmit a communication request command at a transmission power that can reach another electronic camera 1 that is positioned within the above described range of 10 m. In the step S12, the CPU 20 decides whether or not there has been any reply to this communication request. And if a reply has been received by the communication control circuit 22, then the CPU 20 reaches an affirmative decision in this step S12 and the flow of control proceeds to a step S13. But if no reply has been received, then the CPU 20 reaches a negative decision in this step S12 and the flow of control is transferred to a step S17.

In the step S13, the CPU 20 makes a decision as to whether or not the pairing formation condition is "normal". And, if the pairing formation condition is set to "normal", then the CPU 20 reaches an affirmative decision in this step S13 and the flow of control is transferred to a step S16. But if the pairing formation condition is not set to "normal", then the CPU 20 reaches a negative decision in this step S13 and the flow of control is transferred to a step S14.

In the step S16, along with the CPU 20 sending a command to the communication control circuit 22 and causing it to transmit a confirmation signal to the other electronic camera 1, it also increments by one a counter that counts the number of times of pairing formation with the other electronic camera 1 that is the recipient, and then the flow of control is transferred to a step S27. The confirmation signal is a signal that the "parent machine" sends to the "child machine" in the pairing. Here the establishment of pairings for the various IDs is managed by including identification information for the communication requesting side (for example, the ID of the electronic camera 1) in the above described communication request, and by including identification information for the replying side (the ID of the other electronic camera 1) in the above described reply.

In this first embodiment, the "parent machine" and the "child machine" are determined in the following manner. If the pairing formation condition is set to "normal" (an affirmative decision in the step S13), then the electronic camera 1 that has initially transmitted the communication request (in the step S11) is taken as being the "parent machine" in the pairing, while the electronic camera 1 that has replied to this communication request (in a step S18) is taken as being the "child machine" in the pairing. And if the pairing formation condition is set to "face recognition" (an affirmative decision in the step S15), then the electronic camera 1 that has performed the "face identification" is taken as being the "parent machine" in the pairing, while the electronic camera 1 that has been "face identified" is taken as being the "child machine" in the pairing. Moreover, if the pairing formation condition is set to "hand clasping" (an affirmative decision in the step S23), then the electronic camera 1 that has initially transmitted a command and data via the closed circuit via the human body communication described above is taken as being the "parent machine" in the pairing, while the electronic camera 1 that has received this command and data is taken as being the "child machine" in the pairing. The determination of the "parent machine" and the "child machine" in the case of "camera contact" will be described hereinafter.

In the step S27 the CPU performs time matching, and then the processing of FIG. 6 terminates. This time matching may, for example, be performed by matching the time of the "child machine" to the time of the "parent machine". In concrete terms, the CPU 20 sends a command to the communication control circuit 22, and causes it to transmit time information to the other electronic camera 1. Due to this, it is possible to transmit the time information for the "parent machine" to the "child machine", so as to synchronize their times together. Upon the termination of the processing of FIG. 6, the paired relationship between the "parent machine" and the "child machine" becomes effective. And, after the formation of this pairing, counting of time is started by both the "parent machine" and the "child machine", whose times have been matched together. The CPU 20 performs predetermined processing while a pairing is established. The processing while a pairing is established will be described hereinafter.

In the step S14, the CPU 20 makes a decision as to whether or not the pairing formation condition is "face identification". And, if the pairing formation condition is set to "face identification", then the CPU 20 reaches an affirmative decision in this step S14 and the flow of control is transferred to a step S15. But if the pairing formation condition is not set to "face identification", then the CPU 20 reaches a negative decision in this step S14 and the flow of control is transferred to a step S22.

In the step S15, the CPU 20 makes a decision as to whether or not "face identification" has been performed. If a face that is registered has been identified, then the CPU 20 reaches an affirmative decision in this step S15 and the flow of control proceeds to a step S16, whereas, if no face that is registered has been identified, then the CPU 20 reaches a negative decision in this step S15 and the flow of control is transferred to a step S26. It should be understood that, along with reproducing and displaying the through image that is used for this "face identification" upon the LCD monitor 17 in real time, if the CPU 20 has performed "face identification", then it provides a display superimposed upon the through image showing that "face" (for example, by displaying a frame surrounding the "face", or the like). And, if the CPU 20 has identified a plurality of faces, then it may, for example, choose the largest one of those faces (i.e. the one that occupies the maximum proportion of the through image).

In the step S22, the CPU 20 makes a decision as to whether or not the pairing formation condition is "hand clasping". And, if the pairing formation condition is set to "hand clasping", then the CPU 20 reaches an affirmative decision in this step S22 and the flow of control is transferred to a step S23. But if the pairing formation condition is not set to "hand clasping", then the CPU 20 reaches a negative decision in this step S22 and the flow of control proceeds to a step S24.

If in the step S23 a signal indicating that predetermined data has been received via human body communication is transmitted from the communication control circuit 22, then the CPU 20 reaches an affirmative decision in this step S23, and the flow of control is transferred to the step S16. But if no signal indicating that predetermined data has been received via human body communication is transmitted from the communication control circuit 22, then the CPU 20 reaches a negative decision in this step S23, and the flow of control is transferred to the step S26. It should be understood that, in this first embodiment, it is arranged to send data that indicates that pairing formation is possible when a closed circuit is formed by human body communication.

In the step S24, the CPU 20 makes a decision as to whether or not any signal indicating mutual contact of the electronic cameras 1 has been received from the communication control circuit 22. If a signal indicating mutual contact of the electronic cameras 1 is inputted from the communication control circuit 22, then the CPU 20 reaches an affirmative decision in this step S24, and the flow of control proceeds to a step S25. But if no such signal indicating mutual contact is inputted, then the CPU 20 reaches a negative decision in this step S24 and the flow of control is transferred to the step S26.

In the step S25, the CPU 20 performs "upper" determination processing. This "upper" determination is a decision as to which of the electronic cameras 1 is positioned more upwards when the electronic cameras 1 come into mutual contact. In this first embodiment, the camera that is positioned more upwards against the direction of gravity is taken as being the "upper" one.

The CPU 20 makes the "upper" decision by referring to the decision table shown by way of example in FIG. 7, on the basis of the direction of gravity based upon the detection signal from the attitude sensor 24 and on the basis of a signal from the communication control circuit 22. As an example, the case will now be explained in which the electronic camera 1 is held in a vertical position (i.e. with its right side downwards), and the upper surface of the other electronic camera 1 (that is in the upright position) is contacted against this right side. Since the transmit/receive electrode 22*d* is the one that is furthest along the direction of gravity, and since the electrode that is contacted is this transmit/receive electrode 22*d*, accordingly the CPU 20 of the electronic camera 1 reaches the decision of "upper". In this first embodiment, the machine in the pairing for which "upper" has been decided is taken as being the "parent machine", while the machine in the pairing for which "lower" has been decided is taken as being the "child machine". On the other hand, the CPU of the other electronic camera 1 that has come into contact with the electronic camera 1 described above reaches the decision of "lower", since (in the upright position) its transmit/receive electrode 22*c* is the one that is furthest downwards along the direction of gravity, and since its electrode that is contacted is the transmit/receive electrode on its upper surface (i.e. the transmit/receive electrode 22*b*).

If a decision of "upper" has been made, then the CPU 20 arrives at an affirmative decision in the step S25, and the flow of control is transferred to the step S16. But if the CPU 20 has not made a decision of "upper", then it arrives at a negative decision in the step S25, and the flow of control is transferred to a step S20. This transfer to the step S20 is in order to stand by for a confirmation signal from the "parent machine" as being a "child machine".

In the step S26, the CPU 20 makes a decision as to whether or not a timeout has occurred. If a predetermined timeout period (for example one minute) has elapsed, then the CPU 20 reaches an affirmative decision in this step S26, the flow of control returns to the step S1 and repeats the processing described above. But if the above described timeout period has not elapsed, then the CPU 20 reaches a negative decision in this step S26, and the flow of control returns to the step S14 and repeats the processing described above.

If a negative decision has been reached in the step S12, then in the step S17 the CPU 20 decides whether or not there is any communication request from another electronic camera 1. If a communication request command has been received by the communication control circuit 22, then the CPU 20 reaches an affirmative decision in this step S17 and the flow of control proceeds to a step S18. But if no communication request command has been received by the communication control circuit 22, then the CPU 20 reaches a negative decision in this step S17 and the flow of control returns to the step S11.

In the step S18 the CPU makes a reply, and then the flow of control proceeds to a step S19. For example, the CPU 20 may send a command to the communication control circuit 22, and cause it to make a reply to the other electronic camera 1. In the step S19, the CPU 20 makes a decision as to whether or not a signal indicating a contact has been received. If a signal indicating mutual contact with another electronic camera 1 is inputted from the communication control circuit 22, then the CPU 20 reaches an affirmative decision in this step S19 and the flow of control is transferred to the step S25, whereas if no signal indicating such mutual contact is inputted, then the CPU 20 reaches a negative decision in this step S19 and the flow of control proceeds to a step S20.

In this step S20, the CPU 20 makes a decision as to whether or not a confirmation signal has been received from the other electronic camera 1 by the communication control circuit 22. If such a confirmation signal has been received, then the CPU 20 reaches an affirmative decision in this step S20 and also establishes a pairing, and then the flow of control is transferred to the step S28. But if no confirmation signal has been received, then the CPU 20 reaches a negative decision in this step S20, and the flow of control proceeds to a step S21.

In the step S28 the CPU performs time matching, and then the processing of FIG. 6 terminates. This time matching is performed by matching the time to the time information transmitted from the "parent machine". Upon the termination of the processing of FIG. 6, the paired relationship between the "child machine" and the "parent machine" becomes effective.

In the step S21, the CPU 20 makes a decision as to whether or not a timeout has occurred. If a predetermined timeout period (for example one second) has elapsed, then the CPU 20 reaches an affirmative decision in this step S21, and returns the flow of control to the step S11 and repeats the processing described above. But if the above described timeout period has not elapsed, then the CPU 20 reaches a negative decision in this step S21, and the flow of control returns to the step S20 and the processing described above is repeated. It should be understood that, if the pairing formation condition is "hand clasping", then the transmission of the confirmation signal in the step S16 may be transmitted by human body communication.

Apart from being terminated due to manual operation (for example, by paired mode cancellation due to the mode switch 23*d* being operated by being depressed), a pairing that has become established as explained above may end automatically due to an OFF timer that has been set in advance. Moreover, it would also be acceptable to arrange to end the pairing automatically if at least one of the following cases (1) through (4) occurs.
  (1) When the vacant capacity of the storage medium 51 is less than some predetermined vacant capacity.
  (2) When information indicating that the vacant capacity of the storage medium 51 on the side of the other electronic camera 1 is less than some predetermined vacant capacity has been acquired by communication to the effect.
  (3) When the remaining capacity of the battery 52 is less than some predetermined remaining capacity.
  (4) When information indicating that the remaining capacity of the battery 52 on the side of the other electronic camera 1 is less than some predetermined remaining capacity has been acquired by communication to the effect.

Furthermore, it would also be acceptable to arrange to set the time for staying in the paired mode, and/or the number of still image frames that can be photographed and the image mode in the paired mode (i.e. the number of pixels recorded, such as high image quality, standard, economy, or the like), and/or the photographic time and the frame rate during movie photography in the paired mode, according to information about at least one of the vacant capacities of the storage mediums 51 of the two electronic cameras 1, and the remaining capacities of their batteries 52. It should be understood that the pairing also terminates when the distance between the electronic camera 1 and the other electronic camera 1 becomes outside the above described communication range. When the pairing terminates, the CPU 20 stores in the flash memory 19, in correspondence with the ID of each electronic camera 1, identification information of the opposite party with which the pairing was established (for example, the ID of the electronic camera 1), the number of times that pairing has been established with this opposite party electronic camera 1, and the cumulative time interval of pairing with this opposite party electronic camera 1.

Figure 8:
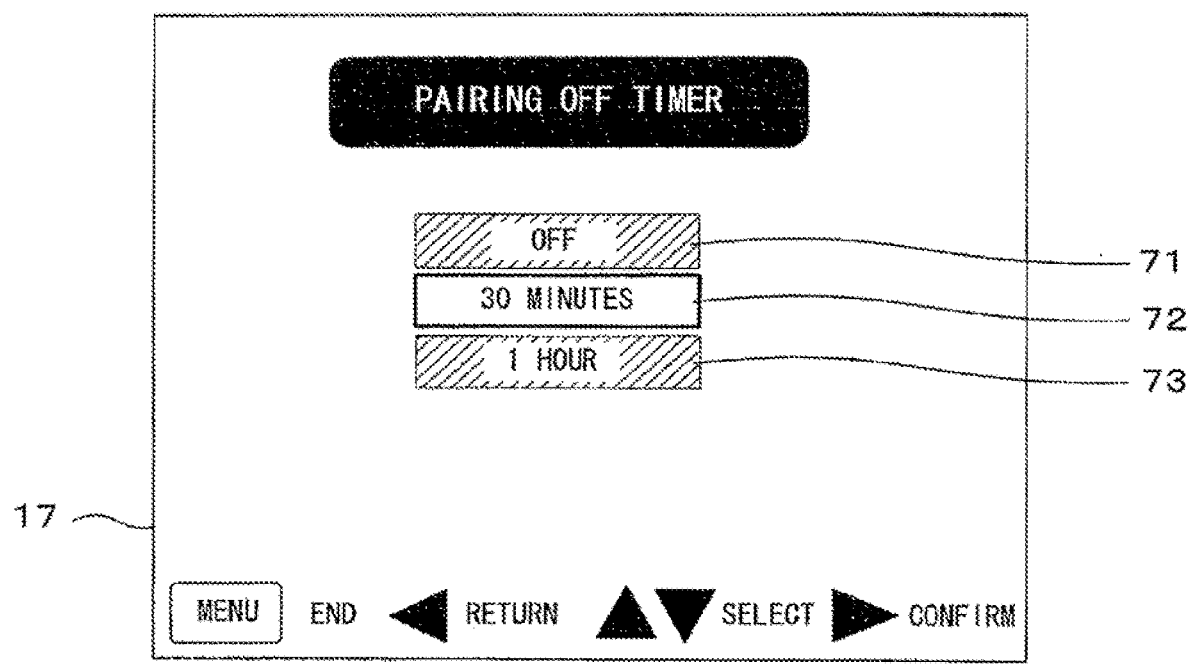
FIG. 8 is a figure showing an example of a pairing OFF timer setting screen.

Now, the procedure for setting the pairing OFF timer will be explained with reference to FIG. 8. When the cruciform switch 23g is operated by being depressed in the confirm direction (rightwards confirmation) in the state in which the item 173 "pairing OFF timer" is selected during the display of the "operating menu" screen (FIG. 3), then the CPU 20 displays a "pairing OFF timer" setting screen upon the LCD monitor 17, as shown in FIG. 8. And when the cruciform switch 23g is operated by being depressed in the selection direction (i.e. upwards or downwards) while this "pairing OFF timer" setting screen is being displayed, the CPU 20 changes the selected item upwards or downwards according to this operating signal. FIG. 8 shows the state in which an item 72 is being selected. And, when the cruciform switch 23g is operated by being depressed in the rightwards direction, the item that is being selected at this time point is confirmed.

If the item 71 "OFF" is confirmed, then the CPU 20 performs termination of the pairing by the above described manual pairing cancellation operation. And if the item 72 "30 minutes" is confirmed, then the CPU 20 performs termination of the pairing according to whichever comes first: paired mode cancellation operation, and the lapse of thirty minutes from when the paired mode started. The time that pairing starts corresponds to the time point at which time matching was performed in the step S27. Moreover, if the item 73 "1 hour" is confirmed, then the CPU 20 performs termination of the pairing according to whichever comes first: paired mode cancellation operation, and the lapse of one hour from when the paired mode started.

—Photograph Registration Processing—

The processing for recording (i.e. registering) data for reference to be used for "face identification" in the flash memory 19 will now be explained. When the cruciform switch 23g is operated by being depressed in the rightwards direction in the state in which the item 171 "register photograph" is being selected upon the "operating menu screen" (FIG. 3) that is being displayed upon the LCD monitor 17, then the CPU 20 starts a program for performing this photograph registration processing.

Figure 9:
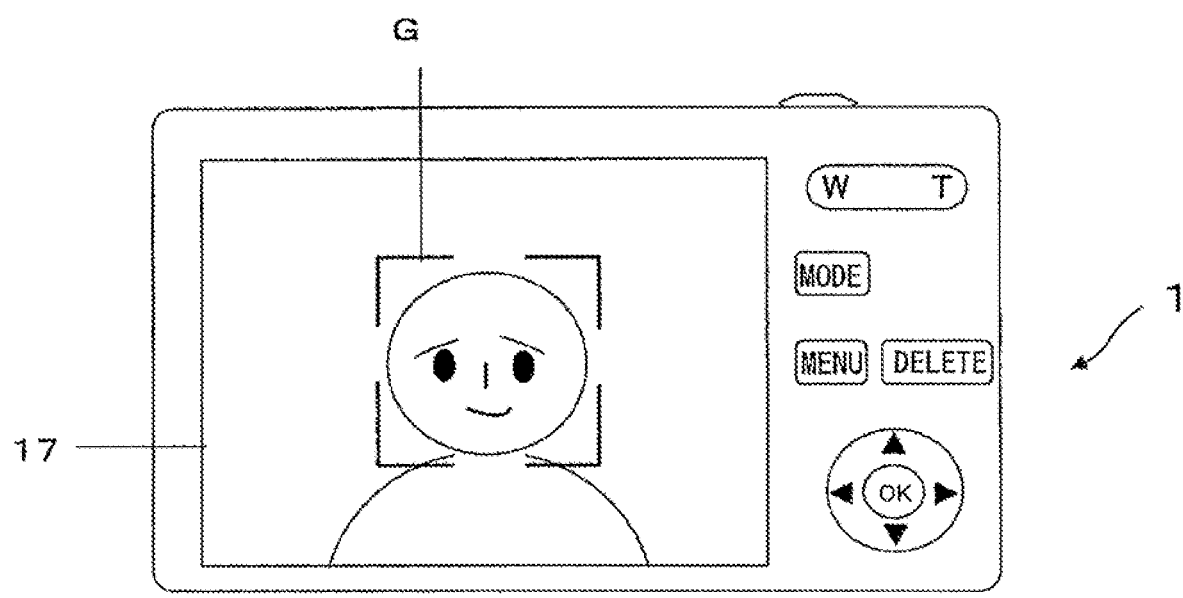
FIG. 9 is a figure showing an example of a screen that is displayed during photograph registration processing.

Having started the photograph registration program, the CPU 20 displays an assistance frame G upon the LCD monitor 17. FIG. 9 is a figure for explanation of an example of this display upon the LCD monitor 17. The CPU 20 displays an image based upon the most recent through image data stored in the RAM 18 upon the LCD monitor 17, and also displays the assistance frame G superimposed over the image that is being displayed. The photographer aims the electronic camera 1 so that the face of the person who is the photographic subject and whom he desires to register is surrounded by the assistance frame G.

Upon receipt of an operating signal to end photograph registration processing (for example an operating signal from the menu switch 23e), the CPU 20 stops the display of the assistance frame G and terminates the photograph registration processing. One the other hand, if no operating signal to end photograph registration processing (for example an operating signal from the menu switch 23e) is received, then the CPU 20 makes a decision as to whether or not the release switch is ON. If the release button 23a has been full depress actuated, then the CPU 20 performs photographic processing.

And the CPU 20 makes a decision as to whether or not the image data that has been acquired by this photographic processing can be used for face identification. The CPU 20 performs face detection processing on the basis of the data among the image data that corresponds to the interior of the assistance frame G, and makes a decision as to whether or not this face is a face that is registered if a face has been detected. In concrete terms, by performing face identification processing on the basis of the image data for the region of the face that has been detected and the data for reference corresponding to the "faces" of the thumbnail images that are registered in the flash memory 19, the CPU 20 identifies whether or not the person whose face has been detected is the same person as one of the people whose faces are already included in the data for reference.

If this is a face that is already registered, then the CPU 20 displays, for example, "already registered" upon the LCD monitor 17. On the other hand, if this is not a face that is already registered, then the CPU 20 records data for reference in the flash memory 19 as the "face" of a new person. In concrete terms, the CPU 20 creates thumbnail image data on the basis of the image data that corresponds to the interior of the assistance frame G, and creates characteristic weight data on the basis of the above described image data. And the CPU 20 records data for reference in the flash memory 19, including the thumbnail image data and the characteristic weight data. Due to this, data for reference is registered, such as that for the person B upon the paired person setting screen (see FIG. 5).

—Deletion of Data for Reference—

Data for reference that is recorded (i.e. registered) in the flash memory 19 can be deleted in the following manner. When the delete switch 23f is operated by being depressed in the state in which the paired person setting screen (FIG. 5) is being displayed upon the LCD monitor 17, the CPU 20 takes the data for reference related to the person who currently is being designated by the cursor 173 as the subject for deletion.

For the person B who is surrounded by the cursor 173, the CPU 20 displays a message upon the LCD monitor 17 such as, for example "Delete data for person B?". And, when the delete switch 23f is operated by being depressed for a second time, the CPU 20 deletes from the flash memory 19 the data for reference that includes the thumbnail image data that is being displayed and the corresponding characteristic weight data. Due to this, the display for the person B is deleted from the paired person setting screen (FIG. 5).

—Processing while a Pairing is Established—

1. Image Viewing

While a pairing is established, for a file folder that has been set in advance to be shared, the CPU 20 makes it possible to view its contents from the electronic camera 1 on the opposite side via wireless communication (if the pairing formation condition is set to "hand clasping", then via wireless communication or via the human body (a closed circuit created by the above described "hand clasping" or the like)). In this first embodiment, this viewing is reproduction display upon the LCD monitor 17 of images that are reproduced according to image data received from the opposite party electronic camera 1 in pairing formation, and is different from recording and storing received image data in the non-volatile memories (i.e. the flash memory 19 and the storage medium 51) within the electronic camera 1. The sharing setting may, for example, be performed by a setting item included in the "operating menu" such as shown by way of example in FIG. 3.

Figure 10:
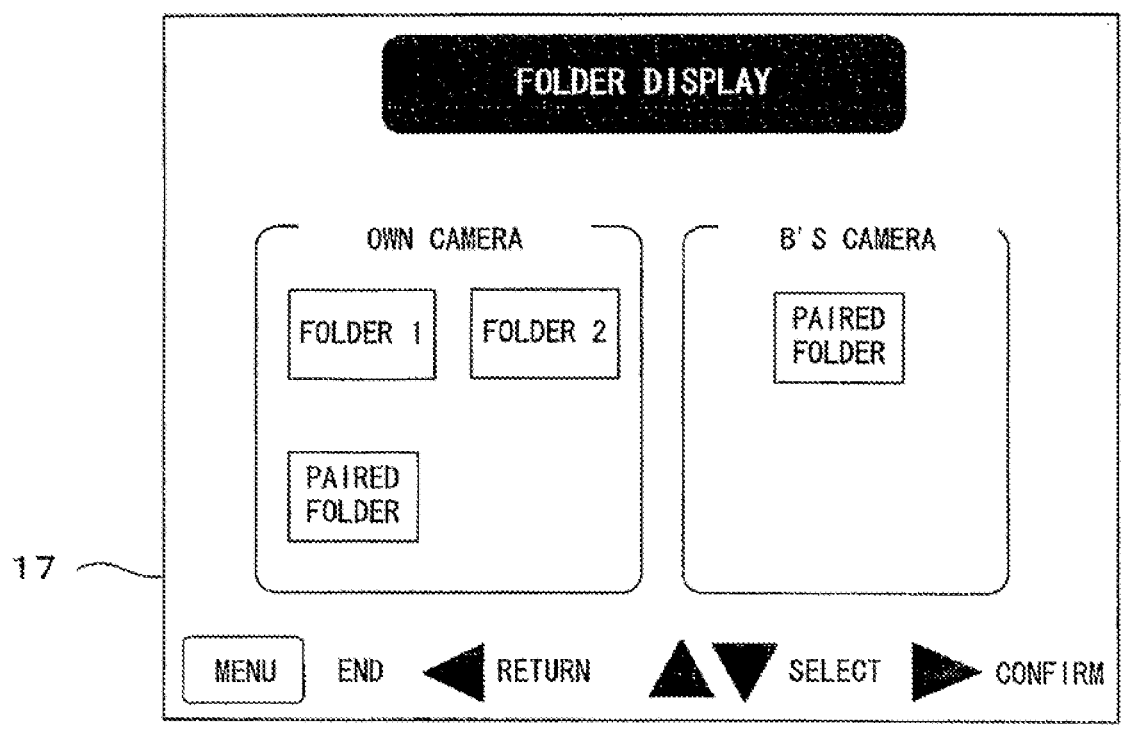
FIG. 10 is a figure showing an example of a "folder display" screen upon a "parent machine"

FIG. 10 shows an example of a "folder display" screen that is displayed upon the LCD monitor 17 of Mr. X's electronic camera 1, in this case this electronic camera 1 being the "parent machine". In FIG. 10, the folders within the holder's own camera (i.e. within Mr. X's camera) are displayed. The "paired folder" on the holder's "own camera"

is a folder for which viewing is permitted by the opposite party in the pairing (in this example on Mr. B's electronic camera, that being the "child machine") while the pairing is established. The image files that are registered within this "paired folder" on the holder's "own camera" can be read from Mr. B's electronic camera, that is the "child machine", via the wireless communication that is established (if the pairing formation condition is set to "hand clasping", via wireless communication or human body communication).

In FIG. 10, a folder within Mr. B's electronic camera 1 is also displayed, this being the "child machine". The "paired folder" on the side of "Mr. B's camera" is a folder for which viewing by the opposite party to the pairing during pairing formation (in this example by Mr. X's electronic camera 1, that being the "parent machine") is permitted.

Figure 11:
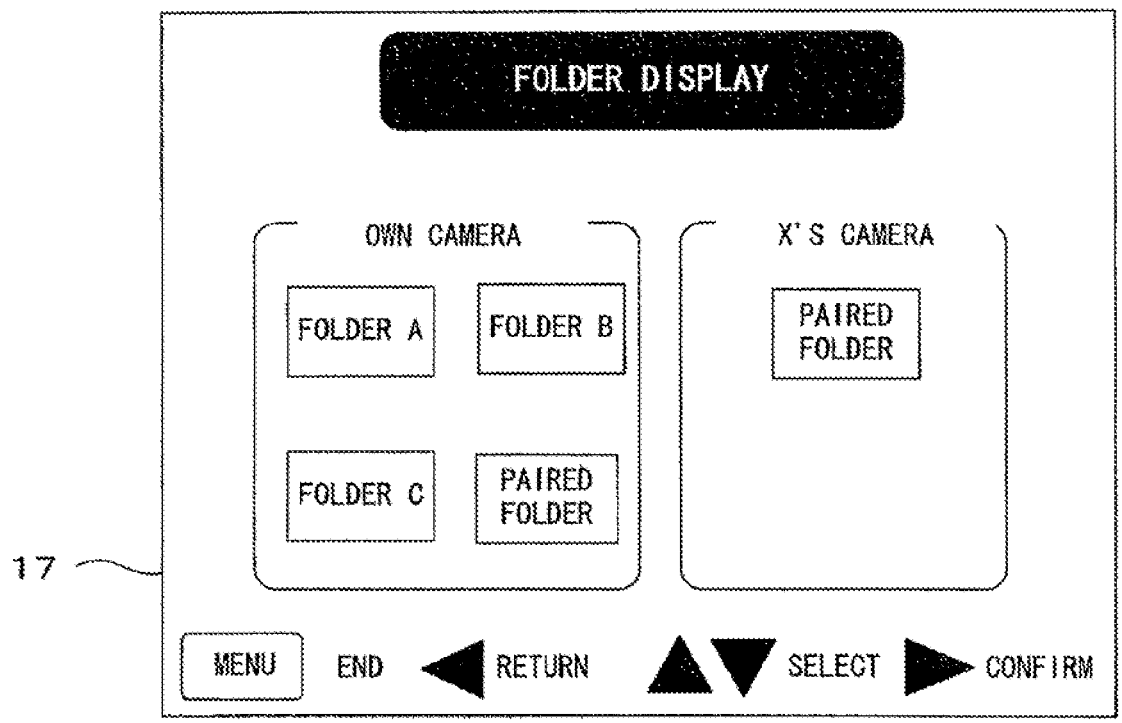
FIG. 11 is a figure showing an example of a "folder display" screen upon a "child machine"

FIG. 11 is an example of a "folder display" screen that is displayed upon the LCD monitor of Mr. B's electronic camera 1, this being the "child machine". In FIG. 11, the folders within the holder's own camera (i.e. within Mr. B's camera) are displayed. The "paired folder" on the holder's "own camera" is a folder for which viewing is permitted by the opposite party in the pairing (in this example on Mr. X's electronic camera, that being the "parent machine") while a pairing is established. The image files that are registered within this "paired folder" on the holder's "own camera" can be read from Mr. X's electronic camera 1, that is the "parent machine", via the wireless communication that is established (if the pairing formation condition is set to "hand clasping", via wireless communication or human body communication).

In FIG. 11, a folder within Mr. X's electronic camera 1 is also displayed, this being the "parent machine". The "paired folder" on the side of "Mr. X's camera" is a folder for which viewing by the opposite party to the pairing during pairing formation (in this example by Mr. B's electronic camera 1, that being the "child machine") is permitted.

While a pairing is established, the electronic camera 1 is able to read all the folders on the "own camera" side, and also the "paired folder" on the side of "Mr. OO's camera" that is the opposite party in the pairing. When folder selection operation is performed (i.e. when selection is performed by depressing the cruciform switch 23g to operate it, and confirmation is performed by depressing the OK switch 23h to operate it), then the CPU 20 displays upon the LCD monitor 17 the thumbnail images for the image files recorded within the folder that has been selected and confirmed.

Figure 12:
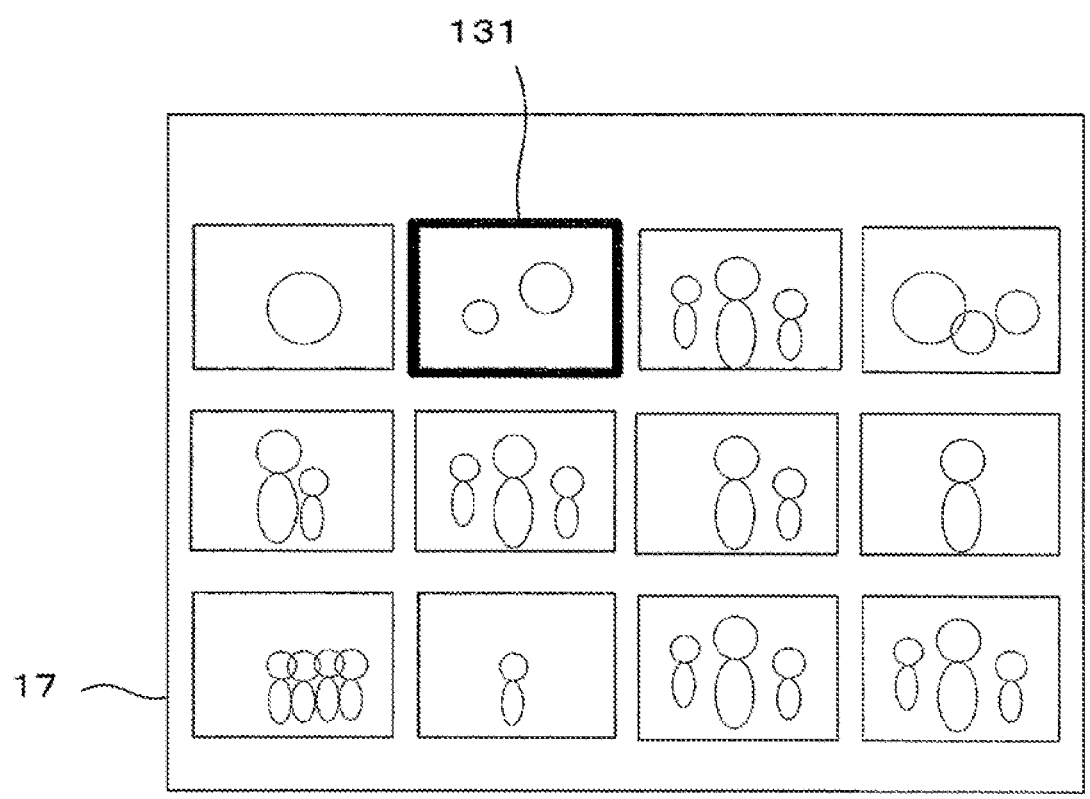
FIG. 12 is a figure showing an example of a thumbnail list display.

FIG. 12 is a figure showing an example of such a thumbnail list display. A cursor 131 is displayed over one of a plurality of thumbnails. The cursor position can be shifted freely upwards, downwards, leftwards, and rightwards by thumbnail selection operation (i.e. by operation of the cruciform switch 23g by depressing it). When the OK switch 23h is operated by being depressed, the CPU 20 displays a reproduced image corresponding to the thumbnail image at which the cursor is positioned at this time point, full screen upon the LCD monitor 17.

2. Assigning Ranking to a Pairing

The CPU 20 performs assignment of rankings to information about the opposite parties for whom pairings have become established (i.e. to the identification information for their electronic cameras 1). These rankings may be divided, for example, into three levels from low to high. The CPU 20 on the "parent machine" side assigns rankings according to the number of times of pairing formation and the cumulative time period of pairing with the opposite party (in this example, the electronic camera 1 specified by the identification information) with whom pairing has become established. The number of times of pairing formation and the cumulative time period of pairing, used in this decision as to whether or not to raise or lower a ranking, are set in advance for the electronic camera 1, and their set contents are stored in the flash memory 19. Changing of the setting for the number of times of pairing formation and the cumulative time period of pairing stored in the flash memory 19 may, for example, be performed by the setting items included in the "operating menu" shown by way of example in FIG. 3. For example, if either the number of times of pairing formation reaches and exceeds 20 times, or the cumulative time period of pairing reaches and exceeds 8 hours, then the CPU 20 on the "parent machine" side may change the ranking from ranking-1 to ranking-2, and may store the changed contents in the flash memory 19 in correspondence with the identification information for the opposite party for pairing formation.

Furthermore, if either the number of times of pairing formation reaches and exceeds 50 times, or the cumulative time period of pairing reaches and exceeds 20 hours, then the CPU 20 on the "parent machine" side may change the ranking from ranking-2 to ranking-3, and may store the changed contents in the flash memory 19 in correspondence with the identification information for the opposite party for pairing formation. Generally, it is often the case that an opposite party for whom the frequency of pairing establishment is high is a person whose degree of intimacy with the user is high, such as an opposite party who is mutually well known and can be relied upon, or a person who is close such as a family member or partner or the like. By separating the rankings according to the actual results of pairing, it is possible to group the opposite parties to pairing automatically according to their degrees of intimacy.

3. Processing According to Ranking

While a pairing is established with an opposite party whose ranking is 1 (in this example, an electronic camera 1 that is specified by identification information), as described above, for a file folder that has been set in advance to be shared, the CPU 20 is able to read its contents from the electronic camera 1 on the side of the opposite party via wireless communication (if the pairing formation condition is set to "hand clasping", via wireless communication or human body communication). In this case, the CPU 20 only makes it possible to view photographic images that have been photographed while a pairing is established, but does not include photographic images that were photographed when pairing was not established in the subjects for viewing from the opposite party.

Moreover, while a pairing is established with an opposite party whose ranking is 2 (in this example, an electronic camera 1 that is specified by identification information), the CPU 20 not only includes in the subjects for viewing from the opposite party those photographic images included in a file folder that has been set in advance to be shared that have been photographed while a pairing is established, but also includes as subjects for viewing photographic images included in that file folder that is set to be shared that were photographed when pairing was not established.

Yet further, while a pairing is established with an opposite party whose ranking is 3 (in this example, an electronic camera 1 that is specified by identification information), the CPU 20 not only permits viewing of all of the images that are included in a file folder that is set to be shared, but also permits them to be copied. In this embodiment, copying means reproduction of a photographic image that is included in the file folder on the side of the electronic camera 1 that is the opposite party in pairing formation, and recording and storage thereof in a file folder on the side of one's own electronic camera 1.

It is arranged for it to be possible to raise or to lower the ranking for an opposite party to pairing formation by manual operation. When due to an operation signal from the operating members 23 an operation signal that specifies raising or lowering of a ranking is inputted, change of the ranking can be performed within the range of ranking-1 through ranking-3. In this case as well, the CPU 20, along with storing the changed contents in the flash memory 19 in correspondence with the identification information for the opposite party in pairing formation, also performs viewing limitation or copying limitation according to the ranking after change. The ranking information is transmitted from the "parent machine" to the "child machine", and is managed by the "parent machine".

If there is some rivalry between the automatic change of the ranking corresponding to the number of times of pairing formation and the cumulative time period of pairing formation as described above, and the change of ranking due to manual operation, then the change due to manual operation takes priority. It should be understood that, if due to an operation signal from the operating member 23 an operation signal that indicates raising or lowering of the ranking is inputted, then the CPU 20 sends a signal that requests change of the ranking to the side of the opposite party to pairing formation. And the CPU 20 performs the change of ranking only if a signal that indicates that the change is OK has been returned, but does not perform the change of ranking if no signal that indicates that the change is OK is returned On the other hand, a CPU 20 that has received a signal indicating a request for a change of ranking from the opposite party to pairing formation displays a message "Ranking change request received. OK to change ranking?" upon the LCD monitor 17. And the CPU 20 transmits a signal indicating that this change of ranking is OK to the side of the opposite party to pairing formation, only if it has received an operation signal indicating that the change is OK from the operating members 23.

4. Filter Processing During Viewing

The CPU 20 changes the display resolution during viewing according to the level of the ranking. When viewing the image recorded on the "child machine" side and displaying it reproduced upon the LCD monitor on the "parent machine" side, the "parent machine" in pairing formation performs low pass filter processing that differs according to the ranking. In other words, the CPU 20 changes the display resolution so as to provide viewing at lower resolution the lower the ranking is, and viewing at higher resolution the higher the ranking is. In a similar manner in the case of the "child machine", it changes the display resolution when viewing the image recorded on the "parent machine" side and displaying it reproduced upon the LCD monitor on the "child machine" side. In other words, the CPU 20 changes the display resolution by performing low pass filter processing that differs according to the ranking, so as to provide viewing at lower resolution the lower the ranking is, and viewing at higher resolution the higher the ranking is.

It should be understood that, during this filter processing at the time of viewing, apart from the above, the CPU 20 also performs low pass filter processing according to the state of communication between the electronic cameras 1 as detected by the wireless communication circuit. As examples of the communication state, there may be cited the strength of the communication between the electronic cameras 1, or the volume of signal transmitted per unit time. To give the example of the communication strength, the CPU 20 may change the display resolution so as to provide lower resolution viewing the lower the communication strength is, and so as to provide higher resolution viewing the higher the communication strength is. In a similar manner for the "child machine" in pairing formation, the display resolution for the image may be changed when viewing an image that is recorded upon the "parent machine" side and displaying a reproduction thereof upon the LCD monitor on the "child machine" side. In other words, by performing low pass filter processing that is different according to the communication strength, the CPU 20 may change the display resolution so as to provide lower resolution viewing the lower the communication strength is, and so as to provide higher resolution viewing the higher the communication strength is. By providing this structure it becomes possible for the user to determine in a simple and easy manner whether the two electronic cameras 1 are close together or are far apart, according to the resolution of the image that is displayed as a reproduction upon the LCD monitor.

5. Photography

While a pairing is established, it is possible to perform either normal photography in which each of the electronic camera 1 on the "parent machine" side and the electronic camera 1 on the "child machine" side performs photographic processing by itself singly, or cooperative photography in which the electronic camera 1 on the "parent machine" side and the electronic camera 1 on the "child machine" side operate in cooperation to perform photographic processing. The setting for whether to perform normal photography or to perform cooperative photography may be made by a setting item included in advance in the "operating menu" shown by way of example in FIG. 3.

—Normal Photography—

The CPU 20 performs photography on the basis of actuation of the release button 23a (see FIG. 2). And the CPU 20 creates an image file in the Exif format including image data and photographic information on the basis of information before the photographic processing and the image data acquired by the photographic processing. In this image file in the Exif format, it is arranged to embed data such as a thumbnail image and photographic information and so on, along with the image data in the JPEG image format. The CPU 20 records this image file in the storage medium 51.

The structure of the image file in Exif format includes a header region in which information related to the image is recorded and an image data region in which the photographic image data is recorded. The CPU 20 records in the header region within the image file (i.e. the tag region) information that indicates that this is an image that was photographed while a pairing was established. This information that indicates that this is an image that was photographed while a pairing was established includes identification information for the opposite party in the pairing and information about the time point of photography based upon the time counted after time matching.

Instead of recording the information that indicates that this is an image that was photographed while a pairing was established in the header region of the image file, it would also be acceptable to record it as a separate file in correspondence with the image file. Processing for the above described normal photography is performed upon release operation either by the "parent machine" or by the "child machine". The image files that are generated while a pairing is established are recorded within the file folder that has been set in advance to be shared.

—Cooperative Photography Type #1—

While a pairing is established, the electronic camera 1 on the "parent machine" side and the electronic camera 1 on the "child machine" side are controlled so as to perform photography under photographic conditions that are different. For example, the shutter speed of the "parent machine" may be controlled to be faster than the shutter speed of the "child machine". The setting for performing this cooperative photography type #1 may be made by a setting item included in the "operating menu" shown by way of example of FIG. 3.

Figure 17:
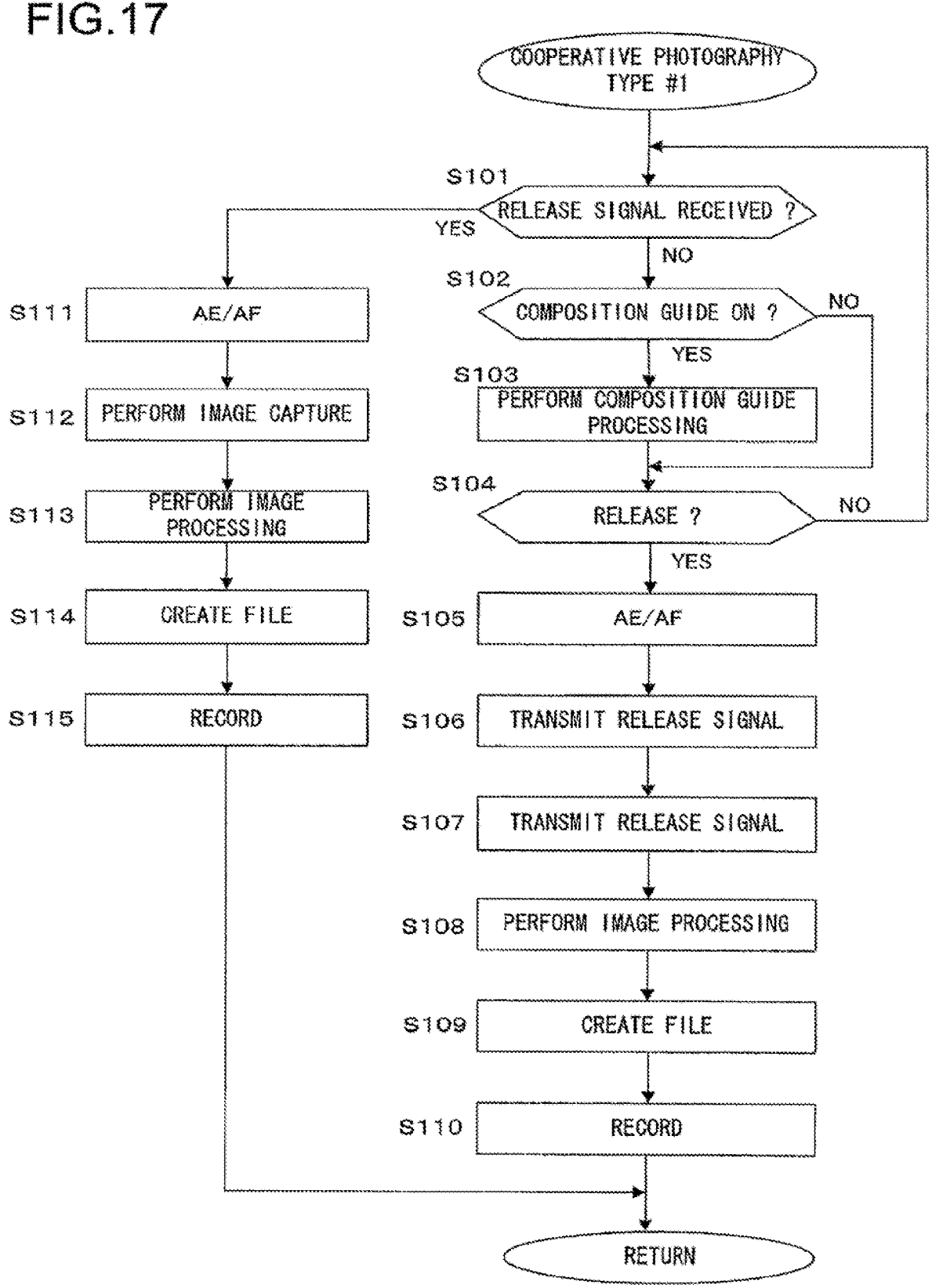
FIG. 17 is a flow chart showing an example of processing flow that is performed by a CPU when performing cooperative photography of a type #1.

FIG. 17 is a flow chart showing an example of a processing flow that is executed repeatedly when the CPU 20 is performing cooperative photography type #1 while a pairing is established. This processing flow is executed by both the CPUs 20: the CPU 20 of the electronic camera 1 on the "parent machine" side, and the CPU 20 of the electronic camera 1 on the "child machine" side. In a step S101 of FIG. 17, the CPU 20 makes a decision as to whether or not a release signal transmitted from the electronic camera 1 that is the opposite party in the pairing has been received. This release signal is a signal by which the one of the electronic cameras 1, among the "parent machine" and the "child machine", on which the release button 23*a* (FIG. 2) has been operated by being depressed commands the other electronic camera 1 to perform photography.

If a release signal has been received, then the CPU 20 reaches an affirmative decision in the step S101 and the flow of control is transferred to a step S111. The processing of the steps S111 through S115 corresponds to the processing performed by the CPU 20 of the electronic camera 1, among the "parent machine" and the "child machine" while a pairing is established, upon which the release button 23*a* (FIG. 2) has not been operated by being depressed.

If no release signal has been received, then the CPU 20 reaches a negative decision in this step S101, and the flow of control proceeds to a step S102. And the CPUs 20 of both of the electronic cameras 1 repeat the processing of the steps S101 through 104 until either the release button 23*a* of the "parent machine" or the release button 23*a* of the "child machine" is operated.

In the step S102, the CPU 20 makes a decision as to whether or not a composition guide function is ON. The composition guide is a function for performing guiding so that the "parent machine" and the "child machine" photograph a common photographic subject at different photographic angles while a pairing is established. The ON/OFF setting for the composition guide may be made by the setting items included in advance in the "operating menu" shown by way of example in FIG. 3.

If the composition guide function is set to ON, then the CPU 20 reaches an affirmative decision in this step S102 and the flow of control proceeds to a step S103, whereas if the composition guide function is not set to ON, then the CPU 20 reaches a negative decision in this step S102 and the flow of control is transferred to a step S104.

Figure 13:
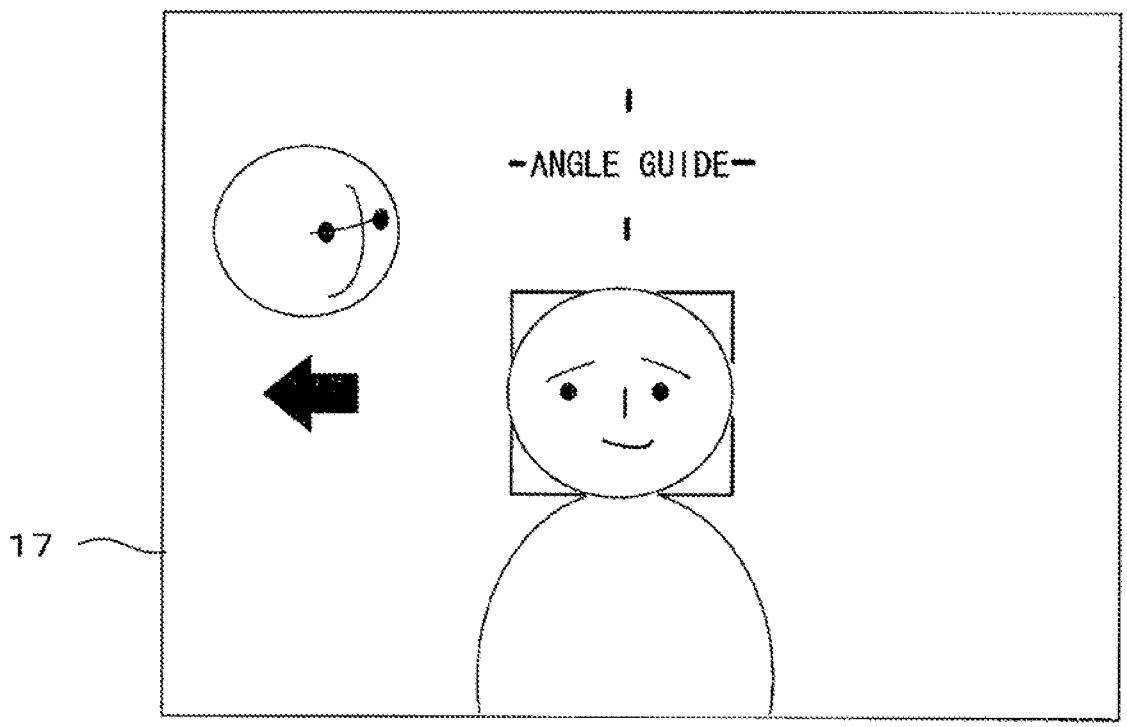
FIG. 13 is a figure showing an example of a through image that is being displayed upon a "parent machine"
Figure 14:
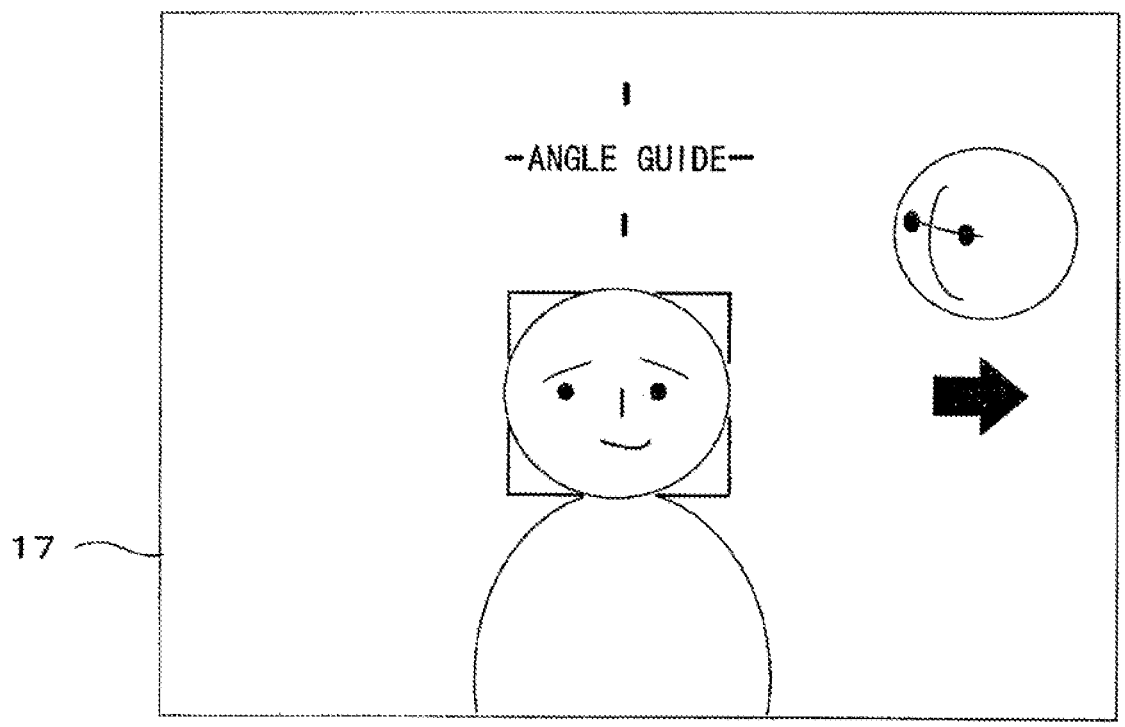
FIG. 14 is a figure showing an example of a through image that is being displayed upon a "child machine"
Figure 15:
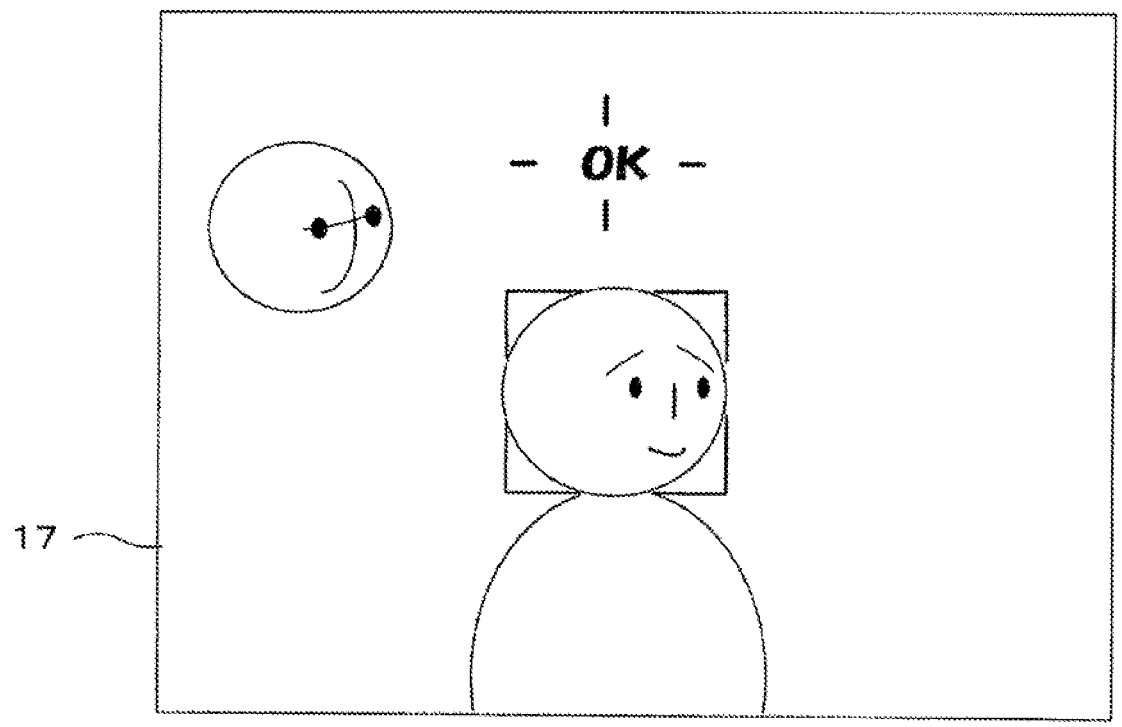
FIG. 15 is a figure showing an example of a through image that is being displayed upon the "parent machine"
Figure 16:
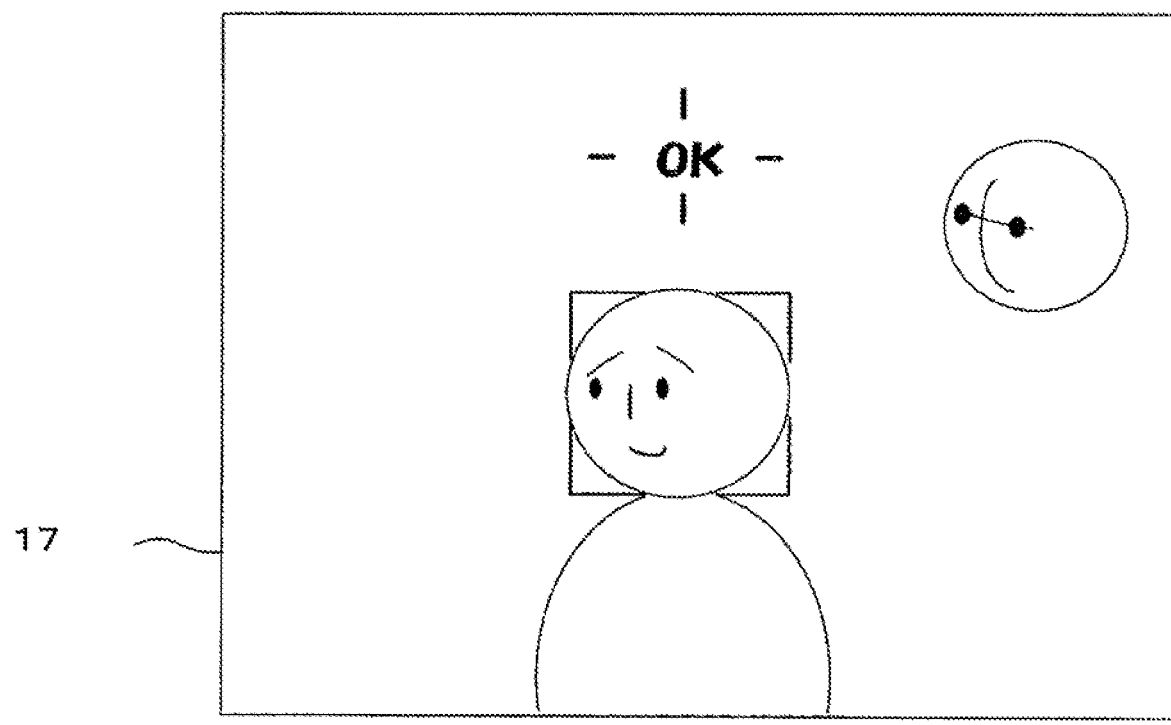
FIG. 16 is a figure showing an example of a through image that is being displayed upon the "child machine"

In the step S103, the CPU 20 performs composition guiding. FIGS. 13 and 15 are figures showing examples of through images that are displayed upon the LCD monitor 17 of Mr. X's electronic camera 1, this being the "parent machine". And FIGS. 14 and 16 are figures showing examples of through images that are displayed upon the LCD monitor 17 of Mr. B's electronic camera 1, this being the "child machine".

Each of the "parent machine" and the "child machine" reproduces the through image that it has itself acquired upon its own LCD monitor 17. And each of the CPUs 20 performs "face" detection processing on the basis of its through image, and displays a frame that indicates this face as superimposed over its through image if it has detected a face. And the CPU 20 determines the photographic direction on the basis of the positional relationship of the contours and the eyes and the nose obtained from the data for the region of the "face", and performs guide display upon the LCD monitor 17 as to what movement should be made in what direction.

In the case of FIG. 13, the CPU 20 displays a face icon and an arrow sign brightly and also displays "angle guide" as blinking in order to show that angle guiding is taking place so that Mr. X who is the holder of the "parent machine" is to be invited to angle his electronic camera 1 towards the left of the person who is the photographic subject. And, in the case of FIG. 14, the CPU 20 displays a face icon and an arrow sign brightly and also displays "angle guide" as blinking in order to show that angle guiding is taking place so that Mr. B who is the holder of the "child machine" is to be invited to angle his electronic camera 1 towards the right of the person who is the photographic subject.

When the face icon and the positional relationship of the eyes and the nose are in mutual accord, the CPU 20 displays "OK" and invites the user to perform photography (FIGS. 15 and 16). It is also possible to perform photography even in the state in which "OK" is not being displayed. It should be understood that the display of the face icon and the "angle guide" and the display of "OK" are not included in the image that is photographed.

In the step S104, the CPU 20 makes a decision as to whether or not the release button 23*a* (FIG. 2) has been operated by being depressed. If an operating signal that indicates that the release button 23*a* has been depressed has been inputted from the operating members 23, then the CPU 20 reaches an affirmative decision in this step S104 and the flow of control proceeds to a step S105, whereas if no such operating signal that indicates that the release button 23*a* has been depressed has been inputted from the operating members 23, then the CPU 20 reaches a negative decision in this step S104 and the flow of control returns to the step S101. When the flow of control thus returns to the step S101, the CPU 20 repeats the processing described above.

The processing of the steps S105 through S110 is processing performed while a pairing is established by the CPU 20 of that one of the electronic cameras 1, among the "parent machine" and the "child machine", on which the release button 23*a* has been operated by being depressed. In the step S105, the CPU 20 performs predetermined automatic exposure calculation (AE) and automatic focus adjustment processing (AF), and then the flow of control proceeds to a step S106. In this step S106 the CPU 20 issues a command to the communication control circuit 22 and causes it to transmit a release signal to the other electronic camera 1, and then the flow of control proceeds to a step S107. Along with this release signal, the CPU 20 also transmits to the other electronic camera 1 data that specifies photographic conditions including the result of exposure calculation (for example, shutter speed, iris aperture value, sensitivity, focal distance, white balance adjustment value, image quality adjustment information, and so on).

The image quality adjustment information is information that specifies which image quality adjustment algorithm should be applied. As image quality adjustment algorithms, for example, "standard", "neutral", "vivid", and "monochrome" may be provided in advance and may be applied during the image processing (a step S108).

"Standard" is an image quality adjustment algorithm for finishing off a standard image. And "neutral" is an image quality adjustment algorithm that emphasizes natural color matching for materials. "Vivid" is an image quality adjustment algorithm for finishing off a vivid image. In concrete terms, it is an image adjustment algorithm for increasing the saturation and vividly processing the red color and green color, and for obtaining a sharp image by increasing the contrast. And "monochrome" is an image quality adjustment algorithm for finishing off a white and black image.

In the step S107 the CPU 20 performs image capture processing, and then the flow of control proceeds to the step S108. In this step S108 the CPU 20 sends a command to the image processing circuit 14 so as to cause it to perform predetermined image processing upon the image data that has been acquired, and then the flow of control proceeds to a step S109. In this step S109, the CPU 20 creates an image file that includes the image data after image processing, and then the flow of control proceeds to a step S110. In this step S110, the CPU 20 sends a command to the memory card interface 21 so as to cause it to record this image file upon the storage medium 51, and then the processing of FIG. 17 is terminated.

If an affirmative decision has been reached in the step S101 described above, then photographic processing is to be performed according to a release signal from the other electronic camera 1. In a step S111, the CPU 20 performs predetermined automatic exposure calculation (AE) and automatic focus adjustment processing (AF), and then the flow of control proceeds to a step S112. In the automatic exposure calculation (AE) in this case, the exposure conditions are made to be different on the basis of the data specifying photographic conditions transmitted from the one of the electronic cameras 1 upon which the release button 23a was operated by being depressed, so that the shutter speed on the "parent machine" is made faster than the shutter speed on the "child machine". For example, the shutter speed on the "child machine" may be made to be ½50 second with a shutter speed of ¹⁄1000 second on the "parent machine". Due to this, the CPU 20 changes the iris aperture value or the sensitivity, so that an appropriate exposure is obtained.

In the step S112 the CPU 20 performs image capture processing, and then the flow of control proceeds to a step S113. In this step S113, the CPU 20 sends a command to the image processing circuit 14 and causes it to perform predetermined image processing upon the image data that has been acquired, and then the flow of control proceeds to a step S114. On the basis of data specifying the photographic conditions that is transmitted from one of the electronic cameras 1 on which the release button 23a has been operated by being depressed, the CPU 20 either may use a common image quality adjustment algorithm and a common white balance adjustment value, or may use a different image quality adjustment algorithm and a different white balance adjustment value. Whether or not a common algorithm and a common adjustment value are used, or a different algorithm and a different adjustment value are used, may be set by a setting item included in the "operating menu" such as shown by way of example in FIG. 3.

In the step S114, the CPU 20 creates an image file that includes the image data after image processing, and then the flow of control proceeds to a step S115. In this step S115, the CPU 20 issues a command to the memory card interface 21 so as to cause this image file to be recorded upon the storage medium 51, and then the processing of FIG. 17 terminates.

—Cooperative Photography Type #2—

While a pairing is established control is performed so that, during photography by one of the electronic camera 1 on the "parent machine" side and the electronic camera 1 on the "child machine" side, the other electronic camera 1 is made to wait, and, when the photography by the electronic camera 1 that was performing photography terminates, then photography by the other electronic camera 1 that was waiting becomes possible. The setting for performing cooperative photography type #2 may be made by a setting item included in the "operating menu" shown by way of example of FIG. 3.

Figure 18:
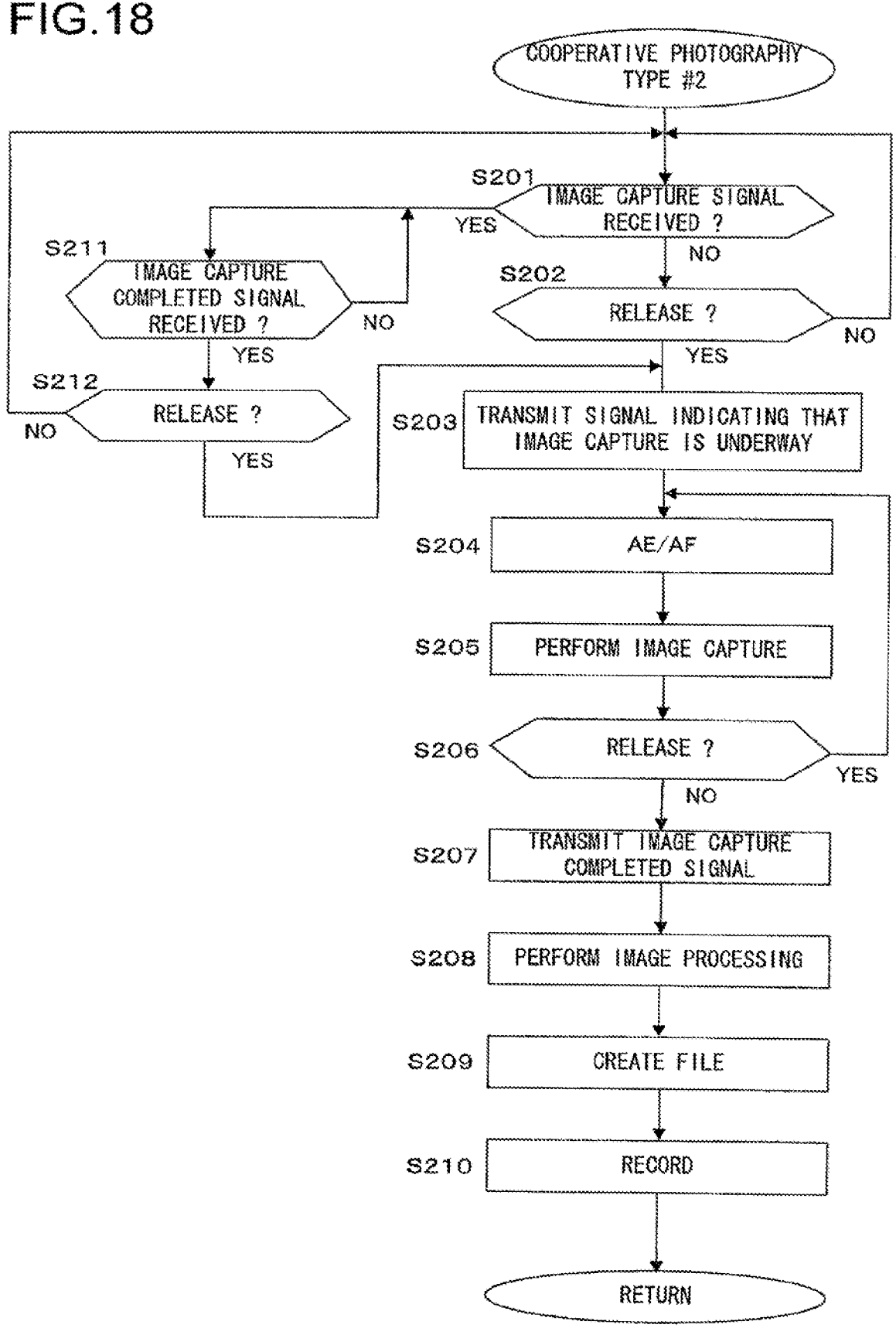
FIG. 18 is a flow chart showing an example of processing flow that is performed by the CPU when performing cooperative photography of a type #2.

FIG. 18 is a flow chart showing an example of a processing flow that is executed repeatedly when the CPU 20 is performing cooperative photography type #2 while a pairing is established. This processing flow is executed by both the CPUs 20: the CPU 20 of the electronic camera 1 on the "parent machine" side, and the CPU 20 of the electronic camera 1 on the "child machine" side. In a step S201 of FIG. 18, the CPU 20 makes a decision as to whether or not a signal has been transmitted during image capture from the electronic camera 1 that is the opposite party in the pairing. This signal during image capture is a signal from one electronic camera 1, among the "parent machine" and the "child machine", to the other electronic camera 1 that conveys the information that image capture is taking place according to the release button 23a of one electronic camera 1 (FIG. 2) being operated by being depressed.

If the CPU 20 has received a signal during image capture, then it reaches an affirmative decision in the step S201, and the flow of control is transferred to a step S211. The processing in the steps S211 and S212 corresponds to the processing that is performed by the CPU 20 of the one of the electronic cameras 1, among the "parent machine" and the "child machine", that is waiting while a pairing is established.

But if the CPU 20 has not received any signal during image capture, then it reaches a negative decision in the step S201, and the flow of control proceeds to a step S202. The CPUs 20 of both of the electronic cameras 1 repeat the processing of the steps S201 through S202 until the release button 23a on either the "parent machine" or the "child machine" is operated.

In the step S202, the CPU 20 makes a decision as to whether or not the release button 23a (FIG. 2) has been operated by being depressed. If an operation signal indicating that the release button 23a is depressed is inputted from the operating members 23, then the CPU 20 reaches an affirmative decision in this step S202, and the flow of control proceeds to a step S203, whereas if no operation signal indicating that the release button 23a is depressed is inputted from the operating members 23, then the CPU 20 reaches a negative decision in this step S202, and the flow of control returns to the step S201. If the flow of control has returned to the step S201, then the processing described above is repeated.

The processing of the steps S203 through S210 is processing that is performed by the CPU 20 of that one of the electronic cameras 1, among the "parent machine" and the "child machine" while a pairing is established, on which the release button 23a has been operated by being depressed. In the step S203, the CPU 20 issues a command to the communication control circuit 22 so as to cause it to transmit a signal indicating that image capture is under way to the other electronic camera 1, and then the flow of control proceeds to a step S204. And in this step S204 the CPU 20 performs predetermined automatic exposure calculation (AE) and automatic focus adjustment processing (AF), and then the flow of control proceeds to a step S205.

In the step S205 the CPU 20 performs image capture processing, and then the flow of control proceeds to a step S206. In this step S206, the CPU 20 makes a decision as to whether or not the release button 23a (FIG. 2) is being operated by being depressed. And, if an operating signal indicating that the release button 23a is depressed is being continuously inputted from the operating members 23, then the CPU 20 reaches an affirmative decision in this step S206 and the flow of control returns to the step S204, and the processing described above is repeated (sequential shooting photography).

But, if no operating signal indicating that the release button 23a is depressed is being inputted from the operating members 23, then the CPU 20 reaches a negative decision in this step S206 and the flow of control proceeds to a step S207. In this step S207 the CPU 20 sends a command to the communication control circuit 22 and causes it to transmit a signal indicating that image capture has been completed to the other electronic camera, and then the flow of control proceeds to a step S208.

In this step S208 the CPU 20 issues a command to the image processing circuit 14 so as to cause it to perform predetermined image processing in a predetermined order upon the image data that has been acquired, and then the flow of control proceeds to a step S209. In this step S209, the CPU 20 creates an image file that includes the image data after image processing, and then the flow of control proceeds to a step S210. In this step S210, the CPU 20 issues a command to the memory card interface 21 so as to cause it to record this image file upon the storage medium 51, and then the processing of FIG. 18 terminates.

If an affirmative decision has been reached in the step S201 described above, then photographic processing is not performed until a signal indicating that image capture has been completed is received from the other electronic camera 1. And in the step S211 the CPU 20 makes a decision as to whether or not a signal that is transmitted from the opposite electronic camera 1 in the pairing and indicates that image capture has been completed has been received. If such an image capture completed signal has been received, then the CPU 20 reaches an affirmative decision in this step S211 and the flow of control proceeds to a step S212. But if no such image capture completed signal has been received, then the CPU 20 reaches a negative decision in this step S211 and the system waits for an image capture completed signal while repeating the decision processing described above. While the CPU is thus waiting for this image capture completed signal it may display, for example, the message "waiting" upon the LCD monitor 17.

In the step S212, the CPU 20 makes a decision as to whether or not the release button 23a (FIG. 2) has been operated by being depressed. And, if an operating signal indicating depression of the release button 23a has been inputted from the operating members 23, then the CPU 20 reaches an affirmative decision in this step S212 and the flow of control is transferred to the step S203, whereas if no operating signal indicating depression of the release button 23a has been inputted from the operating members 23, then the CPU 20 reaches a negative decision in this step S212 and the flow of control returns to the step S201. If the flow of control returns to the step S201, then the CPU 20 repeats the processing described above.

—Normal Photography—

While a pairing is established, each of the electronic camera 1 on the "parent machine" side and the electronic camera 1 on the "child machine" side can be controlled singly to perform normal photography. The setting for thus performing normal photography may be made by a setting item included in the "operating menu" that is shown by way of example in FIG. 3.

Figure 19:
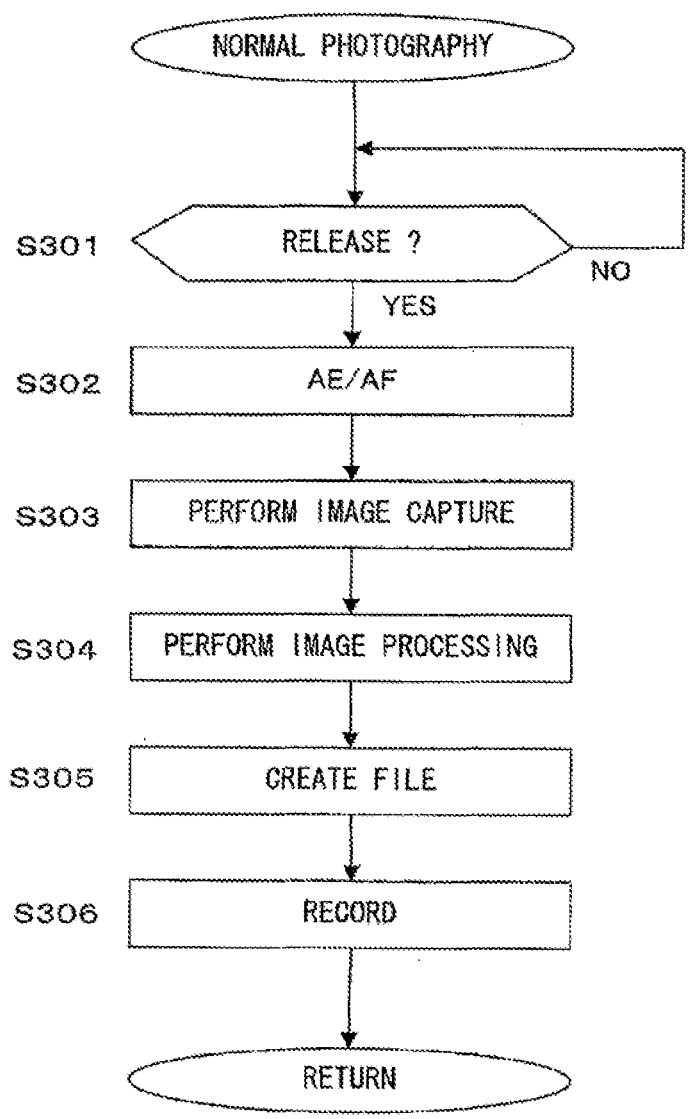
FIG. 19 is a flow chart showing an example of processing flow that is performed by the CPU when performing normal photography

FIG. 19 is a flow chart showing an example of a processing flow that is executed repeatedly when the CPU 20 performs normal photography while a pairing is established. This processing flow is executed by both the CPUs 20: the CPU 20 of the electronic camera 1 on the "parent machine" side, and the CPU 20 of the electronic camera 1 on the "child machine" side.

In a step S301 of FIG. 19, the CPU 20 makes a decision as to whether or not the release button 23a (FIG. 2) has been operated by being depressed. If an operating signal indicating depression of the release button 23a has been inputted from the operating members 23, then the CPU 20 reaches an affirmative decision in this step S301 and the flow of control proceeds to a step S302, whereas if no such operating signal indicating depression of the release button 23a has been inputted from the operating members 23, then the CPU 20 reaches a negative decision in this step S301 and the processing described above is repeated.

In the step S302, the CPU 20 performs predetermined automatic exposure calculation (AE) and automatic focus adjustment processing (AF), and then the flow of control proceeds to a step S303. In this step S303, the CPU 20 performs image capture processing, and then the flow of control proceeds to a step S304. In this step S304, the CPU 20 issues a command to the image processing circuit 14 so as to cause it to perform predetermined image processing upon the image data that has been acquired, and then the flow of control proceeds to a step S305. In this step S305, the CPU 20 creates an image file that includes the image data after image processing, and then the flow of control proceeds to a step S306. In this step S306, the CPU 20 issues a command to the memory card interface 21 and causes it to record this image file upon the storage medium 51, and then the processing of FIG. 19 terminates.

6. Password Sharing

It is also possible to arrange for the "parent machine" and the "child machine" to share passwords while a pairing is established. For example, if a password is set on either the "parent machine" and the "child machine" while a pairing is established, the CPU 20 may transmit this password information to the other electronic camera 1, so that the password is shared between the "parent machine" and the "child machine". The setting of the password may, for example, be performed on a menu screen.

Subsequently to setting of the shared password, the CPU 20 transmits to the other electronic camera 1 the details of setting changes performed by inputting that shared password on either one of the "parent machine" and the "child machine" while a pairing is established, so that they are reflected upon the other electronic camera 1. For example, if a setting whether to perform the normal photography or to perform cooperative photography, as described above, is made on the "parent machine" side, then this setting is also applied to the side of the "child machine" automatically.

It would also be acceptable to include the above described ranking raising or lowering operation in the setting change items that are performed by inputting the shared password. In this case, the CPU 20 does not send any signal such as described above specifying a ranking change request from the electronic camera 1 on the side on which the operating members have been actuated to the electronic camera 1 that is the opposite party in pairing formation, but rather sends information specifying the ranking after it is raised or lowered to the electronic camera 1 that is the opposite party in pairing formation. The CPU 20 that has received this information specifying the ranking after it has been changed from the opposite party in pairing formation performs raising or lowering of the ranking on the basis of the information that it has received, and displays a message such as "Ranking change made" upon the LCD monitor 17.

By sharing a password as explained above, there is no need to establish the same settings upon both the "parent machine" and the "child machine", and it is possible to enhance the convenience of use, since it becomes possible to change the settings from just one of them.

According to the first embodiment explained above, the following beneficial operational effects are obtained.

(1) The electronic camera 1 includes the communication control circuit 22 that performs communication with the external electronic camera, and the CPU 20 that issues commands to the external electronic camera via the communication control circuit 22 on the basis of at least one of the capacity of the external electronic camera and its own capacity. As a result it is possible to perform paired operation in an appropriate manner, irrespective of whether the equipment is indoors or outdoors.

(2) The capacity of the external electronic camera includes at least one of the remaining capacity of its battery 52 and the vacant capacity of its storage medium 51, and the CPU 20 issues commands to the external electronic camera on the basis of at least one of the remaining capacity of that camera's battery 52 and the vacant capacity of that camera's storage medium 51. For example, by issuing a command for paired operation to be terminated, it is possible to avoid the occurrence of a state of affairs in which although photography by the external electronic camera has been performed during paired operation, it is not possible for the external electronic camera to record any photographic image upon the storage medium 51, or of the occurrence of a state of affairs in which the battery 52 of the external electronic camera becomes depleted during paired operation and the operation of the external electronic camera becomes impossible.

(3) The capacity of this electronic camera itself includes at least one of the remaining capacity of its battery 52 and the vacant capacity of its storage medium 51, and the CPU 20 issues commands to the external electronic camera on the basis of at least one of the remaining capacity of its own battery 52 and the vacant capacity of its own storage medium 51. For example, by issuing a command for paired operation to be terminated, it is possible to avoid the occurrence of a state of affairs in which although photography by this electronic camera itself is performed during paired operation, it is not possible for this electronic camera to record any photographic image upon its own storage medium 51, or of the occurrence of a state of affairs in which the battery 52 of this electronic camera itself becomes depleted during paired operation and the operation of this electronic camera itself becomes impossible.

(4) Since the data sent from the external electronic camera is stored upon this camera's own storage medium 51, accordingly it is possible to avoid the occurrence of a state of affairs in which even though data has been sent from the external electronic camera during paired operation, it is not possible for this sent data to be recorded upon its own storage medium 51.

(5) Since the LCD monitor 17 is provided that displays the data sent from the external electronic camera, accordingly it is possible to avoid the occurrence of a state of affairs in which, even though data has been sent from the external electronic camera during paired operation, it is not possible for it to be displayed upon its own LCD monitor 17.

(6) The data received in (5) above is image data, and it is arranged to perform filter processing upon the images that are displayed on the LCD monitor 17, according to the level of reception by the communication control circuit 22 when receiving image data from the external electronic camera (for example, according to the distance between this electronic camera and the external electronic camera). Since the state of this filter processing for the reproduced images that are displayed upon the LCD monitor 17 is changed according to the level of reception, accordingly the observer is able to apprehend the state of reception intuitively.

(7) Since it is arranged for the CPU 20 of (6) above to perform filter processing for increasing the level of blurring as the level of reception becomes lower, accordingly the observer is able to apprehend the state of reception intuitively according to the level of blurring of the images.

(8) Since the communication control circuit 22 includes the communication control circuit 22a that performs communication regarding the capacity of the external electronic camera, and the communication control circuits 22b through 22e that are different from the above communication control circuit 22a and that communicate data sent from the external electronic camera, accordingly it is possible to perform paired operation in an appropriate manner, irrespective of the communication path.

(9) There are provided: the communication control circuit 22 (non contact) that establishes pairing with the external electronic camera by communication via short distance communication with the external electronic camera or via a human body, the communication control circuits 22b through 22e (direct contact) that are different from the communication control circuit 22 (non contact), and the CPU 20 that issues commands to the external electronic camera via the communication control circuits 22b through 22e (direct contact) when pairing with the external electronic camera has been established via the communication control circuit 22 (non contact). Since a command is sent that causes the pairing to be established under the condition that both of the electronic cameras are in mutual direct contact after communication has become established, accordingly the timing of pairing formation is easy to understand.

(10) Since the CPU is provided that counts time from when the pairing with the external electronic camera has become established, accordingly it becomes possible to manage the paired operation time period.

(11) It is arranged for the CPU 20 to cancel the pairing when the time period counted exceeds a predetermined time period. As a result, it is possible to terminate the paired operation automatically even if the user has forgotten to cancel such operation.

(12) It is arranged to determine the parent-child relationship on the basis of the output of the attitude sensor during paired operation with the external electronic camera. Accordingly, the user is able to determine the parent-child relationship automatically, without issuing any command.

(13) It is arranged for the electronic camera 1 to include: the imaging element 12 that captures an image and outputs image data; the communication control circuit 22 that performs communication with an external electronic camera; and the CPU 20 that, along with acquiring photographic conditions set by the external electronic camera via the communication control circuit 22, also sets photographic conditions that are different from at least a part of those photographic conditions. Due to this, it is possible to perform paired photographic operation in an appropriate manner. For example, the possibility of the photographed images becoming the same is avoided.

(14) Since the CPU 20 sets the same photographic conditions as at least a part of the photographic conditions of the external electronic camera that were acquired via the communication control circuit 22, accordingly it is possible to perform photography in which mutual correspondence is maintained with the electronic camera that is the opposite party in the pairing.

(15) By making the photographic conditions include at least one of the magnification ratio of the photographic optical system 11, the shutter speed, the aperture value, the sensitivity, and the color adjustment processing information, it is possible to photograph a photographic subject according to various different tastes.

(16) The electronic camera 1 includes the imaging element 12 that captures an image and outputs image data, the communication control circuit 22 that performs communication with an external electronic camera, and the CPU 20 that performs predetermined image capture processing via communication with the external electronic camera. And it is arranged for this CPU 20 to include a CPU 20 that invites the user to perform framing so that the same photographic subject is photographed from a different photographic direction from that of the external electronic camera. Accordingly, photography is performed in a simple manner from a different angle.

(17) Since the CPUs 20 that invite the users to perform framing include the CPU 20 that detects a face on the basis of the image data from the imaging element 12 and the CPU 20 that determines the direction for performing photography of the face on the basis of the face, accordingly photography of a person can be performed in a simple manner from different angles.

(18) The memory card I/F 21 is provided that records the image data outputted from the imaging element 12 upon the storage medium 51. And, while communication with the external electronic camera is established, the CPU 20 controls the memory card I/F 21 so as to append information to the image data outputted from the imaging element 12 with the appended information specifying that this is image data that was captured while communication was established. Due to this, it is possible to record information specifying that this is paired photography.

According to the cooperative photography type #2 described above, since the electronic camera 1 on the "parent machine" side and the electronic camera 1 on the "child machine" side are controlled so as to perform photography in unison while a pairing is established, accordingly it is possible to cover a long photographic time interval, as compared to the photographic time interval that is covered by a single electronic camera. Particularly, when photography of a photographic subject is to be performed by the "parent machine" and the "child machine" at different photographic angles, then it is possible to perform sequential shooting photography (or photography of moving images) at different photographic angles continuously on a so called "catch ball" basis between the "parent machine" and the "child machine".

In the following, variant embodiments of the present invention will be explained by way of example. However, the present invention should not be considered as being limited by the first embodiment described above or by these variant embodiments; it would also be acceptable to provide a combination of the structures of the first embodiment described above and of the variant embodiments below; and it would also be acceptable to employ the structure of the variant embodiments described below, instead of a portion of the embodiment described above.

A First Variant Embodiment

In the processing of FIG. 6 described above it would also be acceptable, if an affirmative decision has been reached in the step S13 (see FIG. 6), to arrange to investigate whether or not to store in the flash memory 19 the identification information for the electronic camera 1 that has been returned as a reply (in the step S12). As described above, when a pairing terminates, for each item of identification information specifying an opposite party in pairing formation (for example, for each ID of an electronic camera 1), the CPU 20 stores the number of times of pairing formation and the cumulative time period of pairing in the flash memory 19. Thus, by referring to this stored information, if identification information for the electronic camera 1 from which a reply has arrived is stored, then it is decided that this is an opposite party for which a record of pairing exists, and the flow of control proceeds to the step S16 and the pairing is established.

On the other hand, if no identification information for the electronic camera 1 from which a reply has arrived is stored in the flash memory 19, then a request for identification information specifying the opposite parties in pairing formation stored within the electronic camera 1 that was the source of that reply is sent to that electronic camera 1 that was the source of the reply. When, upon receipt of this request, the electronic camera 1 that was the source of the reply returns a reply including the above described identification information, then the CPU 20 that receives this reply compares together the identification information stored in its own flash memory 19 and the identification information included in this reply, and investigates whether or not a common opposite party in pairing is included.

If the result of this comparison is that there is some common opposite party in pairing, then the CPU 20 decides that this is an opposite party who is a "friend of a friend", and displays a message upon the LCD monitor 17 "There is a common paired opposite party. Make new pairing?". And if an operation signal specifying "OK" operation is inputted from the operating members 23, then the CPU 20 proceeds to the step S16 in order to start the pairing.

However if no such operation signal specifying "OK" operation is inputted from the operating members 23 although the message described above has been displayed upon the LCD monitor 17, or if the result of the above described comparison is that no common opposite paired party exists, then the CPU 20 does not start any pairing, but rather the flow of control returns to the step S11. According to the variant embodiment #1 explained above, it is possible to invite the user to perform pairing with an electronic camera 1 that is owned by an opposite party with whom the user has a mutual friend in common.

A Second Variant Embodiment

While a pairing is established, it would be acceptable to make changes to the rankings in real time during the pairing described above according to the state of communication (i.e. the communication distance). Since the level of signal reception by the CPU 20 on the "parent machine" side changes according to the communication distance, accordingly it changes the ranking according to the level of signal reception by the communication control circuit 22. If the rankings are ranking-3 and ranking-2 while a pairing is established, then the main CPU 20 performs lowering of the ranking when the respective signal levels drop below some decision threshold value. In this case, the CPU 20 stores the changed values in the flash memory 19 in correspondence with identification information for the opposite party in pairing formation, and performs limitation of viewing and/or limitation of copying according to the rankings after change. The ranking information is transmitted from the "parent machine" to the "child machine", and is managed by the "parent machine".

By changing the rankings in real time during a pairing, the low pass filter processing during image viewing which is performed between the "parent machine" and the "child machine" is changed in real time while the pairing is established. Due to this, according to this variant embodiment #2, when a photographic image that is included in a file folder upon the electronic camera 1 that is the opposite party in pairing formation is displayed upon this electronic camera 1 itself and is viewed, since the state of blurring of the reproduced image that is displayed upon the LCD monitor 17 of this electronic camera itself changes according to the state of communication (i.e. according to the communication distance), accordingly it is possible to apprehend the distance to the opposite party in pairing formation in an intuitive manner.

A Third Variant Embodiment

During pairing formation, it would be acceptable to make a change to the rankings during pairing corresponding to the degree of resemblance between an image (a public image) for which viewing by the opposite party in the pairing is permitted (i.e. an image within a file folder for which sharing has been set in advance on one's own side), and an image for which viewing is permitted by the opposite party (i.e. an image within a file folder for which sharing has been set in advance on the side of the opposite party). The CPU 20 determines the level of resemblance using a per se known pattern matching technique. The CPU 20 on the "parent machine" side raises the ranking if the degree of resemblance is high, and lowers the ranking if the degree of resemblance is low. And, along with the CPU 20 storing the changed contents in the flash memory 19 in correspondence with the identification information for the opposite party in pairing formation, the feature that viewing limitation and copy limitation according to the rankings after change are respected, and the feature that the CPU 20 transmits the ranking information from the "parent machine" to the "child machine" and that the "parent machine" performs management, are the same as in the case described above.

Generally, the possibility is high that associates who perform activities in the same circle or the like, or friends who do things together, will photograph the same type of photographic subject. Thus, by arranging to separate the rankings according to the degree of resemblance of the photographic images, it is possible automatically to group together into pairings opposite parties whose tastes related to photography are close.

A Fourth Variant Embodiment

During pairing formation, it would be acceptable to make a change to the rankings during pairing by comparing together the photographic positions (i.e. the GPS information) at an image (a public image) for which viewing by the opposite party in the pairing is permitted (i.e. an image within a file folder for which sharing has been set in advance on one's own side), and at an image for which viewing by the opposite party is permitted (i.e. an image within a file folder for which sharing has been set in advance on the side of the opposite party). The CPU 20 on the "parent machine" side raises the ranking if the photographic positions are close together, and lowers the ranking if the photographic positions are far apart. And, along with the CPU 20 storing the changed contents in the flash memory 19 in correspondence with the identification information for the opposite party in pairing formation, the feature that viewing limitation and copy limitation according to the rankings after change are respected, and the feature that the CPU 20 transmits the ranking information from the "parent machine" to the "child machine" and that the "parent machine" performs management, are the same as in the case described above.

Generally, the possibility is high that associates who perform activities in the same circle or the like, or friends who do things together, will take photographs in the same type of place. Thus, by arranging to divide the rankings according to the degree of matching of the photographic positions, it is possible automatically to group together into pairings opposite parties whose tastes related to photography are close.

A Fifth Variant Embodiment

During pairing formation, it would be acceptable to make a change in the rankings during pairing by comparing together the photographic conditions for an image (a public image) for which viewing by the opposite party in the pairing is permitted (i.e. an image within a file folder for which sharing has been set in advance on one's own side), and an image for which viewing by the opposite party is permitted (i.e. an image within a file folder for which sharing has been set in advance on the side of the opposite party). The CPU 20 on the "parent machine" side raises the ranking if the photographic conditions match, and lowers the ranking if the photographic positions are different. And, along with the CPU 20 storing the changed contents in the flash memory 19 in correspondence with the identification information for the opposite party in pairing formation, the feature that viewing limitation and copy limitation according to the rankings after change are respected, and the feature that the CPU 20 transmits the ranking information from the "parent machine" to the "child machine" and that the "parent machine" performs management, are the same as in the case described above.

Generally, the possibility is high that people who perform photography in similar photographic conditions will have tastes related to photography that are close. Thus, by arranging to divide the rankings according to the degree of matching of the photographic conditions, it is possible automatically to group together into pairings opposite parties whose tastes related to photography are close.

A Sixth Variant Embodiment

It would be acceptable to make a change in the rankings according to the conditions of pairing formation. When a pairing according to the above described "hand clasping" becomes established, the CPU 20 on the "parent machine" side raises the ranking by one level as compared to the normal ranking (in other words, the ranking that is determined according to the number of times of pairing formation and the cumulative time period of pairing, that is management information recorded in the flash memory 19). Since it may be supposed that the degree of intimacy is high if pairing formation is established by human body communication, accordingly the ranking is automatically raised, so that the convenience of use is good. If the ranking is raised in this manner as well, along with the CPU 20 storing the changed contents in the flash memory 19 in correspondence with the identification information for the opposite party in pairing formation, the feature that viewing limitation and copy limitation according to the rankings after change are respected, and the feature that the CPU 20 transmits the ranking information from the "parent machine" to the "child machine" and that the "parent machine" performs management, are the same as in the case described above. According to this variant embodiment #6, it is possible automatically to group together opposite parties whose degrees of mutual intimacy are high.

A Seventh Variant Embodiment

If the pairing formation condition is "face identification", then it would be acceptable to make a change in the rankings during pairing according to the degree of smiling of the face obtained from the through image using "face identification". If the degree of smiling of the face obtained from the through image using "face identification" is higher than some predetermined value, then the CPU 20 on the "parent machine" side raises the ranking by one level as compared to the normal ranking (in other words, the ranking that is determined according to the number of times of pairing formation and the cumulative time period of pairing, that is management information recorded in the flash memory 19). Since it may be supposed that the degree of intimacy is high if the degree of smiling of the face is high, accordingly the ranking is automatically raised, so that the convenience of use is good.

The decision as to the degree of smiling of the face in this variant embodiment is made during smiling face detection. On the basis of data corresponding to the region of a face of a person that has been specified in the through image data, the CPU 20 makes a decision as to whether or not this face is smiling. The explanation of this smiling face detection processing will be omitted, since it is prior art technology. If it has been decided that this face is smiling, then the CPU 20 also determines the degree of smiling of this smiling face. The degree of facial smiling may, for example, be specified in three steps: 2 (big laugh), 1 (medium laugh), and 0 (smile). The CPU 20 raises the ranking by one level above the normal ranking when the degree of facial smiling is 2.

An Eighth Variant Embodiment

In the cooperative photography type #1 described above, it would also be acceptable for the photographic conditions to be different, such as for the focal distance of the "parent machine" to be longer than the focal distance of the "child machine". For example, if the focal distance of the "parent machine" is equivalent to 85 mm, the focal distance of the "child machine" may be equivalent to 35 mm. This avoids the image photographed by the electronic camera 1 on the "parent machine" side and the image photographed by the electronic camera 1 on the "child machine" side undesirably looking too much like one another. And it is arranged to use the white balance adjustment value employed by the electronic camera 1 that is performing "wide" photography (in this example, this corresponds to 35 mm) as the white balance adjustment value used by the other electronic camera 1.

Since generally there is more color information in the photographic scene in the case of "wide" photography than in the case of "zoom" photography, accordingly a more appropriate white balance adjustment value is obtained. By using this white balance adjustment value in common on both the "parent machine" and the "child machine", it is possible to photograph a better set of hues with both of the electronic cameras 1, as compared to the case in which different white balance adjustment values are used. This type of control is appropriate when performing cooperative photography of the same photographic subject at approximately the same time point.

Furthermore, if the focal distances are controlled to be different between the "parent machine" and the "child machine", then it would also be possible to ensure that the shutter speeds are the same between the "parent machine" and the "child machine". This type of setting of the image capture conditions is an appropriate setting during cooperative photography of the same photographic subject that is moving, at approximately the same time point. For example, it is possible to acquire simultaneously both an image in which the photographic subject is stationary and an image in which the photographic subject is moving. Moreover, if control is performed to set the same focal distance between the "parent machine" and the "child machine", then it would also be possible to arrange to perform control of the aperture openings so that they are different between the "parent machine" and the "child machine". This type of setting of the image capture conditions is an appropriate setting during cooperative photography of the same photographic subject at approximately the same time point, and, for example, may be applied to acquire images with different levels of blurring simultaneously. Due to this the user is able to select the image that he desires, after photography. If control is performed to set the same focal distance for both the "parent machine" and the "child machine", then it would also be possible to arrange to set the shutter speeds so that they are different between the "parent machine" and the "child machine". This type of setting is an appropriate setting during cooperative photography of the same photographic subject that is moving, at approximately the same time point. For example, it is possible to acquire simultaneously both an image in which the photographic subject is stationary and an image in which the photographic subject is moving. The examples described above are only particular examples; it is possible to implement various combinations of photographic conditions between the "parent machine" and the "child machine", as desired. As examples of such photographic conditions, as described above, the photographic optical system magnification ratio, the shutter speed, the aperture value, the sensitivity, the color adjustment processing information, and so on may be cited.

A Ninth Variant Embodiment

In the cooperative photography type #2 described above, an example was explained in which sequential shooting photography was performed while the release button 23a was operated continuously by being depressed. Instead of this, it would also be acceptable to arrange to perform sequential shooting photography from when the release button 23a is operated by being depressed until a predetermined time period (for example ten seconds) has elapsed. In this case, in the step S206 (FIG. 18), the CPU 20 reaches an affirmative decision when the elapsed time from the affirmative decision in the step S202 (or S212) reaches the predetermined time period described above.

A Tenth Variant Embodiment

Or it would also be acceptable to arrange to perform sequential shooting photography from when the release button 23a is operated by being depressed until the number of sequential shots reaches a predetermined number of shots, for example thirty shots. In this case, in the step S206, the CPU 20 reaches an affirmative decision when the number of sequentially shot frames from the affirmative decision in the step S202 (or S212) reaches the predetermined number of frames described above.

An Eleventh Variant Embodiment

Instead of recording the sequentially shot photographic images described above as still images, it would also be acceptable to arrange to record them as a video file (i.e. as a moving image). Furthermore, it would also be acceptable to arrange for one of the electronic cameras 1 to record as a still image, and for the other of the electronic cameras 1 to record as a moving image.

A Twelfth Variant Embodiment

While, during photography with one of the electronic cameras 1, it is arranged for the other of the electronic cameras 1 to wait for photography, it would also be acceptable to arrange for sound recording to be performed during this waiting for photography. In this case, the CPU 20 starts to capture sound for sound recording with the mike 26 if an affirmative decision is reached in the step S201, and continues to capture sound until an affirmative decision is reached in the step S211.

The CPU 20 sends a command to the audio processing circuit 25, and causes it to amplify the audio signal captured by the mike 26 and then to convert it into digital audio data. And the CPU 20 includes information specifying that this is audio obtained by sound recording during pairing formation in a header region (i.e. in a tag region) within the audio file. Moreover, the CPU 20 sends a command to the memory card interface 21, and causes it to record this audio file upon the storage medium 51. The information specifying that this is audio sound recorded during pairing formation includes identification information for the opposite party in the pairing, and sound recording time point information that is based upon the counted time after time matching. It should be understood that, instead of the CPU 20 recording the information specifying that this is audio recorded during pairing formation in the header region of the audio file, it would also be acceptable for the CPU 20 to record it as a separate file that is correlated with the audio file.

A Thirteenth Variant Embodiment

While, in the explanation given above, in the case of "camera contact", it is arranged to determine which is the "parent machine" and which is the "child machine" on the basis of the "upper" versus "lower" decision, it would also be acceptable to arrange to determine which is the "parent machine" and which is the "child machine" on the basis of a "left" versus "right" decision. In this case, for example, in the step S25 (FIG. 6), the CPU 20 performs "left side" decision processing. This "left side" decision is a decision as to which of the electronic cameras 1 is positioned on the left side when the electronic cameras 1 come into mutual contact; in this variant embodiment, when viewed from the rear of the electronic cameras 1, the side that is positioned in the direction of the left hand is taken as being the "left" side.

The CPU 20 arrives at the "left side" decision by referring to a decision table such as shown by way of example in FIG. 20, on the basis of the direction of gravity based upon the detection signal from the attitude sensor 24, and on the basis of contact electrode information based upon the signal from the communication control circuit 22. As an example, a case will be explained in which the electronic camera 1 is held in a vertical position (i.e. with its right side downwards), and, on its surface on which the release button 23a is provided, camera contact is made with the left side of the other electronic camera 1 (this being in an upright position). Since the direction of gravity for the electronic camera 1 is towards the transmit/receive electrode 22d and its contacting electrode is the transmit/receive electrode 22b, accordingly the CPU 20 reaches a decision of "left". In this variant embodiment #13, the machine for which "left" has been decided is taken as being the "parent machine", while the machine for which "right" has been decided is taken as being the "child machine". On the other hand, since the direction of gravity for the other electronic camera 1 that has come into contact with the electronic camera 1 described above is towards the transmit/receive electrode 22c (since this other camera 1 is in the upright position) and the contacting electrode is the one on its left side (i.e. is the transmit/receive electrode 22e), accordingly the CPU of that other electronic camera 1 reaches a decision of "right". When a decision of "left" has been made, then the CPU 20 reaches an affirmative decision in the step S25, and the flow of control is transferred to the step S16. But if a decision of "left" has not been made, then the CPU 20 reaches a negative decision in the step S25, and the flow of control is transferred to the step S20.

A Fourteenth Variant Embodiment

With regard to the time matching during pairing (the steps S27 and S28 of FIG. 6), an example has been explained in which the time point on the "child machine" is matched to the time point on the "parent machine". Instead of this, it would also be acceptable to arrange to perform matching to the one among the times of the "parent machine" and the "child machine" that is the earlier, or to perform matching to a one thereof that is provided with a function of correcting its time on the basis of a standard radio wave that it receives.

A Fifteenth Variant Embodiment

In the explanation given above, it is arranged for the CPU 20 to terminate the pairing automatically in any one or more of the following cases: if the vacant capacity of the storage medium 51 is less than the predetermined vacant capacity; if information to the effect that the vacant capacity of the storage medium 51 on the side of the other electronic camera 1 is less than the predetermined vacant capacity has been acquired by communication; if the remaining capacity of the battery 52 is less than the predetermined remaining capacity; or if information to the effect that the remaining capacity of the battery 52 on the side of the other electronic camera 1 is less than the predetermined remaining capacity has been acquired by communication. In addition to these, it would also be acceptable for the CPU 20 to terminate the processing of FIG. 6 directly if the vacant capacity of the storage medium 51 at the time point just before the start of the processing of the step S11 of FIG. 6 is less than some predetermined vacant capacity, or if the remaining capacity of the battery 52 is less than some predetermined vacant capacity at the time point just before the start of the processing of the step S11 of FIG. 6.

Moreover, it would also be acceptable for the CPU 20 that has received a communication request (in the step S17) to terminate the processing of FIG. 6 without sending any reply, if at the time point just before sending a reply (the step S18) the vacant capacity of the storage medium 51 is less than some predetermined vacant capacity, or if the remaining capacity of the battery 52 is less than some predetermined vacant capacity at the time point just before sending a reply (the step S18). According to this variant embodiment #15, it is possible to avoid the occurrence of the situation that it becomes impossible to record upon the storage medium 51 during pairing formation, or that operation becomes impossible due to depletion of the battery 52 during pairing formation.

A Sixteenth Variant Embodiment

In the first embodiment described above, as one example of registration of an external device with which a pairing is to be established, an example was explained in which the "face" of a person using an external device was registered. Instead of this, it would also be acceptable to arrange to register the name or the like of an external device. In this case, instead of displaying a "paired person setting" screen (FIG. 5) upon the LCD monitor 17, the CPU 20 will display an "external device setting" screen. The CPU 20 displays a list of external devices upon this "external device setting" screen, instead of thumbnail images of "faces". This external device list, for example, may include the names or type numbers, or their IDs or the like of external devices.

The CPU 20 sets an external device shown by a check mark similar to the one in FIG. 5 as an external device to be established as an opposite party in a pairing. And the CPU 20 establishes a pairing if the condition is satisfied that the ID included in information returned in response to a communication request (the step S11 of FIG. 6) and the ID of an external device that has been set using the "external device setting" screen agree with one another.

It should be understood that while an example has been explained in which a decision is made as to whether or not the ID included in the information returned in response to the communication request (the step S11) agrees with the ID of an external device that has been set using the "external device setting" screen in this variant embodiment, it would also be acceptable to arrange for this step to be varied according to requirements. For example, a circuit structure may be adopted in which supply of power to the communication control circuit 22 is always provided. And it may be arranged for the CPU 20 to decide that the external device is not started, or that its power supply is off if no reply can be detected from any external device that is set by "external device setting", and to transmit via the communication control circuit 22 a signal that causes the external device to start up or its power supply to be turned on. And, having made a decision that the external device is in a state in which it can operate on the basis of information that is returned from the external device after it has started to the effect, when it can operate, the CPU 20 causes a pairing to become established. The CPU 20 makes this decision as to whether or not the external device is in a state in which it can operate by receiving from the external device information as to whether or not contact by the user to the casing of the external device or the like has been detected by the contact sensor provided to that casing, or information as to whether or not operation of the external device by the user has been detected. It should be understood that it would also be acceptable to arrange to employ the transmission/reception electrodes 22*b* through 22*e* that are provided to the external device as contact sensors.

Furthermore, the variant embodiment of this communication request (in the step S11) can also be applied to the embodiment described above in which an example of registering the "face" of a person using an external device was explained. In concrete terms, it will be acceptable to arrange for the CPU 20 to recognize a face for which the user has performed photograph registration in an image displayed upon the LCD monitor 17, and to turn the power supply to the opposite party electronic camera ON via the communication control circuit 22 when, for example, the OK switch 23*h* is depressed. Furthermore, as shown in FIG. 5, it will be acceptable to arrange for the CPU 20 to start, via the communication control circuit 22, an electronic camera that is possessed by a person for whom the check box on the paired person setting screen is checked. In this case, since in some cases it is unclear whether or not the person for whom the check box is checked is nearby, it will be acceptable to arrange to perform this communication by setting the communication distance to within 10 m to 100 m. Moreover, if a viewfinder that recognizes the photographic field is provided to the electronic camera 1, it would also be acceptable to arrange for face identification to be performed upon the image that is displayed in this viewfinder instead of performing face identification upon the image that is displayed upon the LCD monitor 17.

The starting of the power supply of the opposite party electronic camera 1 due to a pairing request is not to be considered as being limited to the case of face identification described above, but may also be applied to the cases of human body communication or camera contact. In this case, in order to recognize that this is not mere hand clasping or a pairing request but is camera contact, it would be acceptable to arrange to utilize the OK switch 23*h* or to arrange for the power supply of the opposite party electronic camera 1 to be turned ON via the communication control circuit 22, if the time period of hand clasping is continued for, for example, three seconds or more, or if the predetermined time period for camera contact is continued for, for example, three seconds or more. It should be understood that, in this case, it does not matter whether the power supply of the electronic camera 1 is in the ON state or is in the OFF state. The electronic camera 1 and the other electronic camera 1 may be built so that power is supplied to their communication control circuits 22 even when their main power supplies are in the OFF state. And, in the electronic camera 1, the various sections that make up the electronic camera 1 may be caused to start by the main power supply being turned ON, when human body communication or camera contact has been detected by the communication control circuit 22.

A Seventeenth Variant Embodiment

Furthermore, in the embodiment described above, an example was explained in which pairing was established under the condition that "face identification" was performed after the CPU 20 established communication with the other electronic camera 1. Instead of this it would also be acceptable to adopt a structure in which communication with the other electronic camera 1 is started after "face identification" is performed before establishing communication during setting of the paired mode. In this case, as in the embodiment described above, before starting communication with the external device, it would be acceptable for any single pairing formation condition from among the plurality of pairing formation conditions to be set in advance; and it would also be acceptable for no pairing formation condition to be set. As described above, in the case of "face identification", along with reproducing and displaying the through image that is used for "face identification" upon the LCD monitor 17 in real time, the CPU 20 also displays a display of a frame or the like that indicates this "face" as superimposed upon the through image. It would be acceptable to arrange for the CPU 20 to start communication automatically in this state and to establish a pairing; or it would also be acceptable to start communication and to establish a pairing in the state in which "face identification" has been performed and moreover the OK switch 23h has been operated by being depressed.

Furthermore, if a plurality of "faces" have been identified, along with displaying a frame that indicates each of the "faces", the CPU 20 selects the frame that corresponds to the largest face (i.e. the one that occupies the greatest proportion of the display screen), and displays that frame in a different mode from the other frames (i.e. with different luminance or color). When the cruciform switch 23g is operated, the CPU 20 changes over the display of this selection frame to the frame that surrounds the "face" positioned in the direction of that actuation. The CPU 20 starts communication with the external device having an ID corresponding to the "face" that corresponds to the frame that is selected at the time point that the OK switch 23h is operated by being depressed, and establishes a pairing therewith.

An Eighteenth Variant Embodiment

Furthermore while in the embodiment described above an example has been explained in which one from among a plurality of pairing formation conditions is set in advance before communication with an external device starts, it would also be acceptable to arrange for it not to be absolutely necessary to set the pairing formation condition before communication starts. For example it may be arranged for the CPU 20 to perform at least one of processing of "face identification", "hand clasping", and "camera contact" if the paired mode is set by operation of the mode switch 23d. If the CPU 20 has detected either "hand clasping" or "camera contact" via the communication control circuit 22, then it is arranged for it to start communication with the other electronic camera 1 automatically, and to establish a pairing.

Furthermore, it would also be acceptable to arrange to start communication automatically with the other electronic camera 1, and to establish a pairing if the CPU 20 has detected "hand clasping" or "camera contact" even though the pairing formation condition is for example set to normal. It should be understood that, in these cases, instead of automatically starting communication, it would also be acceptable to arrange for the CPU 20 to display on the LCD monitor 17 a query to ask whether or not it is acceptable to establish a pairing if it has detected "hand clasping" and "camera contact", and to start communication if the OK switch 23h is operated by being depressed. According to this variant embodiment, as appropriate, the CPU 20 may establish wireless communication with that external device for which it has decided that the intensity of the received signal detected by the wireless communication circuit is the highest, and may establish a pairing with that external device.

A Nineteenth Variant Embodiment

In the embodiment described above, an example was explained in which the paired mode automatically ended in accordance with the setting of the pairing OFF timer. Instead of this, it would also be acceptable to arrange to set the time period for remaining in the paired mode according to the time period of "hand clasping". As described above, the communication control circuit 22 has a human body communication function of performing communication via the human body upon a command from the CPU 20. The CPU 20 measures the time period of "hand clasping" via the communication control circuit 22, and sets the time period for remaining in the paired mode according to the measured time period. Moreover, in this case, it would be acceptable to arrange for the CPU 20 to terminate the pairing, whichever comes earlier: paired mode cancellation operation to terminate the pairing, and elapsing of the time period for remaining in the paired mode as determined by the "hand clasping" time period.

Furthermore, it would also be possible to set the time period for remaining in the paired mode according to the time period of "camera contact". As described above, the CPU 20 detects whether or not the two electronic cameras 1 have come into direct contact via the transmission/reception electrodes 22b through 22e provided to the casing of the electronic camera 1, and via the communication control circuit 22. The CPU 20 measures the time period of direct contact between the two electronic cameras 1 via the communication control circuit 22, and sets the time period for remaining in the paired mode according to this measured time pairing. Moreover, in this case, it would be acceptable to arrange for the CPU 20 to terminate the pairing, whichever comes earlier: paired mode cancellation operation to terminate the pairing, and elapsing of the time period for remaining in the paired mode as determined by the "camera contact" time period. Furthermore, it would also be acceptable to set the time period for remaining in the paired mode according to the time period of "camera contact".

A Twentieth Variant Embodiment

Other than the wireless communication being performed by transmitting and receiving radio waves, it would also be acceptable for it to be performed by transmission and reception of infrared light. Moreover, although the example of electronic cameras 1 has been explained, the present invention could also be applied to cameras of other types than electronic cameras 1, or to electronic devices of other types, such as portable telephones, video cameras, music players, or the like.

A Twenty-First Variant Embodiment

While, in the above explanation, an example with a single "parent machine" and a single "child machine" has been explained, it would also be acceptable to make it possible to establish a pairing between a single "parent machine" and a plurality of "child machines".

The Second Embodiment

A second embodiment of the present invention will now be explained with reference to the drawings. In the following explanation, the same reference symbols will be appended to structural elements that are the same as ones in the first embodiment, and the explanation will concentrate upon the points of difference. Features that are not particularly explained are the same as in the first embodiment.

An embodiment is explained in which the invention of the present application is applied to image reproduction by a digital still camera (hereinafter termed a DSC or an electronic camera). While in this second embodiment the explanation cites an example of an electronic camera of the compact type, it could also be a single lens reflex type or an electronic camera of some other type. The physical structure of the electronic camera of this second embodiment is the same as the structure of the electronic camera of the first embodiment shown in the block diagram of FIG. 1. It should be understood that parts and circuits of the camera that do not have any direct relationship to image reproduction are not shown in the figures, and explanation thereof is omitted.

Along with an image reproduction program that will be described hereinafter being included in the programs for execution by the CPU 20 stored in the flash memory 19, data for reference as explained in connection with the first embodiment is also stored. Along with controlling operations of the electronic camera 1 of various types such as image capture, exposure, focus adjustment (AF), image display and so on as explained in connection with the first embodiment, the CPU 20 also controls image reproduction by executing this image reproduction program that will be described hereinafter.

A memory card 51 is installed to a memory card interface 21 via a connector (not shown in the figures). This memory card interface 21 performs writing of data for images and for information of various types upon the memory card 51, and performs reading in of data for images and for information of various types from the memory card 51. While in this second embodiment, by way of example, a memory card 51 is explained that internally houses semiconductor memory, it would be possible to use a recording medium of any type that can record data for images and information of various types. A communication control circuit 22 performs wireless communication via an antenna 22a with external devices, including other electronic cameras. Moreover, as explained in connection with the first embodiment, the communication control circuit 22 is endowed with a human body communication function of communicating via the human body.

An OK switch 23h of the operating members 23 is also used as a release button for another electronic camera that is in a relationship of pairing with this camera. When a mode of remote control photography with another electronic camera, i.e. a paired relationship, is established, then a release signal is sent to that electronic camera via the communication control circuit 22 when the OK switch 23h is operated by being depressed, and photographic operation is executed by that electronic camera.

In this electronic camera 1 according to the second embodiment, the CPU 20 performs communication with the other electronic camera that has approximately the same structure as this electronic camera, and establishes a state (hereinafter termed the "paired state") in which collaborative photography can be performed by the plurality of cameras. In concrete terms, one among this electronic camera 1 and the other electronic camera transmits a command and data to the other, and the paired state becomes established upon the satisfaction of certain predetermined conditions that will be described hereinafter after the electronic camera that receives these returns a reply to the electronic camera that was the origin of transmission of the command and communication is established.

As explained in connection with the first embodiment, in this second embodiment as well, the user is able to select from among the four types of pairing formation condition "normal", "face identification", "hand clasping", and "camera contact". The processing for selecting a pairing formation condition is the same as in the first embodiment. It should be understood that, in this second embodiment, if pairing has become established under the condition "normal", then the electronic camera on the side that initially transmits a command and data is taken as being the "parent machine", while the electronic camera on the side that receives them is taken as being the "child machine".

It should be understood that, in this second embodiment, a paired folder is created each time a pairing with another electronic camera is established and paired photography is performed with that other electronic camera. Due to this, naturally a plurality of paired folders may be present. Among these paired folders, in some cases several have the same opposite party in pairing in common, and in some cases their opposite parties in pairing are different; and in some cases, although several have the same opposite party in pairing, their time points of photography (including their dates of photography) are different. Identification information for the opposite party in pairing, photographic time point information, folder sharing setting information and so on are recorded in the properties of each paired folder.

In this second embodiment, the operation for cooperative photography during pairing is the same as the operation for cooperative photography that has been explained in connection with the first embodiment and the variant embodiments described above. In other words, the CPU 20 executes photographic operation when operation of the release button 23a (refer to FIG. 2) takes place during pairing formation. During paired photography, while the same photographic subject is photographed by the plurality of electronic cameras that are in the paired relationship, communication between the cameras is mutually performed and the photographic conditions are varied a little at a time, in order for the resultant images not to resemble one another too closely. For example, if one of the electronic cameras is set to wide angle, then the other electronic camera is automatically set to telephoto, in other words, the zoom ratio is somewhat altered. In this case, by communication between the electronic cameras, the electronic camera that is equipped with the higher zoom ratio is set to telephoto, while the electronic camera that is equipped with the lens that can perform photography at a wider angle is set to wide angle. And, since the wide angle electronic camera provides more color information, accordingly, along with performing white balance control on the basis of the image from the electronic camera that is set to wide angle, also common white balance control is performed by feeding back the information from this camera to the other electronic camera that is set to telephoto.

Furthermore, the sensitivity and the shutter speed are controlled between this plurality of electronic cameras that are in a paired relationship, and, along with a high shutter speed being set for one of the electronic cameras, a low shutter speed is set for the other electronic camera, so that a photographic subject that is moving or the like can be photographed simultaneously by both cameras in a tasteful manner. In portrait photography, photographic guiding is performed so that it is possible to perform photography from somewhat different angles. In other words, face recognition is performed upon the through image, and guidance is performed by audio and by a monitor image so that each of the cameras performs photography at a different angle, such as slantingly from the right front and slantingly from the left front, or from the front and from the side, or the like.

Furthermore, during paired photography, photography in unison is performed by performing communication between the plurality of electronic cameras that are in the paired relationship. In other words, it is made possible to perform photography over a long time period by performing photography while spacing the time points of photography apart from one another. In the case of movie photography it is possible to perform photography of moving images successively from different photographic angles by subsequently performing movie photography with the other electronic camera on a so called "mutual catch ball" basis after movie photography has been performed by one of the electronic cameras. In a similar manner in the case of still image photography as well, after one or a plurality of still images have been photographed by one of the electronic cameras, subsequently, by performing photography of one or a plurality of still images with the other electronic camera, still image photography is performed on a so called "mutual catch ball" basis, so that it is possible to provide a slide show of a series of images that have been photographed by the plurality of electronic cameras during image reproduction.

Next, a method will be explained for reproduction of images that have been photographed as described above by the plurality of electronic cameras during pairing formation, and that have been recorded upon the recording medium 51. It should be understood that while in this embodiment an example is shown of reproducing the images upon an electronic camera 1, the reproduction of images that have been photographed in the paired state is not limited to being performed upon an electronic camera 1; it would also be acceptable to arrange to perform reproduction processing as explained below on a personal computer (hereinafter termed a "PC") by transferring the images that have been photographed in the paired state to the PC. Or it would also be acceptable to perform the reproduction processing described below upon a digital photo frame (hereinafter termed a "DPF") by transferring them to the DPF.

Figure 21:
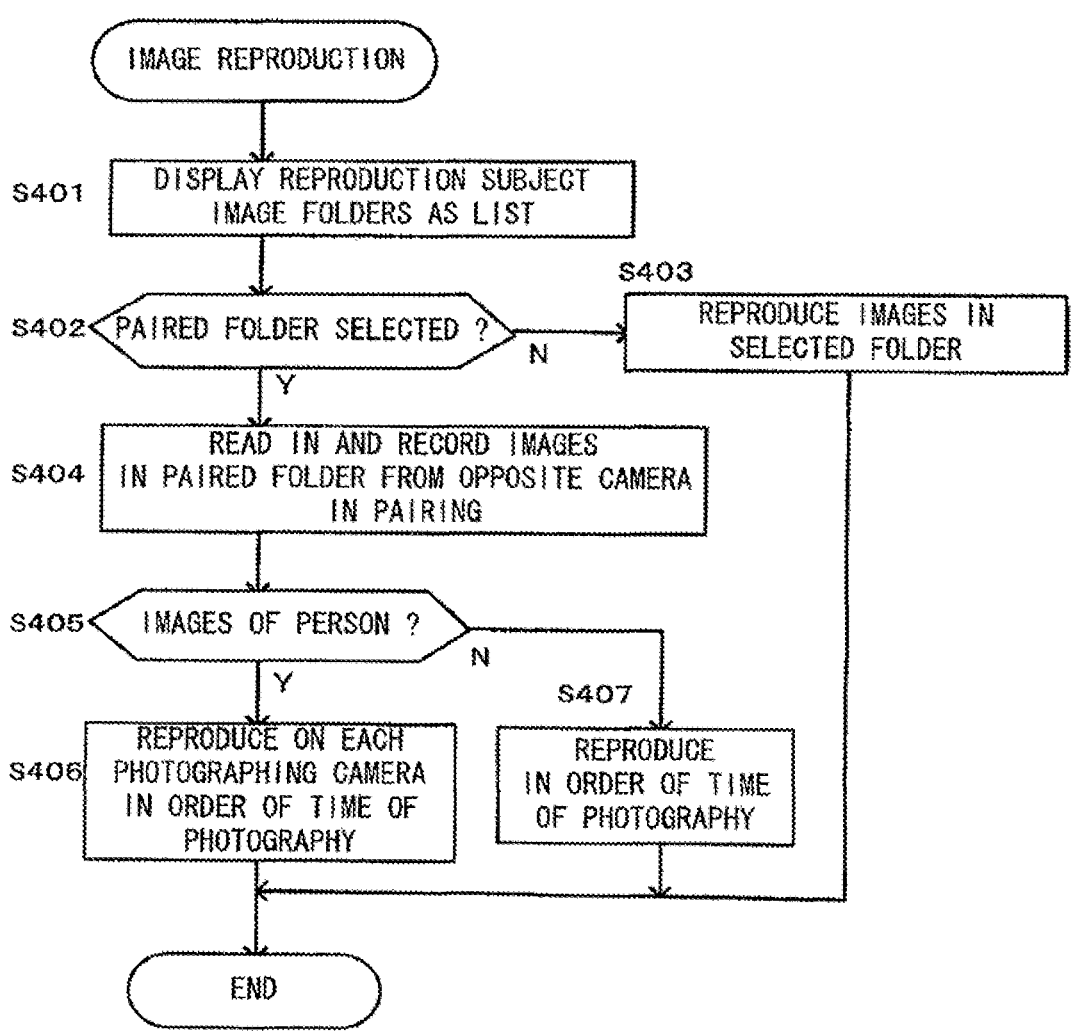
FIG. 21 is a flow chart showing an image reproduction program of an electronic camera according to a second embodiment.

FIG. 21 is a flow chart showing the image reproduction program of this embodiment. When a reproduction mode is selected with the mode switch 23d of the operating members 23, then the CPU 20 starts executing the image reproduction program shown in FIG. 21. In a step S401, the CPU 20 displays a "folder display" screen upon the LCD monitor 17, and shows all of the image folders that are subjects for reproduction. These image folders that are subjects for reproduction are all of the image folders that are recorded on the memory card 51 of this electronic camera 1, and also the paired folders.

In a step S402, the CPU 20 determines whether or not a paired folder has been selected by folder selection operation with the cruciform switch 23g and the OK switch 23h of the operating members 23. If a paired folder is not selected, then the flow of control proceeds to a step S403 and the CPU 20 reads out the image files in the folder that has been selected and displays them on the LCD monitor 17. It should be understood that the reproduction processing for images that are recorded in a folder other than a paired folder, in other words the reproduction processing for images other than images that have been photographed by paired photography, is performed by reproduction processing according to a prior art method, and accordingly explanation thereof will here be omitted.

On the other hand, if a paired folder has been selected, then the flow of control is transferred to a step S404, in which the CPU 20 reads in the paired photographic image data recorded in the paired folder on the electronic camera that is the opposite party in the pairing. And the CPU 20 stores the pair of this paired photographic image data that has been read in and the paired photographic images that are recorded in the paired folder of this electronic camera 1 itself in the RAM 18 (refer to FIG. 1) together as a paired image group. As described above, in image data that has been photographed by paired photography, identification information for the opposite party in the pairing (the camera ID or the like) and photographic time information are recorded in the header region of the image files. Accordingly, the CPU 20 reads in the paired photographic images from the electronic camera that is the opposite party in the pairing on the basis of this information.

As described above, a paired folder is created each time a paired relationship becomes established with the other electronic camera and paired photography is performed with that other electronic camera. Due to this, it is naturally possible for a plurality of paired folders to be present. With a plurality of paired folders, in some cases the opposite party in the pairing is the same and in some cases the opposite parties in the pairing are different, and also, in some cases, even though the opposite party in the pairing is the same, the plurality of paired folders have different time points of photography (i.e. different dates). Identification information for the opposite party in the pairing, information about the time point of photography, information about folder sharing settings, and so on are recorded in the properties of the paired folders.

The CPU 20 reads out the identification information for the opposite party in the pairing and the time of photography information from the properties of the paired folder that has been selected as the subject for reproduction. And next the CPU 20 performs communication with the electronic camera that is the opposite party in the pairing and sends to it the identification information of this electronic camera itself and the photographic time point information of the paired folder that is to be the subject for reproduction. And the CPU 20 requests the electronic camera that is the opposite party in the pairing to perform a search for a paired folder having the same time point or of almost the same time point as the paired folder that is to be the subject of reproduction. The electronic camera that is the opposite party in the pairing then consults the properties of the paired folders that are recorded in its memory and finds a paired folder corresponding to the paired folder that is the subject for reproduction, in other words a paired folder whose identification information and time point of photography agree with those of the opposite party in the pairing, and transmits the paired photographic image data included in this paired folder that has been found to the electronic camera that was the source of the request.

It should be understood that identification information for the opposite party in the pairing and photographic time point information are also recorded in the header region of each of the sets of paired photographic image data. The CPU 20 reads out this information and sends to the electronic camera that is the opposite party in the pairing the identification information of this electronic camera itself and the photographic time point information of the image that is to be the subject for reproduction, and requests the electronic camera that is the opposite party in the pairing to perform a search for a paired photographic image having almost the same photographic time point as the paired photographic image that is the subject for reproduction. The electronic camera that is the opposite party in the pairing consults the header region of the paired image data recorded in its memory and finds a paired photographic image corresponding to the paired photographic image that is to be the subject for reproduction, and transmits this data to the electronic camera that was the source of the request. It should be understood that it would be acceptable for the reading in of the paired photographic image from the opposite party in the pairing by the communication control circuit 22 to be performed by wireless communication; or it could also be performed by cable communication, i.e. by connecting via a communication cable to the electronic camera that is the opposite party in the pairing.

Next, in a step S405, the CPU 20 determines whether or not the images in the paired image group are images of a person. In the case of reproduction of paired photographic images in which a person has been photographed as the main photographic subject, when reproducing images shot by a plurality of electronic cameras in the order of time of photography, the photographic angle changes frequently and sometimes the person is difficult to see. Reproduction of the paired photographic images of a person all together for each photographic angle will impart a somewhat more effective natural feeling. Setting information specifying the photographic scene mode, for example "macro", "scenery", "portrait", "night scene" or the like, is recorded in the header regions of the image files. If the photographic scene mode is "portrait", then the CPU 20 decides that this is the image of a person. Or, it would also be acceptable for the CPU 20 to decide whether or not it is an image of a person by scene analysis of the image itself.

In the case of reproducing paired photographic images in which a person has been shot as the main photographic subject, the flow of control proceeds to a step S406. Among the paired photographic images from the plurality of paired cameras that are stored in the folder of the paired image group, the CPU 20 displays the images photographed by one of the cameras, for example the "parent machine", upon the LCD monitor 17 in the order of time point of photography at predetermined intervals, thus performing slide show reproduction. And thereafter the CPU 20 displays the images photographed by the other one of the cameras, for example the "child machine", upon the LCD monitor 17 in the order of time point of photography at predetermined intervals, thus performing slide show reproduction. By doing this, for each photographic angle, it is possible effectively to provide a slide show of a series of images that are matched to the movement of the person during photography, so that it is possible to implement more natural image reproduction.

On the other hand, if the paired photographic images are not images of a person, then the flow of control is transferred to a step S407. The CPU 20 simply displays the paired photographic images photographed by the plurality of paired cameras and stored in the folder of the paired image group upon the LCD monitor 17 in the order of time point of photography at predetermined intervals, thus performing slide show reproduction. It should be understood that it would be acceptable for the CPU 20 not to reproduce the paired photographic images photographed by the plurality of paired cameras in the order of time point of photography, even if the paired photographic images are not images of a person. In this case the CPU 20 may change the method of reproduction so as to, at first, reproduce the paired photographic images photographed during pairing by one of the paired cameras, for example by the "parent machine", in the order of time point of photography, and so as to, subsequently, reproduce the paired photographic images photographed during pairing by the other one of the paired cameras, for example by the "child machine", also in the order of time point of photography. In this case, the reproduction method may be changed by a custom operation for setting on a reproduction method menu, using the operating members 23.

Furthermore, during the reproduction of the paired photographic images, sometimes it may happen that it feels uncomfortable if a number of images of the same type of scene are displayed successively. Thus, if there are images with almost the same time point of photography, then the CPU 20 uses images of one camera, for example images of the "parent machine", and then jumps to reproduce images of the other camera, for example images of the "child machine". Moreover, it would also be acceptable to arrange for the CPU 20 to identify an image for which the result of image analysis is that the contour extraction amount is low so that the image, whose image quality is poor, is determined to be an image in which hand shaking is present, to employ an image, among the images that were photographed at approximately the same moment, for which the contour extraction amount is high, in other words an image for which there is no hand shaking, and then to jump to reproduce the image in which hand shaking is present. Or, it would also be acceptable to arrange for the CPU 20 to perform smiling face detection upon the images, and to employ that image for which the smiling face level (i.e. the amount of smiling) in the images that have been photographed at approximately the same moment is the highest, and then jump to reproduce an image whose smiling face level is lower. It would also be possible to provide a custom setting in advance upon a menu screen for setting whether or not to execute the reproduction method of reproducing one among the plurality of paired photographic images that were photographed at the same moment in this manner, and then jumping to the remaining images, or as to the details of the way this jumping is performed (if it is performed) or the like.

It should be understood that, in the case of reproducing the paired photographic images upon a PC or a DPF, the CPU 20 may start the image processing program of FIG. 21 from the step S404, may read in the paired photographic images from a plurality of electronic cameras in the step S404, and may execute the processing of the steps S405 through S407 described above.

While, with the second embodiment described above, an example has been shown in which a plurality of images are recorded while being separated into folders or paired folders, there is no need for the images necessarily to be separated according to folders. For example, provided that the identification information for the opposite pairing in the pairing and the paired photographic time point information are recorded for each set of image data, then they may be separated into one unit of paired image group on the basis of this information. Furthermore, it would also be acceptable to arrange to record all the paired photographic images in a single paired folder, irrespective of the opposite parties in the pairing and the paired photographic time points.

While an example has been shown in which the image reproduction function according to the present invention is provided to an electronic camera with the second embodiment described above, it would also be acceptable to arrange to provide the image reproduction function described above to any image reproduction device that is provided with an image capture function, in other words to an electronic device such as a portable telephone device or a mobile PC or the like.

It should be understood that the second embodiment described above and its variant embodiments may be combined in any combination of the second embodiment and the variant embodiments.

According to the second embodiment described above and the variant embodiments thereof, the following beneficial operational effects may be obtained. First, when the paired photography (i.e. collaborative photography or cooperative photography) is performed by the plurality of electronic cameras, and the CPU 20 reproduces the plurality of images in which information related to the opposite party in the paired photography (i.e. the opposite party in collaborative photography or in cooperative photography) has been recorded for each image, it is arranged for the plurality of images that have been photographed by paired photography by the plurality of electronic cameras at approximately the same moment to be collected together as a paired image group on the basis of the information related to the opposite party in the paired photography and the photographic time point information, and for the plurality of images included in the paired image group to be reproduced in the order of their photographic time points, according to their time point information. Accordingly, it is possible to reproduce a plurality of images that have been shot by paired photography by a plurality of electronic cameras successively in an effective manner, and it is possible to recreate the movement of a photographic subject during photography with good fidelity.

Moreover, according to the second embodiment and the variant embodiments thereof, it is arranged for the CPU 20 to reproduce those images that were captured by the second electronic camera in the order of their photographic time points after having reproduced those images, among the plurality of images included in the paired image group, that were captured by the first electronic camera in the order of their photographic time points. As a result, for each of the electronic cameras, it becomes possible to reproduce the images in succession in accord with the intentions of the photographer, and it is possible to recreate the movement of the photographic subject for each of the electronic cameras during photography with good fidelity.

According to the second embodiment and the variant embodiments thereof, the CPU 20 makes a decision as to whether or not the plurality of images that are included in the paired image group are images that have been photographed with a person as the subject. And, if it is decided that they are images that have been photographed with a person as the subject, then it is arranged for the CPU 20 to reproduce the images that were captured by the second electronic camera in the order of their photographic time points after having reproduced those images among the plurality of images included in the paired image group that were captured by the first electronic camera in the order of their photographic time points. On the other hand, if it has been decided that they are images that have not been photographed with a person as the subject, then it is arranged for the CPU 20 to reproduce all of the images that are included in the paired image group in the order of their photographic time points.

When a plurality of paired photographic images that have been photographed with a plurality of electronic cameras and with a person as the subject are simply reproduced in the order of their photographic time points, then sometimes it happens that they become difficult to see because the photographic angle changes rather frequently. However, according to the second embodiment described above it is possible, to some extent, to reproduce paired photographic images of a person all together for each photographic angle, so that it is possible to implement a slide show that gives a natural feeling effectively along with the movement of the person during photography. On the other hand, for paired photographic images of some subject other than a person, by simply reproducing them in the order of their photographic time points, it is possible to implement a slide show along with the movement of the photographic subject during photography.

According to the second embodiment and the variant embodiments thereof it is arranged for the CPU 20 to select and to reproduce only certain ones among them as images for reproduction if there are a plurality of images that were photographed at approximately the same time point among the plurality of images that are included in the paired image group. Accordingly, it is possible to prevent the troublesomeness and unpleasantness of the same type of scene being repeated several times.

According to the second embodiment and the variant embodiments thereof, it is arranged for the CPU 20 to perform contour extraction analysis upon a plurality of images, among the plurality of images that are included in the paired image group, that were photographed at approximately the same time point, and to select and to reproduce as images for reproduction those images, among the plurality of images that were photographed at substantially the same time point, for which the contour extraction amount is found to be great. As a result, it is possible to select and to reproduce those images of good image quality in which the amount of hand shaking is low.

According to the second embodiment and the variant embodiments thereof, it is arranged for the CPU 20 to perform smiling face detection analysis upon a plurality of images, among the plurality of images that are included in the paired image group, that were photographed at approximately the same time point, and to select and to reproduce as images for reproduction those images for which the level of smiling is found to be the highest. Accordingly, it is possible to select and to reproduce those images in which smiling faces have been photographed.

Figure 22:
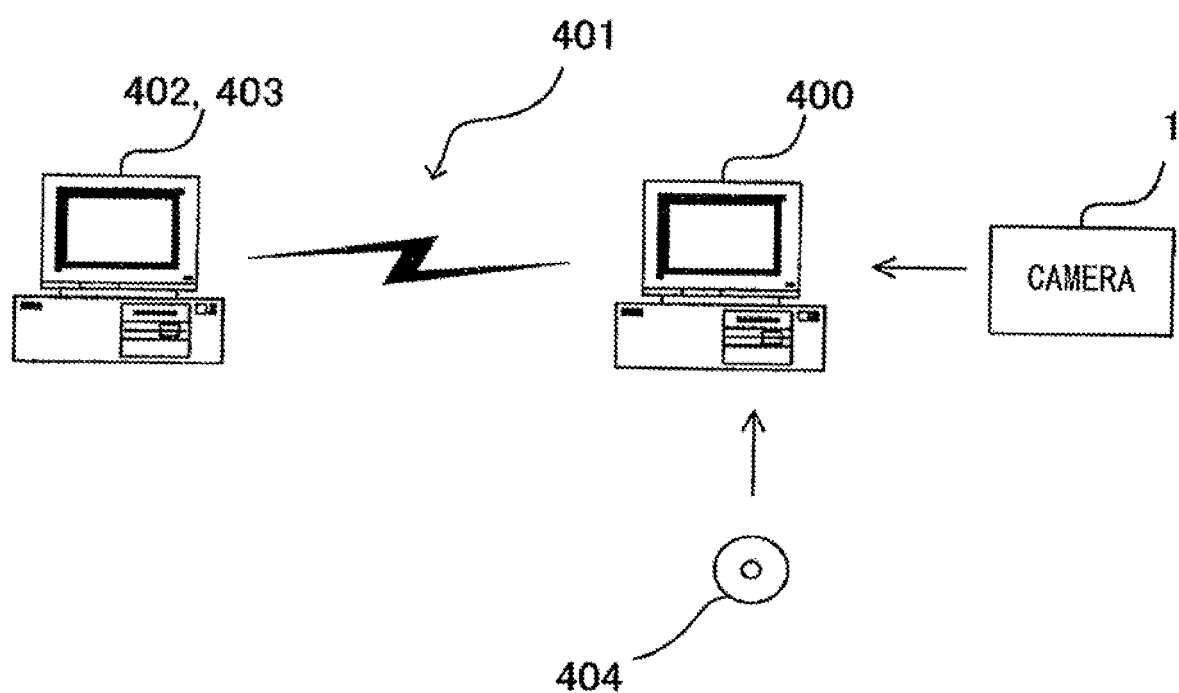
FIG. 22 is a figure for explanation of the overall structure of apparatus that is used for supplying a manufactured program product.

Furthermore, when applied to a personal computer or the like, the image reproduction program described above may be supplied via a recording medium such as a CD-ROM or the like, or via a data signal such as the internet or the like. FIG. 22 is a figure showing this situation. The personal computer 400 receives supply of the program via a CD-ROM 404. Moreover, the personal computer 400 has a function of connection to a communication circuit 401. A computer 402 is a server computer that supplies the program described above, and stores the program on a recording medium such as a hard disk 403 or the like. The communication circuit 403 is the internet, a communication circuit such as personal computer communication or the like, or a dedicated communication circuit or the like. The computer 402 reads out the program using the hard disk 403, and transmits the program to the personal computer 400 via the communication circuit 401. In other words, it transmits the program via the communication circuit 401 as a data signal via a carrier wave. In this manner, the program can be supplied as a computer readable program product in various formats, such as a recording medium or a data signal (carrier wave) or the like.

The contents of the disclosures of the following patent applications, upon which priority is claimed, are hereby incorporated herein by reference:

Japanese Patent Application 2010-35,010 (filed on 19 Feb. 2010);
Japanese Patent Application 2010-35,013 (filed on 19 Feb. 2010);
Japanese Patent Application 2010-35,014 (filed on 19 Feb. 2010).

The invention claimed is:

1. An electronic device comprising:
an image sensor that captures an image;
a communication unit comprising a circuit that communicates with an external device having an image capture unit which performs image capture;
a controller comprising a processor that controls the image sensor and the communication unit, the processor being programmed to:
enable setting of an image capture condition relating to an image quality of an image of the image capture performed by the external device,
transmit information of the image capture condition to the external device via the communication unit after communication between the communication unit and the external device is established, and
receive, via the communication unit, an image captured by the external device using the image capture condition transmitted by the communication unit; and
a display that displays the image received by the processor via the communication unit.

2. The electronic device according to claim 1, wherein
the communication unit includes: a first communication unit that communicates with the external device; and a second communication unit that is different from the first communication unit and wirelessly communicates with the external device, and
the processor transmits the information of the image capture condition to the external device via the second communication unit after the first communication unit communicates with the external device.

* * * * *